United States Patent
Kanoshima et al.

(10) Patent No.: US 7,454,528 B2
(45) Date of Patent: Nov. 18, 2008

(54) IMAGE OUTPUT APPARATUS USING CLOSE RANGE RADIO CONTACT WHEREIN RADIO CONTACT ELEMENT IS ATTACHED TO DOCUMENT ON WHICH AN IMAGE IS RECORDED

(75) Inventors: Yuichiro Kanoshima, Kanagawa (JP); Sadayuki Iwai, Kanagawa (JP); Naoto Shiraishi, Tokyo (JP); Hisao Shirasawa, Kanagawa (JP); Kazunari Tonami, Kanagawa (JP); Yoshinori Hayashi, Kanagawa (JP); Naoki Miyatake, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 434 days.

(21) Appl. No.: 11/056,580

(22) Filed: Feb. 14, 2005

(65) Prior Publication Data

US 2005/0200910 A1    Sep. 15, 2005

(30) Foreign Application Priority Data

| Feb. 13, 2004 | (JP) | ............................. 2004-036556 |
| Feb. 13, 2004 | (JP) | ............................. 2004-036557 |
| Feb. 13, 2004 | (JP) | ............................. 2004-036558 |
| Feb. 13, 2004 | (JP) | ............................. 2004-036559 |

(51) Int. Cl.
*G06F 15/00* (2006.01)
*G06F 13/00* (2006.01)

(52) U.S. Cl. .................. 710/2; 710/5; 710/33; 400/76; 400/88; 358/1.6; 358/448

(58) Field of Classification Search ...................... 710/2, 710/5, 33; 400/76, 88; 358/1.6, 448
See application file for complete search history.

(56) References Cited

U.S. PATENT DOCUMENTS

| 6,008,727 | A | 12/1999 | Want et al. |
| 6,249,226 | B1 | 6/2001 | Harrison et al. |
| 6,342,830 | B1 | 1/2002 | Want et al. |
| 6,409,401 | B1 * | 6/2002 | Petteruti et al. ............... 400/88 |
| 7,037,009 | B2 * | 5/2006 | Barrus et al. .................. 400/76 |
| 7,066,667 | B2 * | 6/2006 | Chapman et al. .............. 400/76 |
| 7,180,627 | B2 * | 2/2007 | Moylan et al. ................ 358/1.6 |

FOREIGN PATENT DOCUMENTS

JP    10-337983    12/1998

(Continued)

OTHER PUBLICATIONS

Ichiro Shiio, "Putting Information to Things: RFID Tags and Their Applications" Journal of Information Processing, vol. 40, No. 8 (Aug. 1999).

(Continued)

*Primary Examiner*—Tammara R Peyton
(74) *Attorney, Agent, or Firm*—Dickstein Shapiro LLP

(57) ABSTRACT

An image output apparatus includes a receiving unit that receives first information from a first radio contact element that performs a close-range radio contact; an image processing unit that forms image data of an image to be output from the first information; and an image output unit that outputs the image to an output medium from the image data.

20 Claims, 31 Drawing Sheets

FOREIGN PATENT DOCUMENTS

| | | |
|---|---|---|
| JP | 2000-187715 | 7/2000 |
| JP | 2000-285203 | 10/2000 |
| JP | 2001-160117 | 6/2001 |
| JP | 2001-167237 | 6/2001 |
| JP | 2001-287477 | 10/2001 |
| JP | 2002-002026 * | 1/2002 |
| JP | 2002-132474 | 5/2002 |
| JP | 2002-190911 | 7/2002 |
| JP | 2002-324224 | 11/2002 |
| JP | 2002-337426 | 11/2002 |

OTHER PUBLICATIONS

JP Office Action 2004-036557, mailed Dec. 25, 2007.

* cited by examiner

IMAGE OUTPUT APPARATUS USING CLOSE RANGE RADIO CONTACT WHEREIN RADIO CONTACT ELEMENT IS ATTACHED TO DOCUMENT ON WHICH AN IMAGE IS RECORDED

CROSS-REFERENCE TO RELATED APPLICATIONS

The present document incorporates by reference the entire contents of Japanese priority document, 2004-36556 filed in Japan on Feb. 13, 2004, 2004-36557 filed in Japan on Feb. 13, 2004, 2004-36558 filed in Japan on Feb. 13, 2004 and 2004-36559 filed in Japan on Feb. 13, 2004.

BACKGROUND OF THE INVENTION

1) Field of the Invention

The present invention relates to a technology for outputting an image using information received from a radio contact element that is attached to a document or an output medium, preventing a leakage of information to the outside of the apparatus or crosstalk of information within the apparatus when communicating with the radio contact element, and increasing an added value of document information.

2) Description of the Related Art

In recent years, along wide diffusion of information technologies using the Internet and personal computers, business enterprises prepare various kinds of electronic information and output the prepared information on paper using image output apparatuses such as copying machines and printers, in their intelligent manufacturing activities. Output documents are distributed to share the information at meetings or the like, and are used for intelligent manufacturing activities. Recipients of the documents carry them home for storage as they are, or convert the contents into image information using an image reading apparatus and keep an image file according to the Joint Photographic Experts Group (JPEG). In order to use the information for activities, the documents are further copied, or the information stored in a JEPG image file is directly output and is processed using a personal computer.

While the contents of the received document are analog information, it is preferable to convert the information into digital information to reuse or reprocess the information. The conversion of analog information into digital information with an optical image reading apparatus causes degradation in the quality of the information due to physical factors of modulation transfer function (MTF) characteristics of lenses or charge-coupled devices (CCDs).

When the amount of information increases after conversion into image information, the information amount can be reduced by image compression. However, the compression causes degradation in image quality.

Document information contained in paper can be extracted as text data by image processing with an optical character reader (OCR). However, this method has a problem in that quality of the information obtained from the document is degraded depending on conversion precision.

A person originally prepares electronic information using a personal computer, and outputs the information using a certain image output apparatus to prepare the document. Therefore, this electronic information is present. Accordingly, both the output document and the electronic information can be distributed. However, the electronic information must be delivered using a separate recording medium such as a flexible disk (FD), a compact disk-read only memory (CD-ROM), or a compact disk recordable (CD-R), or with an e-mail via the Internet, which is troublesome.

In the meantime, as reported in "RFID tag for attaching information to objects, and its application", August 1999, Information Processing Society of Japan journal, Volume 40, No. 8, pp. 846-850, a radio frequency identification (RFID) technique for electronically holding individual information and non-contact transmitting this information according to electromagnetic induction is developed and is started to be applied to management of object identification.

For example, Japanese Patent Application Laid-open No. 2002-337426 discloses the following technique. An RFID tag is attached to a document. Image data of the document and ID (identification) information of a person who makes copy, or ID information of a person who transmits the information are written into the RFID tag. With this arrangement, the image is printed and digital data is written onto paper, and whether a person is authorized to operate the transmission is determined, thereby giving permission to copy or transmit the information. However, the technique does not assume writing of plural pieces of information into the RFID chip, and does not describe how to selectively use desired information.

Japanese Patent Application Laid-open No. 2002-190911 discloses the following technique. Copy-inhibited information is written into a non-contact memory on a recording medium, and copy inhibition procedure is taken when this information is read. This publication does not assume writing of plural pieces of information into the non-contact memory either, and prohibition procedure cannot be taken when the copy-inhibited information cannot be properly read.

Japanese Patent Application Laid-open No. 2002-132474 discloses the following technique. An optional character or information surrounded by marks is deleted from output image information, thereby avoiding an output of an image within a certain range. This is based on an instruction from a host computer or the like, and an RFID chip attached to a document is not utilized. Therefore, it is difficult to relate computer instruction to individual documents.

When information is exchanged by radio using an RFID chip, this has a risk that the information is received at the outside of the apparatus during communication. Particularly when the information recorded in the RFID chip is confidential information, this has a risk of a leakage of the confidential information to the outside, which is dangerous. When plural RFID chips are accommodated in the apparatus, crosstalk occurs inside the apparatus, which has a problem that proper information cannot be received and that an image is output based on wrong information.

According to techniques disclosed in Japanese Patent Application Laid-open Nos. 2000-285203, 2001-287477, 2001-167237, and 2002-324224, an IC chip, an IC tag, or an IC card is embedded into paper or attached to the surface of paper before printing. However, according to a dry electrophotographic system currently used in a copying machine or a printer, an image is electrically formed using a charged particle containing a pigment made of a resin such as a toner as a developing particle. In electrostatically transferring the image onto the paper, a high voltage of 500 volts to 10 kilovolts is applied, and the IC chip cannot function due to the influence of static electricity.

SUMMARY OF THE INVENTION

It is an object of the present invention to solve at least the above problems in the conventional technology.

An image output apparatus according to one aspect of the present invention includes a receiving unit that receives first information from a first radio contact element that performs a close-range radio contact; an image processing unit that forms image data of an image to be output from the first information; and an image output unit that outputs the image to an output medium from the image data.

An image output apparatus according to another aspect of the present invention includes a receiving unit that receives first information from a first radio contact element performs a close-range radio contact; and an image output unit that outputs an image to an output medium. The first information is information concerning the output medium, and the image output unit determines an image output condition based on the information concerning the output medium, and outputs the image according to the output condition.

An image output apparatus according to still another aspect of the present invention includes a writing unit that writes information into a radio contact element that performs a close-range radio contact; and an image output unit that outputs an image to an output medium. The writing unit writes information concerning the image into the radio contact element.

An image output apparatus according to still another aspect of the present invention includes a receiving unit that receives the information from a radio contact element that performs a close-range radio contact; an image processing unit that forms image data of an image to be output based on the information; an image output unit that outputs the image to an output medium based on the image data; and a limiting unit that limits transmission of the information from the radio contact element.

An image output apparatus according to still another aspect of the present invention includes an image output unit that outputs an image to an output medium; and a writing unit that writes information concerning the image into a radio contact element that is attached on the output medium and performs a radio communication. The image output apparatus limits transmission of the information from the writing unit.

An image output apparatus according to still another aspect of the present invention includes an image forming unit that forms an image on a recording medium; and a radio-contact-element adding unit that adds a radio contact element, which performs a close-range radio contact, on the recording medium immediately after the image forming unit forms the image on the recording medium.

An image input apparatus according to still another aspect of the present invention includes an image reading unit that reads an image from a document, and converts the image into electronic information; an information reading unit that reads information from a radio contact element that is attached on the document and performs a close-range radio contact; an information selecting unit that selects specific information from among a plurality of pieces of information concerning the document read by the information reading unit; and an image processing unit that performs a conversion process for image information read by the image reading unit based on the specific information.

An image forming apparatus according to still another aspect of the present invention includes an image input apparatus including an image reading unit that reads an image from a document, and converts the image into electronic information; an information reading unit that reads information from a radio contact element that is attached on the document and performs a close-range radio contact; an information selecting unit that selects specific information from among a plurality of pieces of information concerning the document read by the information reading unit; and an image processing unit that performs a conversion process for image information read by the image reading unit based on the specific information.

An image output method according to still another aspect of the present invention includes receiving information from a radio contact element attached on a document and outputting an image based on the information, by using an image output apparatus. The image output apparatus includes a receiving unit that receives information from the radio contact element that performs a close-range radio contact; an image processing unit that forms image data of an image to be output from the information; and an image output unit that outputs the image to an output medium from the image data. The radio contact element has a directivity, and transmission of the information from the radio contact element to outside of the image output apparatus is limited by receiving the information from the radio contact element in a state that the radio contact element is disposed in a predetermined direction.

An image output method according to still another aspect of the present invention includes receiving information from a radio contact element attached on a document and outputting an image based on the information, by using an image output apparatus. The image output apparatus includes a receiving unit that receives information from the radio contact element that performs a close-range radio contact; an image processing unit that forms image data of an image to be output from the information; and an image output unit that outputs the image to an output medium from the image data. Transmission of the information from the radio contact element to outside of the image output apparatus is limited by limiting a communication distance of the radio contact element.

The other objects, features, and advantages of the present invention are specifically set forth in or will become apparent from the following detailed description of the invention when read in conjunction with the accompanying drawings.

DETAILED DESCRIPTION

Exemplary embodiments of an image output apparatus using a radio contact element according to the present invention are explained in detail below with reference to the accompanying drawings.

Figure 1:
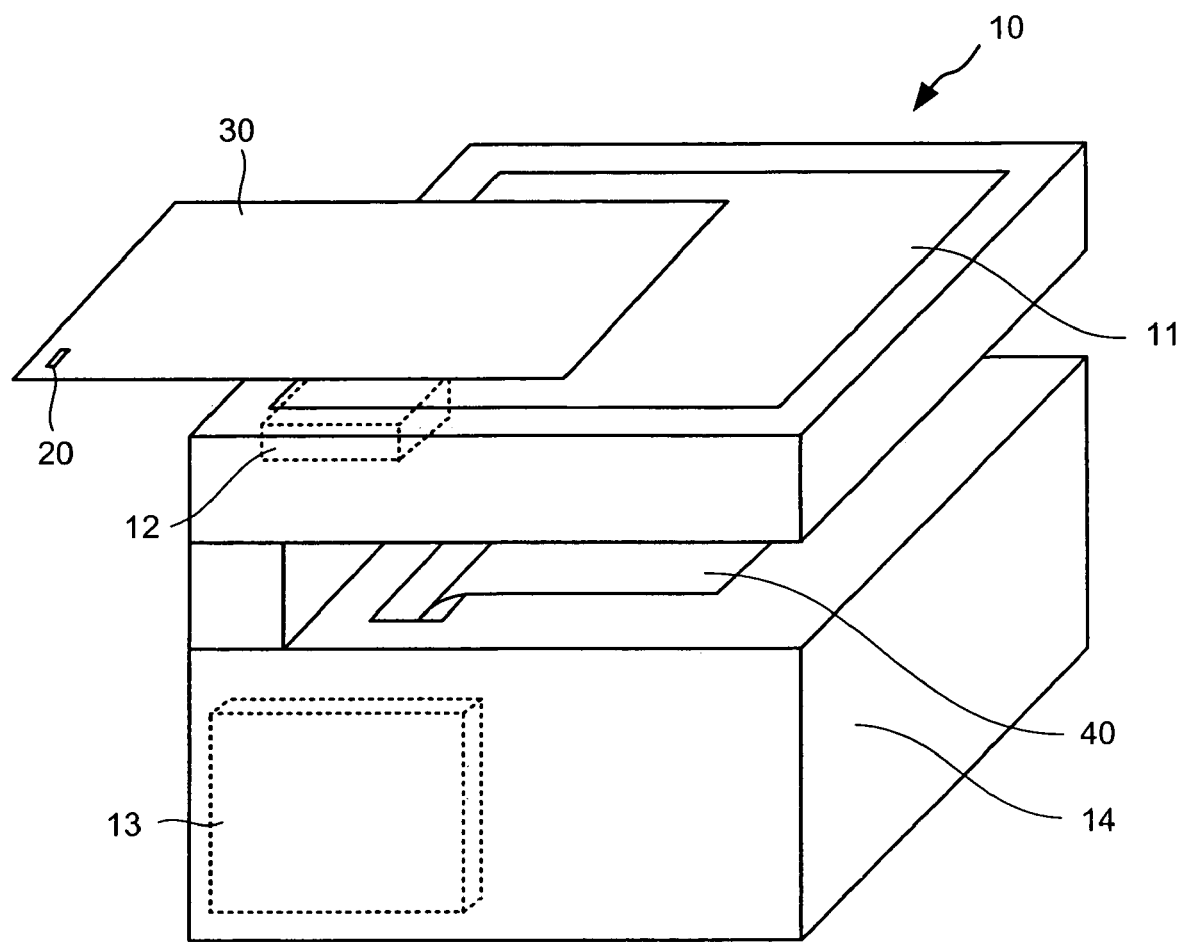
FIG. 1 is a perspective view of an image output apparatus according to a first embodiment of the present invention.

FIG. 1 is a perspective view of an image output apparatus according to a first embodiment of the present invention. According to the first embodiment, an image output apparatus 10 has a function of receiving image information from an RFID chip 20 that is attached to a document 30, and outputting an image to an output medium 40 based on the image information received from the RFID chip 20. When the RFID chip 20 is not attached to the document 30, the image output apparatus 10 reads the image recorded on the document 30 and copies the image onto the output medium 40.

The image output apparatus 10 according to the first embodiment includes an image reader 11 that reads image information from the document 30, a receiver 12 that obtains or writes necessary information by communicating with the RFID chip 20 attached to the document 30, an image processing unit 13 that converts the obtained information into output data, and an image output unit 14 that writes the information into the output medium 40.

Figure 2:
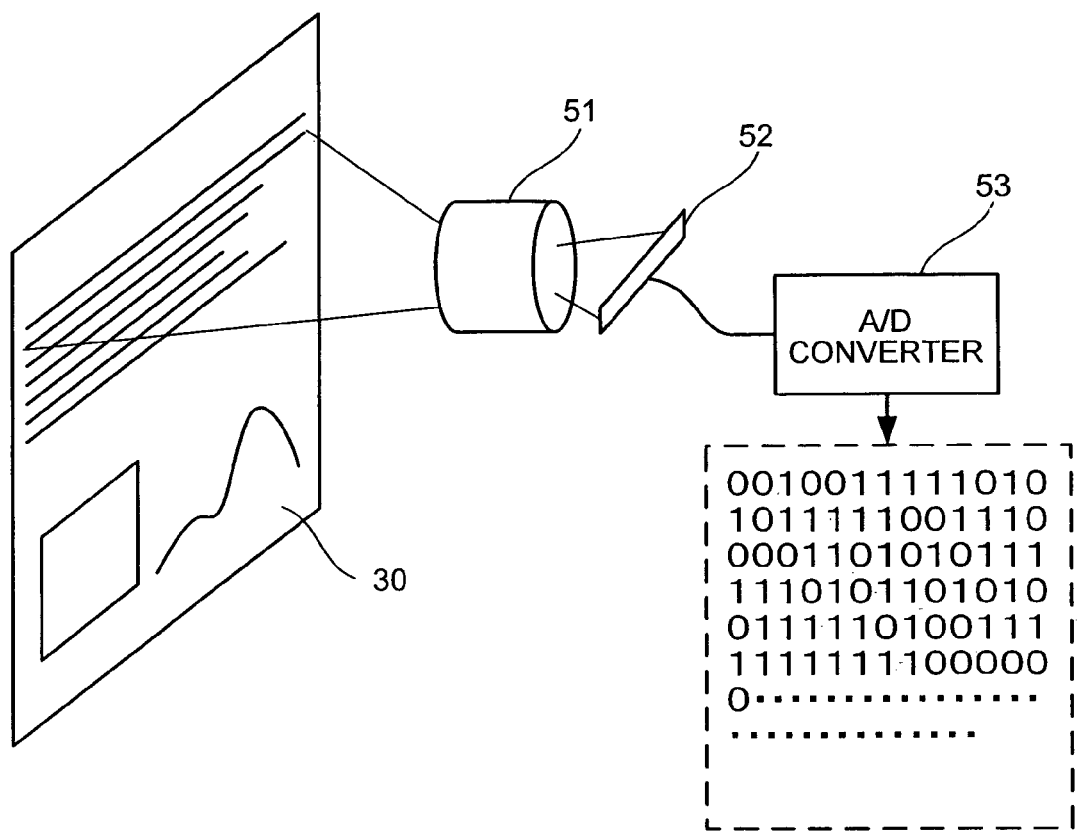
FIG. 2 is a block diagram of an image reader according to the first embodiment.

The image reader 11 reads image information from the document 30. FIG. 2 is a block diagram of an image reader 11 according to the first embodiment. The image reader 11 has a lens 51, a CCD 52, and an analog to digital (A/D) converter 53. The lens 51 optically reads image information of an image recorded on the document 30, and stores the read analog data into the CCD 52. The A/D converter 53 converts the read analog data into digital data. This digital data is transmitted to the image processing unit 13.

Figure 3:
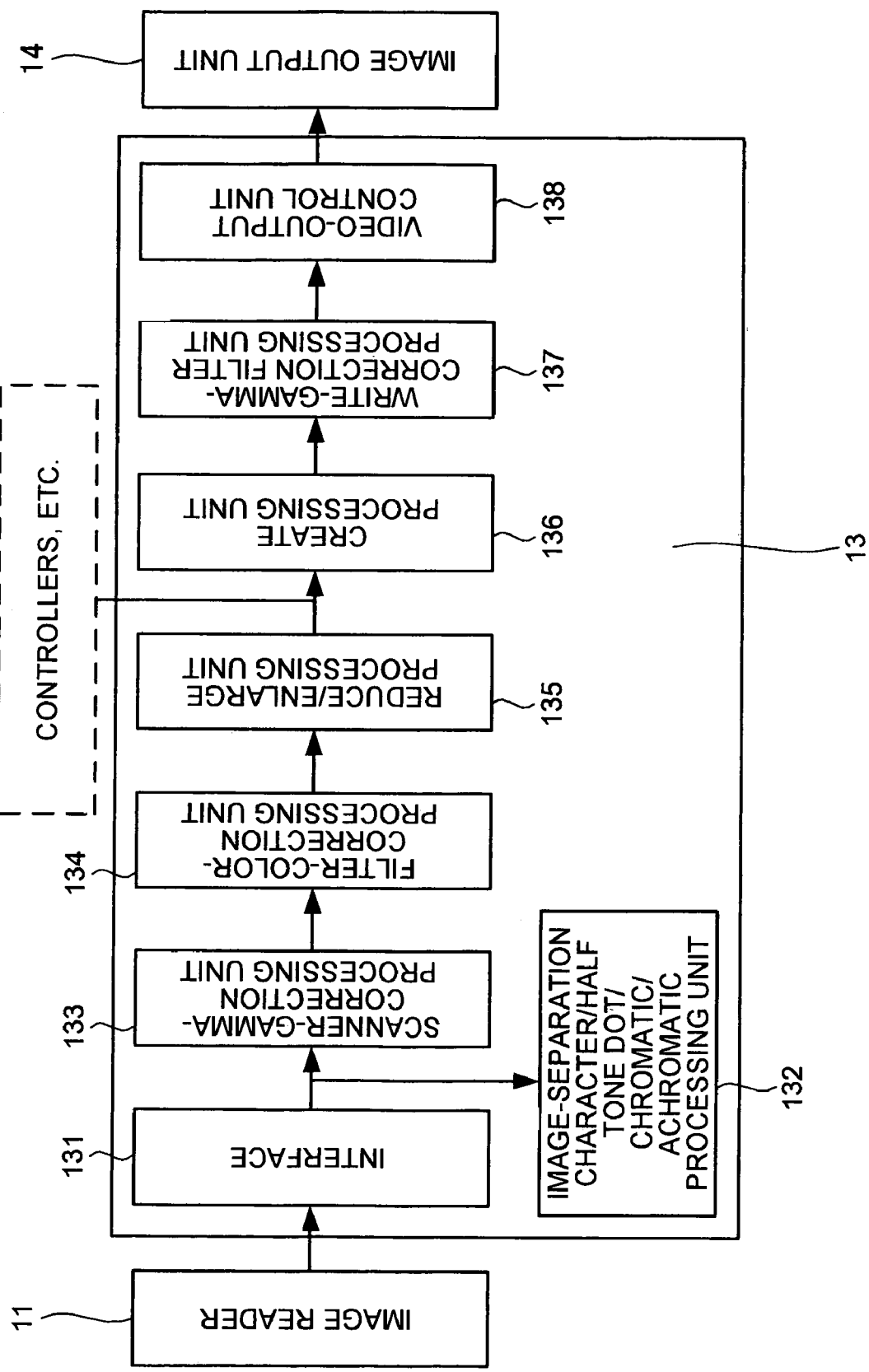
FIG. 3 is a block diagram of an image processing unit according to the first embodiment.

The image processing unit 13 converts the image that the receiver 12 obtains from the RFID chip 20, into image data for output. FIG. 3 is a block diagram of an image processing unit 13 according to the first embodiment. The image processing unit 13 inputs data from an input interface (hereinafter, "I/F") 131, determines and optimizes the data according to a programmed image processing, and converts the data into image data for output.

The image output unit 14 outputs an image obtained from the image data formed by the image processing unit 13, to the output medium 40. The image output unit 14 outputs the image based on an electro-photographic system, an inkjet system, or the like. The output medium 40 covers plain paper, coated paper, an overhead projector (OHP) transparency or the like.

The RFID chip 20 electronically holds information, and non-contact transmits the information according to electromagnetic inductance. The RFID chip 20 includes a radio communication function and a memory that stores information.

Figure 4:
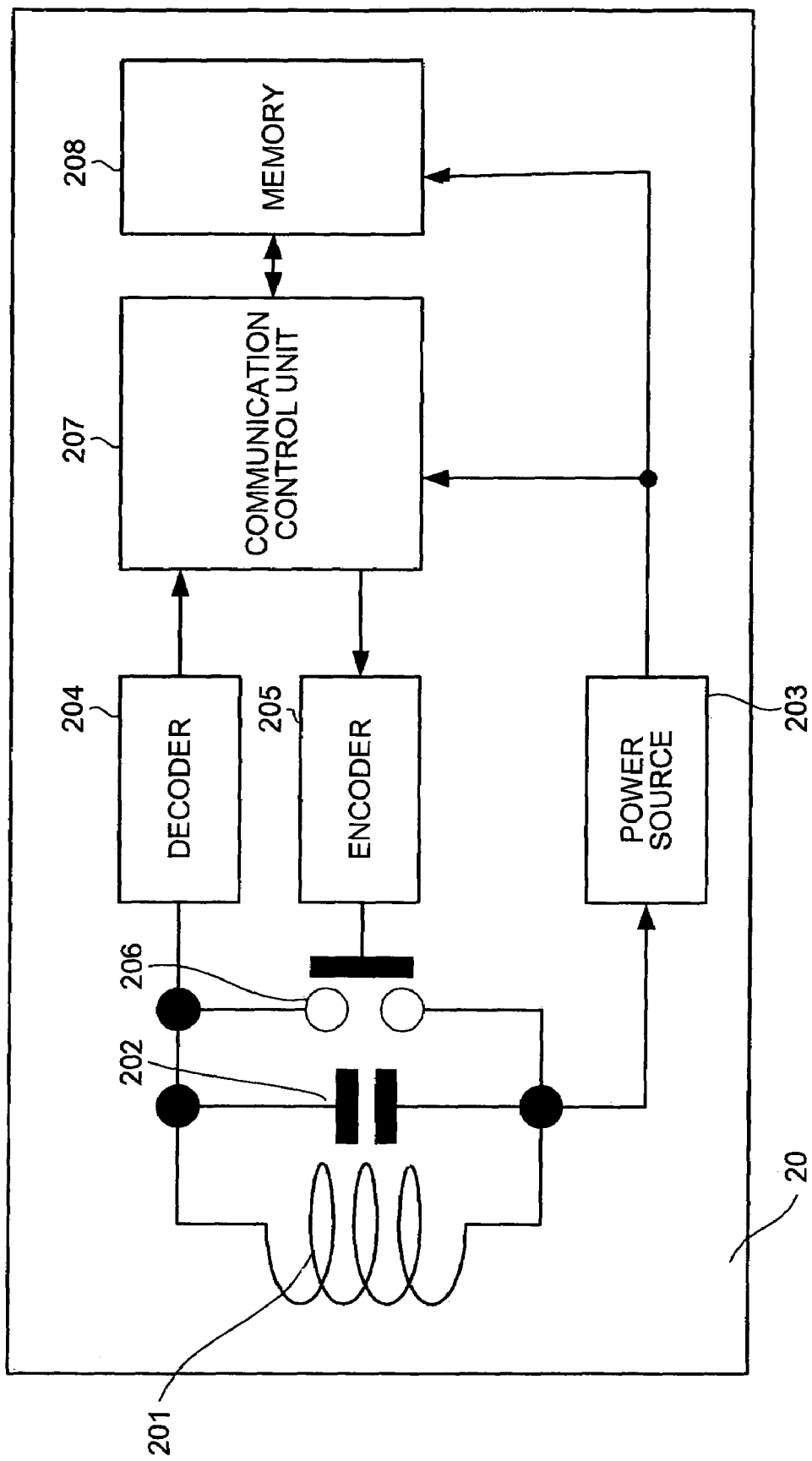
FIG. 4 is a schematic of an RFID chip according to the first embodiment.

The RFID chip 20 that is recorded with information is attached to the document 30. FIG. 4 is a schematic of an RFID chip 20 according to the first embodiment.

The RFID chip 20 mainly includes an antenna 201, a power source 203, and a memory 208. The RFID chip 20 is prepared according to a known technique, and operates as follows. The antenna 201 induces a current from a radio wave given from the outside, and accumulates a charge into the power source 203. By using power obtained from the charge accumulated in the power source 203, information stored in the memory 208 is transmitted from the antenna 201 in a radio wave. The memory can be any one of a read-only memory and a readable-writable memory. A semiconductor memory is usually used for the memory 208.

In general, a communication distance of the RFID chip is determined based on a frequency of a radio wave. A low-frequency radio wave has a long communication distance, and a high-frequency radio wave has a short communication distance. A low-frequency RFID chip has a large occupancy capacity and its cost is high. However, because a maximum communication distance is 10 meters, the low-frequency RFID chip is suitable for remote-controlled communication. On the other hand, a high-frequency RFID chip has a short communication distance of 1 millimeter to a few centimeters. Because a total size of the high-frequency RFID chip can be made small, the chip has a small occupancy capacity and can be processed in a sheet shape, which can lower cost.

The RFID chip 20 used in the present invention does not require remote-controlled communication, and therefore, an RFID chip using high-frequency radio wave is preferable. A communication distance of the RFID chip 20 that can be preferably used is less than a few millimeters. Employment of this type of RFID chip takes into account small power consumption, avoidance of crosstalk, and compactness. Because of a small size, this RFID chip can be suitably fitted to a sheet object.

According to the first embodiment, the RFID chip 20 is attached to the document 30.

The electronic information stored in the RFID chip 20 is an image recorded on the document 30 to which the RFID chip 20 is attached. This electronic information includes image data stored in a JPEG file or a Basic Multilingual Plane (BMP) file, or electronic information generally used in a Portable Document Format (PDF) file or a Hyper Text Markup Language (HTML) file.

The receiver 12 receives electronic information of an image recorded on the document, from the RFID chip 20. In this case, as shown in FIG. 1, the RFID chip 20 attached to the document 30 is brought closer to the receiver 12, thereby receiving the electronic information from the RFID chip 20. The receiver 12 transmits the received electronic information of the image to the image processing unit 13.

The image processing unit 13 converts the electronic information of the image received from the receiver 12 into image data for output, and transmits the image data for output to the image output unit 14. The image output unit 14 receives the image data from the image processing unit 13, and outputs the image to the output medium 40.

Conventionally, the image reader 11 according to optical reading is used to convert analog document information into digital information. In optically converting document information by reading the image, physical factors such as the lens 51 and MTF characteristic of the CCD 52 are involved as shown in FIG. 2. Therefore, it is unavoidable that the quality of electronic information obtained by A/D converting the document information with the A/D converter 53 is lower than that of the document information.

On the other hand, according to the first embodiment, the electronic information received from the FFID chip 20 attached to the document 30 is directly output. Therefore, it is possible to prevent quality degradation due to conversion of the document information into digital information. Accordingly, a high-definition image can be formed on the output medium 40.

Figure 5:
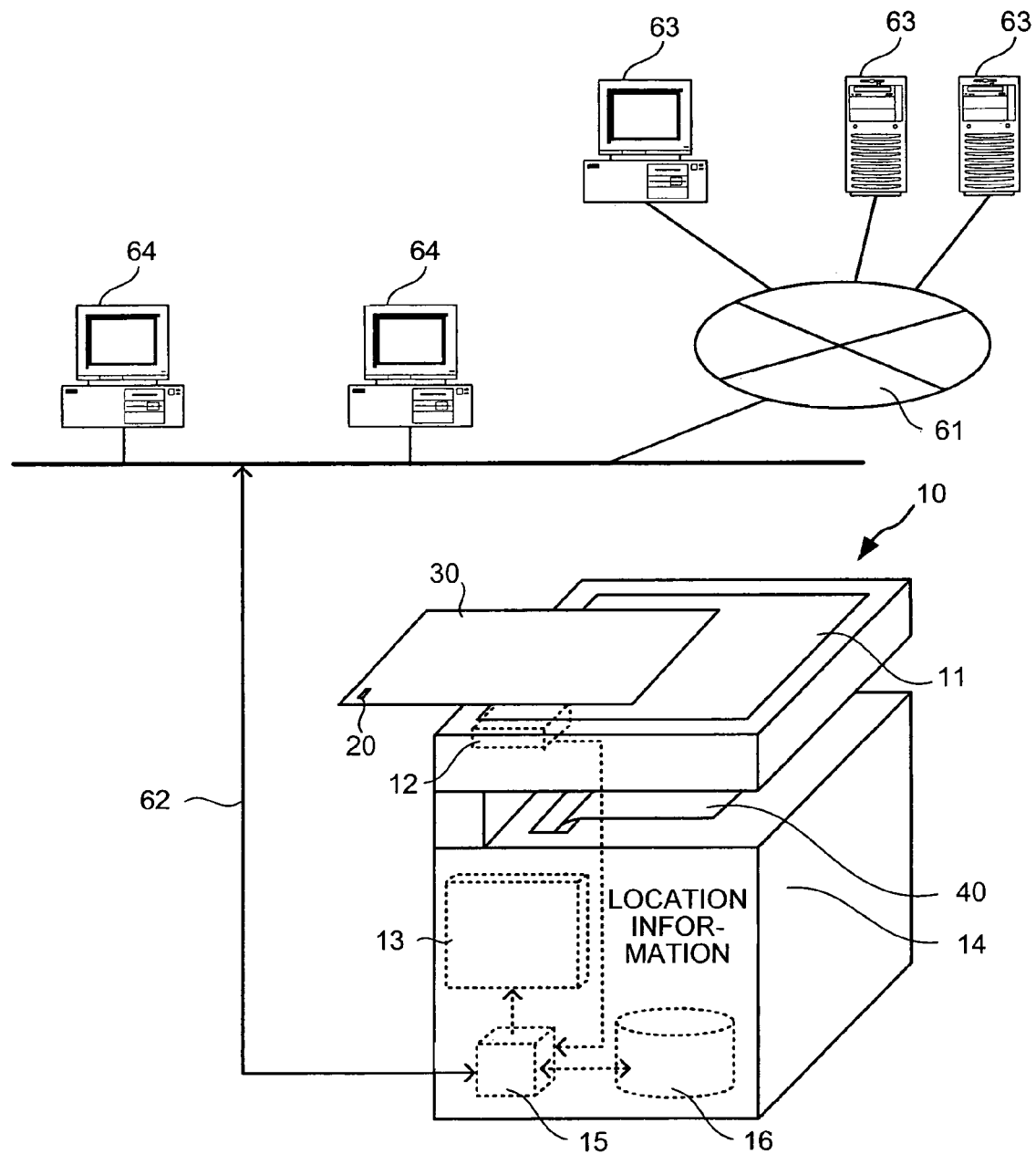
FIG. 5 is a schematic of an image output apparatus according to a second embodiment of the present invention and an external network.

FIG. 5 is a schematic of an image output apparatus according to a second embodiment of the present invention and an external network. Constituent elements having the same configurations as those of the image output apparatus according to the first embodiment are designated with like reference signs, and their explanation is omitted.

The image output apparatus according to the second embodiment includes a communication controller 15 that can transmit and receive information, and a large-capacity memory 16 having a hard disk drive (HDD) or the like.

The communication controller 15 is connected to the receiver 12 and the large-capacity memory 16. The communication controller 15 is also connected to the Internet 61, and exchanges information with an external server 63 via a local area network (LAN) 62.

According to the second embodiment, the RFID chip 20 is recorded with information that indicates location of electronic information of an image recorded on the document 30 to which the RFID chip 20 is attached, that is location information of the electronic information to be output. The location information of the electronic information is Internet address information, for example. The receiver 12 receives the location information of the electronic information to be output, from the RFID chip 20, and transmits the received location information to the communication controller 15.

When the electronic information to be output is present in the external server 63 connected to the Internet 61, the communication controller 15 accesses the external server 63 via the LAN 62, thereby obtaining the electronic information to be output. When the electronic information to be output is present in the local large-capacity memory 16, the communication controller 15 obtains the electronic information to be output, from the large-capacity memory 16.

The communication controller 15 transmits the received electronic information of the image to the image processing unit 13. The image processing unit 13 receives the electronic information of the image from the receiver 12, converts the electronic information into image data, and transmits the image data to the image output unit 14. The image output unit 14 receives the image data from the image processing unit 13, and outputs the image to the output medium 40.

According to the configuration in the second embodiment, the electronic information that the communication controller 15 receives from the external server 63 or the large-capacity memory 16 can be stored or displayed in other image output apparatus, a personal computer, or other storage 64 that is connected to the LAN 62.

According to the configuration in the first embodiment, the electronic information stored in the RFID chip 20 needs to own the electronic information to be output. Therefore, the capacity of the memory that stores information in the RFID chip 20 becomes large, which results in a large memory of the RFID chip 20 at high cost. On the other hand, according to the configuration in the second embodiment, the RFID chip 20 stores only location information of the electronic information to be output. The electronic information to be output is obtained from the external server 63 or the connected large-capacity memory 16, and a high-definition image can be formed on the output medium 40. Accordingly, the memory capacity of the RFID chip 20 can be minimized, thereby making the RFID chip 20 compact and lowering its cost.

A third embodiment of the present invention is a modification of the first embodiment. When the image recorded on the document 30 approximately coincides with the electronic information of the image recorded in the RFID chip 20, the electronic information received from the RFID chip 20 is output. There is a possibility that wrong information is recorded in the RFID chip 20, however, according to the third embodiment, the electronic information received from the RFID chip 20 is not used, thereby avoiding in advance a printing of an image based on the wrong information. The configuration of an image forming apparatus according to the third embodiment is similar to that of the image output apparatus according to the first embodiment, and therefore, explanation of the configuration is omitted.

According to the third embodiment, the electronic information stored in the RFID chip 20 is the image recorded on the document 30 to which the RFID chip 20 is attached, like in the first embodiment. The receiver 12 receives the electronic information of the image recorded on the document 30 from the RFID chip 20. The receiver 12 transmits the received electronic information of the image to the image processing unit 13.

The image reader 11 optically reads the image information of the image recorded on the document 30, and converts the analog document information into digital information.

The image processing unit 13 receives the digital data of the document from the image reader 11, and also receives the electronic information obtained from the RFID chip 20, from the receiver 12. The image processing unit 13 compares the digital data of the document with the electronic information obtained from the RFID chip 20. When the digital data and the electronic information approximately coincide with each other, the image processing unit 13 determines that the electronic information recorded in the RFID chip 20 is correct data.

When it is determined that the electronic information recorded in the RFID chip 20 is correct data, the image processing unit 13 converts the electronic information of the image received from the receiver 12 into image data for output, and transmits the image data to the image output unit 14. On the other hand, when it is determined that the electronic information recorded in the RFID chip 20 is not correct data, the image processing unit 13 forms image data for output from the digital data of the document, and transmits the image data to the image output unit 14. The image output unit 14 receives the image data from the image processing unit 13, and outputs the image to the output medium 40.

According to the third embodiment, the image is output from the electronic information obtained from the RFID chip 20, after confirming that the electronic information obtained from the RFID chip 20 coincides with the image of the document. Therefore, a high-definition image can be formed on the output medium, and a printing of an image based on wrong information can be prevented in advance.

According to a fourth embodiment of the present invention, an image output apparatus reads the image recorded on the document 30, and outputs the image to an output medium. The electronic information stored in the RFID chip 20 is configuration information of the image described in the document 30 to which the RFID chip 20 is attached. The image is read from the document in an optimum reading condition, and is output after the image is processed appropriately. According to the fourth embodiment, the image recorded on the document 30 is read to copy the document 30. Because the configuration of the document 30 to be read can be known beforehand, the image can be read in the optimum reading condition. The configuration of the image forming apparatus according to the fourth embodiment is similar to that of the image output apparatus according to the first embodiment, and therefore, explanation of the configuration is omitted.

According to the fourth embodiment, the configuration information of the image recorded in the RFID chip 20 is arrangement of text and images in the document 30, an image processing method such as halftone reproduction and line screens, number of lines, color scheme information of text, tables, and graphs, etc.

The receiver 12 receives the configuration information of the image recorded on the document 30 from the RFID chip 20. The receiver 12 transmits the received image configuration information to both the image reader 11 and the image processing unit 13.

The image reader 11 reads the image information from the document 30 in the optimum reading condition, following the configuration information of the document 30, and transmits the read image information to the image processing unit 13.

The image processing unit 13 receives the image information from the image reader 11. The image processing unit 13 processes the image information read by the image reader 11, following the configuration information of the image of the document 30, thereby forming image data to be output.

Conventionally, configuration information of the image described in the document 30 is not present. After reading the image, the image reader 11 determines and optimizes the image according to the programmed image processing, as shown in FIG. 3. Therefore, when the document includes complex text and images, types of images are recognized in error, and it is difficult to optimize the image formation at all times.

On the other hand, according to the fourth embodiment, when the electronic information stored in the RFID chip 20 is received, the configuration of the document 30 to be read can be known in advance. Therefore, the image reader 11 can read the image in the optimum reading condition, following the configuration information of the read document 30. Accordingly, the document 30 can be read in the optimum condition, and the image processing unit 13 can process the image in the optimum condition, thereby obtaining proper digital information and obtaining a high-definition copy output.

Figure 6:
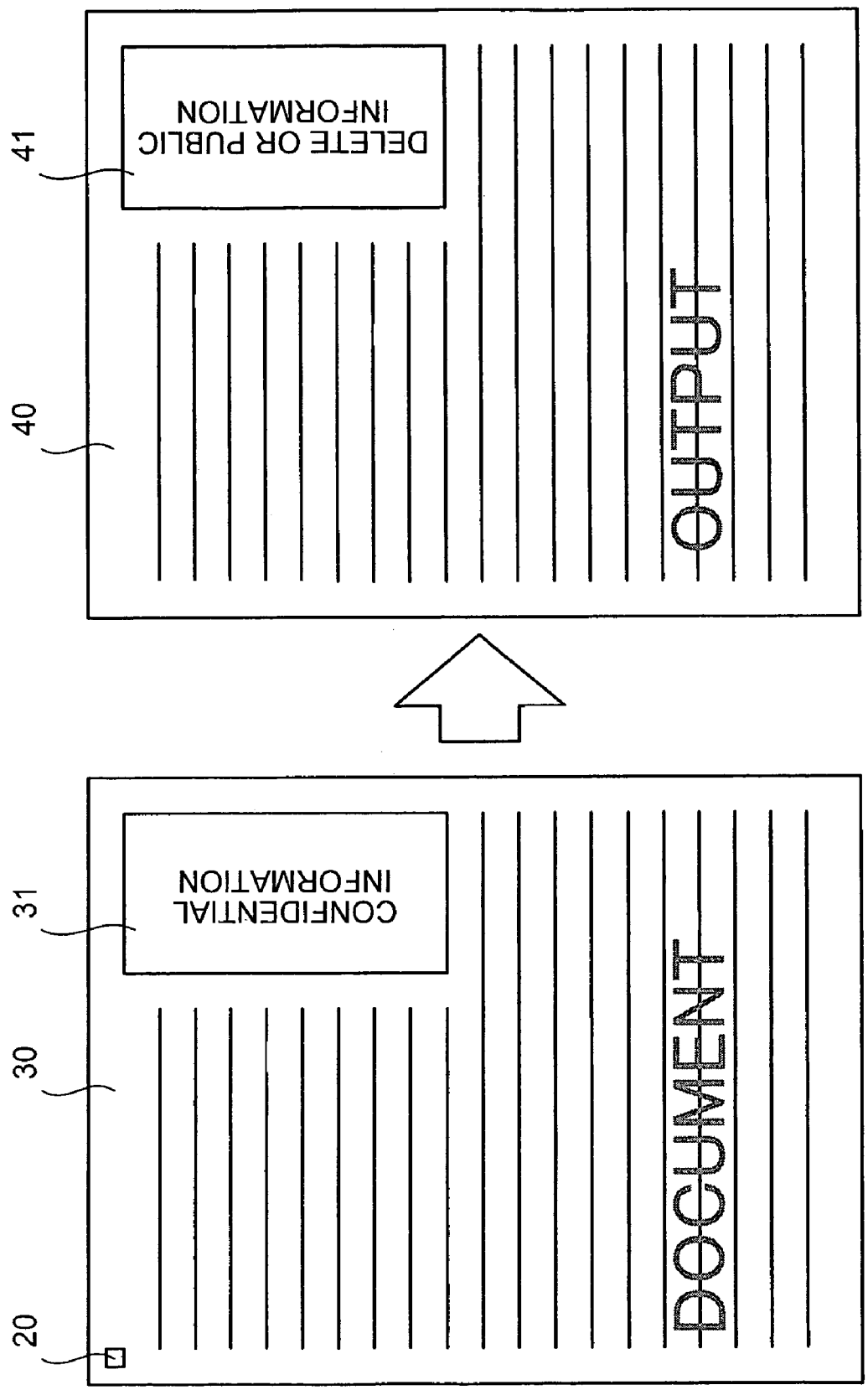
FIG. 6 is a schematic for illustrating an image of a document and an output according to a fifth embodiment of the present invention.

According to a fifth embodiment of the present invention, an image output apparatus reads the image recorded on the document 30, and outputs the read image to an output medium. The electronic information stored in the RFID chip 20 is image information corresponding to confidential information contained in the image recorded on the document 30. By removing the confidential information described in the document 30, only the information that is not necessarily confidential is copied. Specifically, as shown in FIG. 6, when it is necessary to deliver a copy of the document 30 to the other party as a result of business negotiation, for example, confidential information 31 contained in the document 30 can be excluded from the copy. The configuration of an image forming apparatus according to the fifth embodiment is similar to that of the image output apparatus according to the first embodiment, and therefore, explanation of the configuration is omitted.

According to the fifth embodiment, the document 30 contains the confidential information 31 in the image as shown in FIG. 6. The RFID chip 20 attached to the document 30 stores information that specifies a position where the confidential information 31 is described, information that substitutes the confidential information 31, and information that indicates location of the information that substitutes the configuration information.

When an operator brings the document 30 close to the image reader 11, the receiver 12 obtains the electronic information from the RFID chip 20 attached to the document 30 at the same time as when the image reader 11 reads the document. The receiver 12 transmits both the image information of the document and the electronic information received from the RFID chip 20, to the image processing unit 13.

The image processing unit 13 deletes the confidential information 31 from the image information obtained from the image reader 11 or substitutes the confidential information 31 with other information that is not necessarily confidential, based on the information obtained from the RFID chip 20, thereby forming the image data to be output, and transmits the image data to the image output unit 14. The information that is not necessarily confidential is public information 41 that is already made public, for example. The image output unit 14 outputs the received image data on paper. Accordingly, the image excluding the confidential information 31 from the image described in the document can be output to the output medium 40.

Conventionally, in outputting an image that excludes confidential information from the document containing the confidential information, an operator hides the confidential information part by filling or the like at an image reading stage. According to the fifth embodiment, such a procedure is not necessary.

Figure 7:
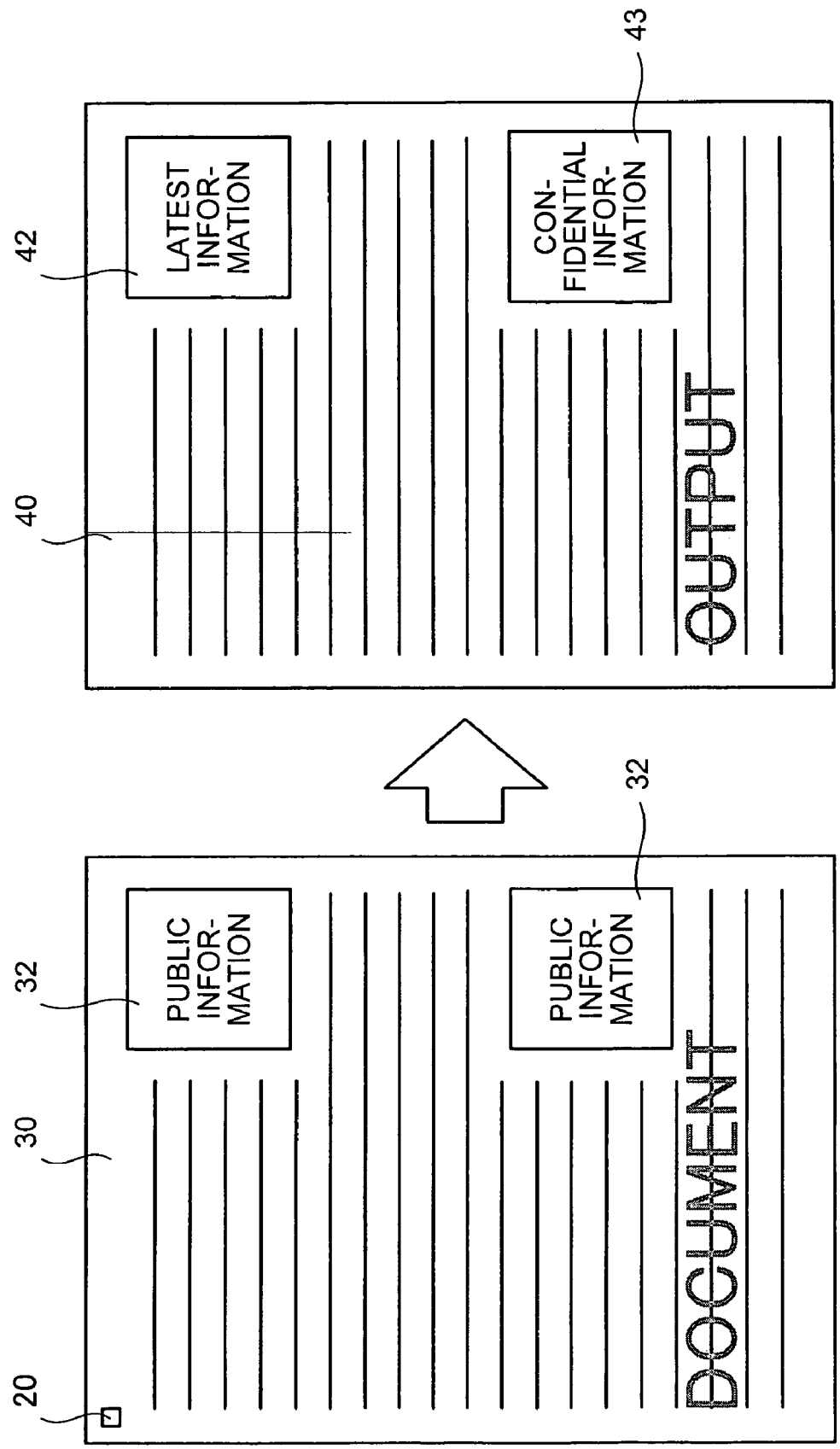
FIG. 7 is a schematic for illustrating an image of a document and an output according to a sixth embodiment of the present invention.

According to a sixth embodiment of the present invention, an image output apparatus reads an image recorded on the document 30, and outputs the image to an output medium. The electronic information stored in the RFID chip 20 is information not recorded on the document 30, and an image added with the image not recorded on the document 30 is output. Specifically, as shown in FIG. 7, latest information 42 that cannot be inserted at the time of preparing the document 30 is obtained in real time and added, and this image is output. This method can be appropriately used when an output containing the confidential information 43 as additional information to the document is necessary, although the document does not contain the confidential information 43. The configuration of an image forming apparatus according to the sixth embodiment is similar to that of the image output apparatus according to the first embodiment, and therefore, explanation of the configuration is omitted.

According to the sixth embodiment, the RFID chip 20 attached to the document 30 stores electronic information of an image to be added to the document, information concerning a position to which the electronic information is to be added, and information indicating location of the electronic information to be added. The output information contains the information that is not inserted in the document 30 as shown in FIG. 7.

When an operator brings the document 30 close to the image reader 11, the receiver 12 obtains the electronic information from the RFID chip 20 attached to the document 30 at the same time as when the image reader 11 reads the document. The receiver 12 transmits both the image information of the document and the electronic information received from the RFID chip 20, to the image processing unit 13.

The image processing unit 13 adds the image information obtained from the RFID chip 20 to the image information obtained from the image reader 11, thereby combining the image data, and transmits the image data to the image output unit 14. The image output unit 14 outputs the received image data on paper. According to the sixth embodiment, output information that contains the latest information 42 and the confidential information 43 in addition to the document information can be obtained.

According to a seventh embodiment of the present invention, an image output apparatus reads an image recorded on the document 30, and outputs the image to an output medium. The image is output in a condition suitable for the output medium 40, thereby obtaining a high-definition image output. The output medium 40 includes various kinds of mediums, each having an optimum image processing condition and an image output condition different from each other. The RFID chip 20 stores information related to the output medium 40. By reading this information, an optimum image processing condition and an image output condition are set to the output medium 40, thereby outputting a high-definition image.

Figure 8:
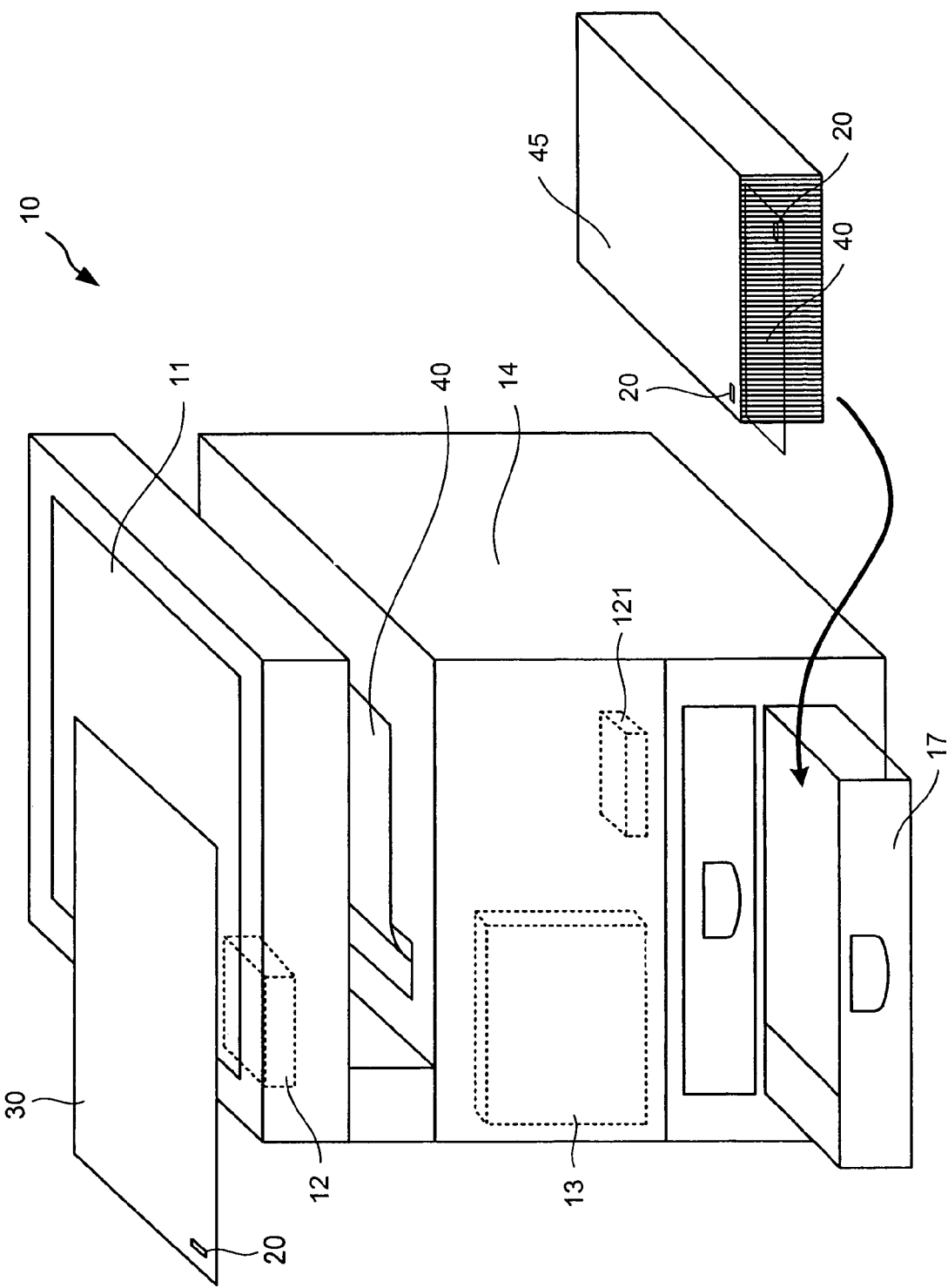
FIG. 8 is a perspective view of an image output apparatus according to a seventh embodiment of the present invention.

FIG. 8 is a perspective view of an image output apparatus according to the seventh embodiment. Constituent elements having the same configurations as those of the image output apparatus according to the first embodiment are designated with like reference signs, and their explanation is omitted. The image output apparatus according to the seventh embodiment includes a medium storage 17 that accommodates the output medium 40.

According to the seventh embodiment, the RFID chip 20 is attached to the output medium 40 or a packaging material that packs the output medium 40. When the RFID chip 20 is attached to the output medium 40, a receiver 121 that receives information from the RFID chip 20 is disposed near a route through which the output medium 40 is conveyed from the medium storage 17 accommodating the output medium 40 to the image output unit 14. When the RFID chip 20 is attached to the packaging material that packs the output medium 40, the receiver 121 is disposed near the medium storage 17 that accommodates the output medium 40.

According to the seventh embodiment, the information recorded in the RFID chip 20 is a kind and a thickness of the output medium 40, an optimum image processing condition and an optimum output condition for the output medium 40. Particularly when an image forming process is an electrophotographic process, a kind and a thickness of the output medium are important control factors in a fixing process. In order to obtain a proper output, after the image is output, it is necessary to control a nip time and a fixing temperature in the fixing. In an image forming process according to an inkjet system, it is necessary to control a liquid injection volume and an image processing method for coated paper and plain paper, respectively.

When an operator brings the document 30 closer to the image reader 11, the image reader 11 reads the document, and transmits the image information of the document to the image processing unit 13. The receiver 121 receives information concerning the output medium 40 from the RFID chip 20 that is attached to the output medium 40 or the packaging material that packs the output medium 40, and transmits the received information to both the image processing unit 13 and the image output unit 14.

The image processing unit 13 carries out an optimum processing to the image information obtained from the image reader 11, based on the information concerning the output medium 40, thereby forming image data, and outputs the image data to the image output unit 14. The image output unit 14 outputs the image data on paper in an optimum output condition, based on the information concerning the output medium 40. According to the seventh embodiment, the image processed in the optimum condition can be output to the output medium 40 in the optimum output condition. Therefore, the image can be output in high definition.

Conventionally, the operator instructs an output medium to the image output apparatus, and obtains an output image according to the image forming process suitable for the instruction. However, depending on the operator's instruction, an inappropriate image output is obtained. According to the present invention, the RFID chip 20 stores information concerning the output medium 40. By reading this information, an optimum image processing condition and an optimum image output condition can be set, thereby securely obtaining a proper image output.

According to an eighth embodiment of the present invention, an image output apparatus outputs data received from an external apparatus. The image is output in a condition suitable for the output medium 40, thereby obtaining a high-definition image output.

Figure 9:
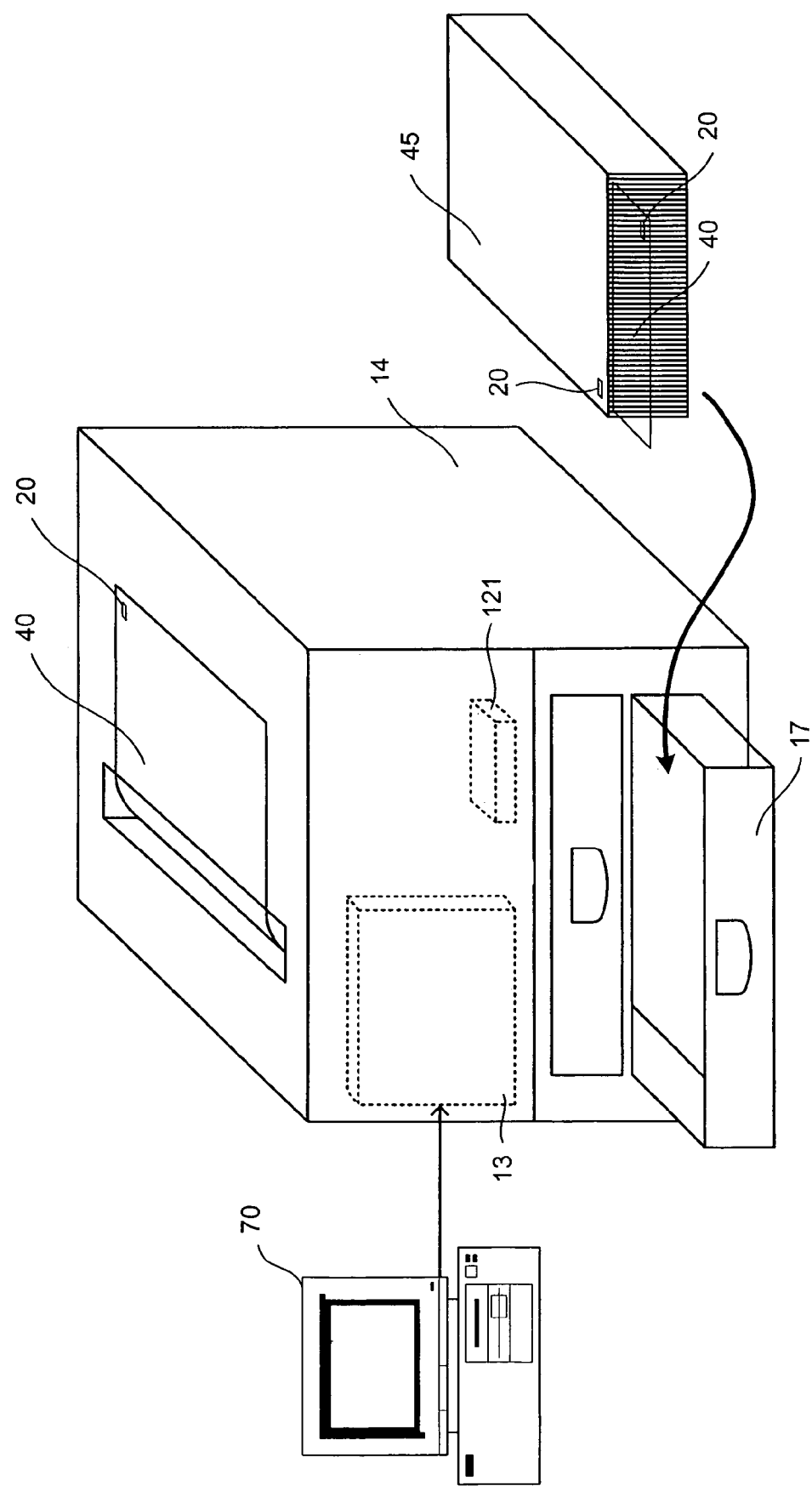
FIG. 9 is a perspective view of an image output apparatus according to an eighth embodiment of the present invention.

FIG. 9 is a perspective view of an image output apparatus according to the eighth embodiment. According to the eighth embodiment, the image output apparatus 10 includes the receiver 121 that receives information concerning an output medium from the RFID chip 20, the image processing unit 13 that receives image information of the output image from an external apparatus 70 such as a personal computer and forms image data for output, the image output unit 14 that outputs the image based on the image data, and the medium storage 17 that accommodates the output medium 40.

According to the eighth embodiment, the RFID chip 20 is attached to the output medium 40 or a packaging material that packs the output medium 40. The RFID chip 20 stores a kind and a thickness of the output medium 40, an optimum image processing condition for the output medium 40, and an optimum image output condition.

According to the eighth embodiment, a file prepared by the external apparatus 70 such as a personal computer is output. The image processing unit 13 receives the image information of the output image from the external apparatus 70.

The receiver 121 receives the information concerning the output medium 40 from the RFID chip 20 that is attached to the output medium 40 or the packaging material that packs the output medium 40, and transmits the information to both the image processing unit 13 and the image output unit 14.

The image processing unit 13 carries out an optimum processing to the image information obtained from the external apparatus 70, based on the information concerning the output medium 40, thereby forming image data, and outputs the image data to the image output unit 14. The image output unit 14 outputs the image data on paper in an optimum output condition, based on the information concerning the output medium 40. According to the eighth embodiment, the image processed in the optimum condition can be output to the output medium 40 in the optimum output condition. Therefore, the image can be output in high definition.

Conventionally, an operator instructs an output medium to the image output apparatus, and obtains an output image according to the image forming process suitable for the instruction. However, depending on the operator's instruction, an inappropriate image output is obtained. According to the present invention, the RFID chip 20 stores information concerning the output medium 40. By reading this information, an optimum image processing condition and an optimum image output condition can be set, thereby securely obtaining a proper image output.

According to a ninth embodiment of the present invention, an image output apparatus outputs data received from an external apparatus. The image output apparatus writes information concerning an image that is output to the RFID chip attached to the output medium 40.

Figure 10:
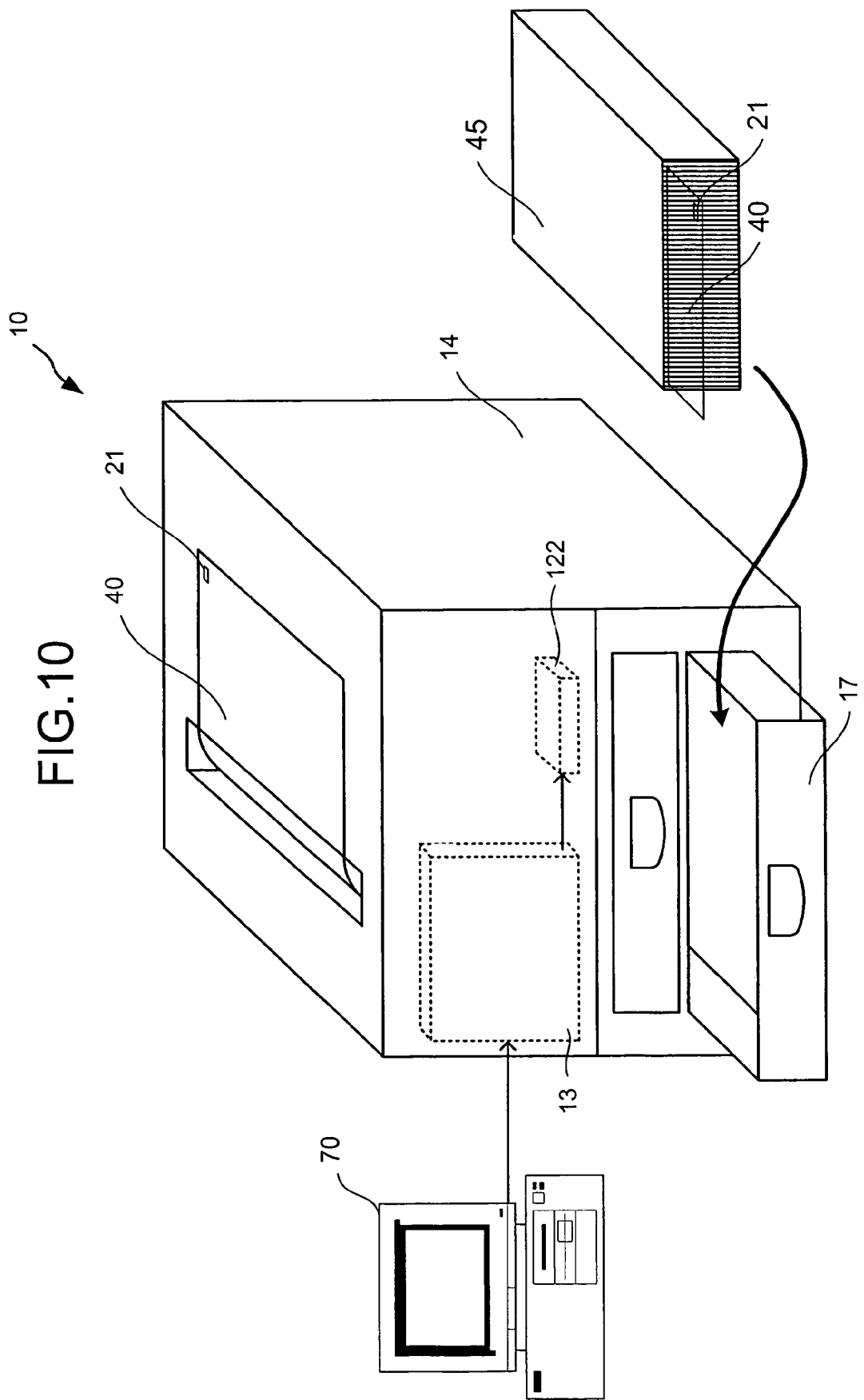
FIG. 10 is a perspective view of an image output apparatus according to a ninth embodiment of the present invention.

FIG. 10 is a perspective view of an image output apparatus according to the ninth embodiment. According to the ninth embodiment, the image output apparatus 10 includes the image processing unit 13 that receives information from the external apparatus 70 and forms image data for output, the image output unit 14 that outputs an image based on the image data, a writing unit 122 that writes the information received by the image processing unit 13 from the external apparatus 70 into an RFID chip 21, and the medium storage 17 that accommodates the output medium 40. The medium storage 17 accommodates the output medium 40 attached with the RFID chip 21 into which information can be written by radio communication.

According to the ninth embodiment, as shown in FIG. 10, in outputting a file prepared by the external apparatus 70, the writing unit 122 receives information concerning the image output from the image processing unit 13, and writes the information concerning the output image, into the RFID chip 21 that is attached to the output medium 40. The information concerning the output image can include electronic information of an output document, information indicating location of the electronic information, information concerning an image processing method and colors used for output, and logs concerning the output such as an output date and time, a place, an operator who outputs the image, and a number of sheets of output paper.

The writing unit 122 can write information either before or after the image output unit 14 outputs the image.

According to the ninth embodiment, when the output of the image is to be used as a document, a high-definition output can be obtained by reading the information from the RFID chip 21 attached to the output and reflecting the read image to the output image. An added value of the output to be used at the next step can be increased.

According to a tenth embodiment of the present invention, an image output apparatus outputs data received from an external apparatus. The image output apparatus writes information concerning an image that is output to the RFID chip. This RFID chip is attached to the output medium 40.

Figure 11:
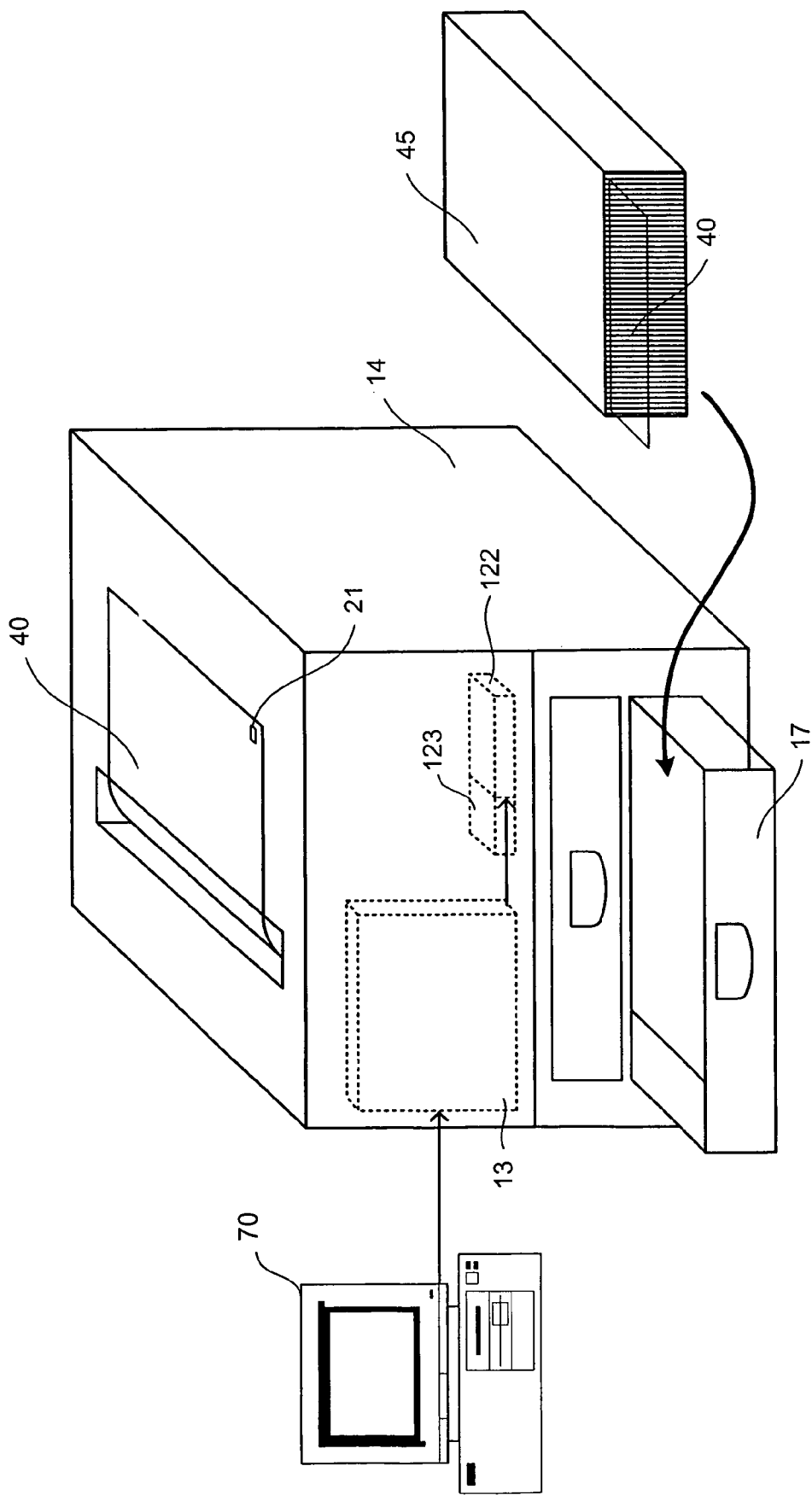
FIG. 11 is a perspective view of an image output apparatus according to a tenth embodiment of the present invention.

FIG. 11 is a perspective view of an image output apparatus according to the tenth embodiment. According to the tenth embodiment, the image output apparatus 10 includes the image processing unit 13 that receives information from the external apparatus 70 and forms image data for output, the image output unit 14 that outputs an image based on the image data, the writing unit 122 that writes the information received by the image processing unit 13 from the external apparatus 70 into an RFID chip 21, an RFID chip adding unit 123 that attaches the RFID chip 21, into which the information is written by the writing unit 122, to the output medium 40, and the medium storage 17 that accommodates the output medium 40.

According to the tenth embodiment, as shown in FIG. 11, in outputting a file prepared by the external apparatus 70 such as a personal computer, the writing unit 122 receives information concerning the image output from the image processing unit 13, and writes the information concerning the output image, into the RFID chip 21 by radio communication. The information concerning the output image can include electronic information of the output image, information indicating location of the electronic information, information concerning an image processing method and colors used for output, and logs concerning the output such as an output date and time, a place, an operator who outputs the image, and a number of sheets of output paper.

The RFID chip adding unit attaches the RFID chip 21, into which this information is written, to the output medium 40. The RFID chip 21 can be attached either before or after the image output unit 14 outputs the image.

According to the tenth embodiment, when the output of the image is to be used as a document, a high-definition output can be obtained by reading the information from the RFID chip 21 attached to the output and reflecting the read image to the output image. An added value of the output to be used at the next step can be increased.

Figure 12:
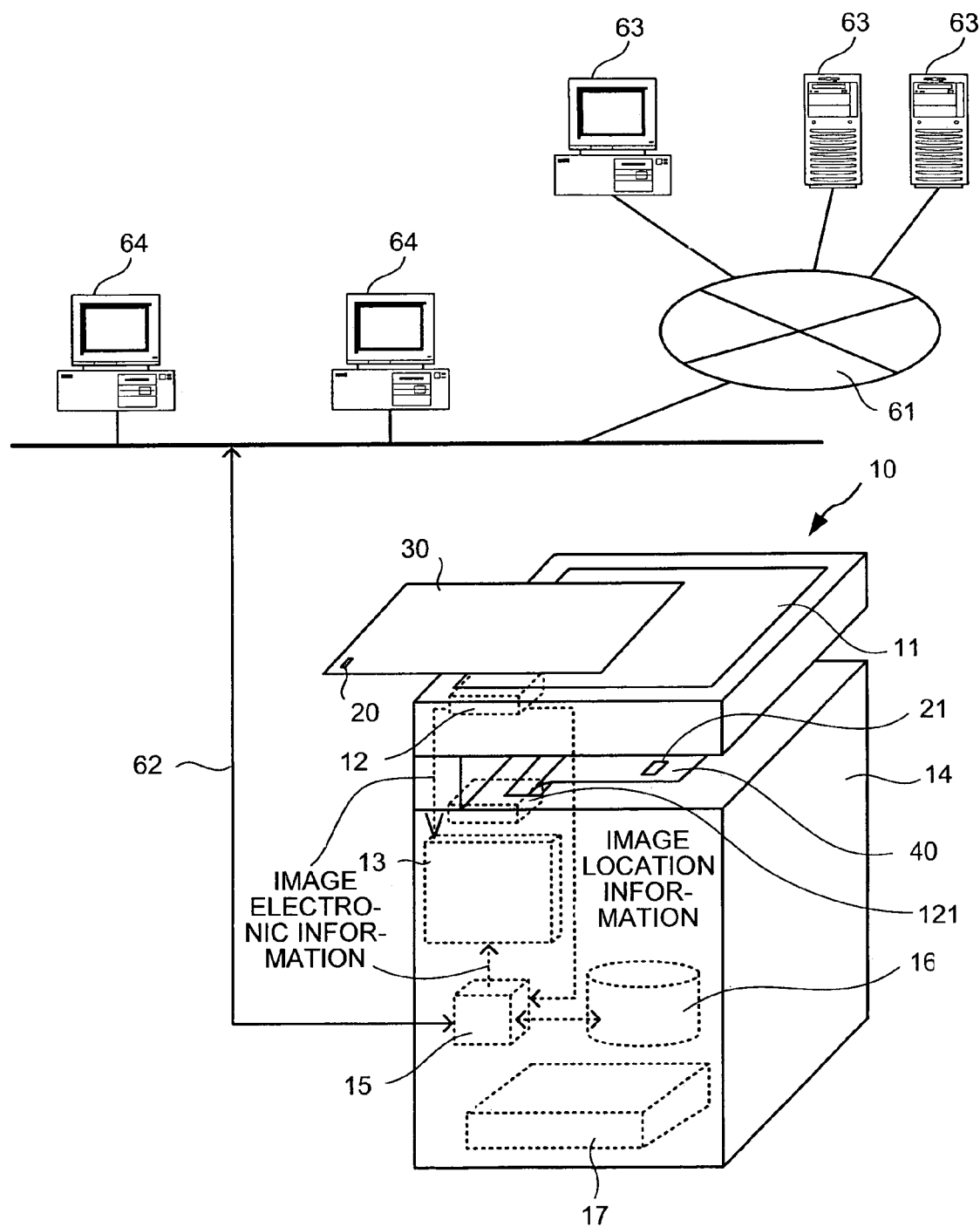
FIG. 12 is a schematic for illustrating an image of a document and an output according to an eleventh embodiment of the present invention.

FIG. 12 is a schematic for illustrating an image of a document and an output according to an eleventh embodiment of the present invention. The image output apparatus 10 receives information from the RFID chip 20 attached to the document 30, by radio communication, determines an output image based on the information, and outputs the output image to the output medium 40. When the RFID chip 20 is not attached to the document 30, the image output apparatus 10 reads the image described in the document 30, and copies the image to the output medium 40.

According to the eleventh embodiment, the image output apparatus 10 receives information from the RFID chip 21 attached to the output medium 40, by radio communication, and outputs the image in a condition suitable for the output medium 40. When the RFID chip 21 is not attached to the output medium 40, the image is output in an initial condition or in a condition set by an operator.

The RFID chips 20 and 21 according to the eleventh embodiment are explained. The RFID chips 20 and 21 electronically hold information, and non-contact transmit the information according to electromagnetic inductance. The RFID chips 20 and 21 include a radio communication function and a memory that stores information. In the explanation below, signs 20 and 21 are referred to only as RFID chips. FIG. 4 is the block diagram of the configuration of the RFID chip 20. The RFID chip 20 (the RFID chip 20 has the same configuration) mainly includes the antenna 201, the power source 203, and the memory 208. The RFID chips 20 and 21 are provided according to a known technique, and have the following operation. The antenna 201 induces a current from a radio wave given from the outside, and accumulates a charge into the power source 203. By using power obtained from the charge accumulated in the power source 203, information stored in the memory 208 is transmitted from the antenna 201 in a radio wave. The memory 208 can be any one of a read-only memory and a readable-writable memory. A semiconductor memory is usually used for the memory 208.

In general, a communication distance of the RFID chip is determined based on a frequency of a radio wave. A low-frequency radio wave has a long communication distance, and a high-frequency radio wave has a short communication distance. A low-frequency RFID chip has a large occupancy capacity and its cost is high. However, because a maximum communication distance is 10 meters, the low-frequency RFID chip is suitable for remote-controlled communication. On the other hand, a high-frequency RFID chip has a short communication distance of 1 millimeter to a few centimeters. Because a total size of the high-frequency RFID chip can be made small, the chip has a small occupancy capacity and can be processed in a sheet shape, which can lower cost.

According to the eleventh embodiment, in order to avoid a leakage of information stored in the RFID chip 20 to the outside of the apparatus at the time of radio communication, the RFID chip 20 having directivity is attached to the document 30.

Figure 13:
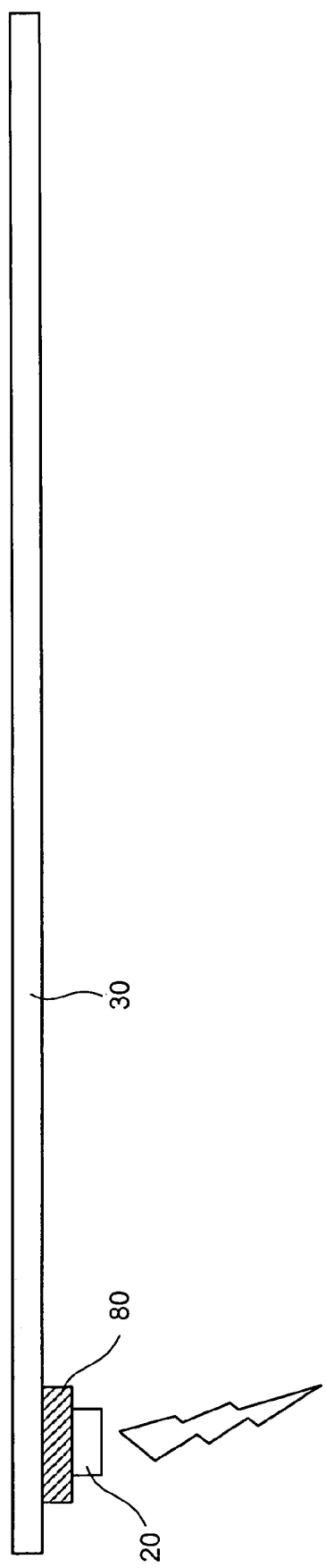
FIG. 13 is a cross section of a document according to the eleventh embodiment.

FIG. 13 is a cross section of a document 30 according to the eleventh embodiment. An image is recorded on the surface of the document 30. In FIG. 13, a reference numeral 80 denotes a shielding member, which is adhered to the surface of the document 30. The RFID chip 20 is attached to the top of the shielding member 80. According to the eleventh embodiment, the RFID chip 20 is fixed to the surface of the document 30 via the shielding member 80, thereby providing the RFID chip 20 with directivity. Among a radio wave transmitted from the RFID chip 20, the radio wave transmitted toward the reverse side of the document 30 is interrupted by the shielding member 80. Therefore, the radio wave transmitted from the RFID chip 20 is directed to only the front side, and is not directed to the reverse side.

As shown in FIG. 12, according to the eleventh embodiment, the image output apparatus 10 includes the image reader 11 that reads image information from the document 30, the receiver 12 that obtains necessary information by communicating with the RFID chip 20 attached to the document 30, the receiver 121 that obtains necessary information by communicating with the RFID chip 21 attached to the output medium 40, the image processing unit 13 that converts the image information into data for output, the image output unit 14 that writes information into the output medium 40, the communication controller 15 that exchanges information via the network, the large-capacity memory 16, and the medium storage 17 that accommodates the output medium 40.

Figure 14:
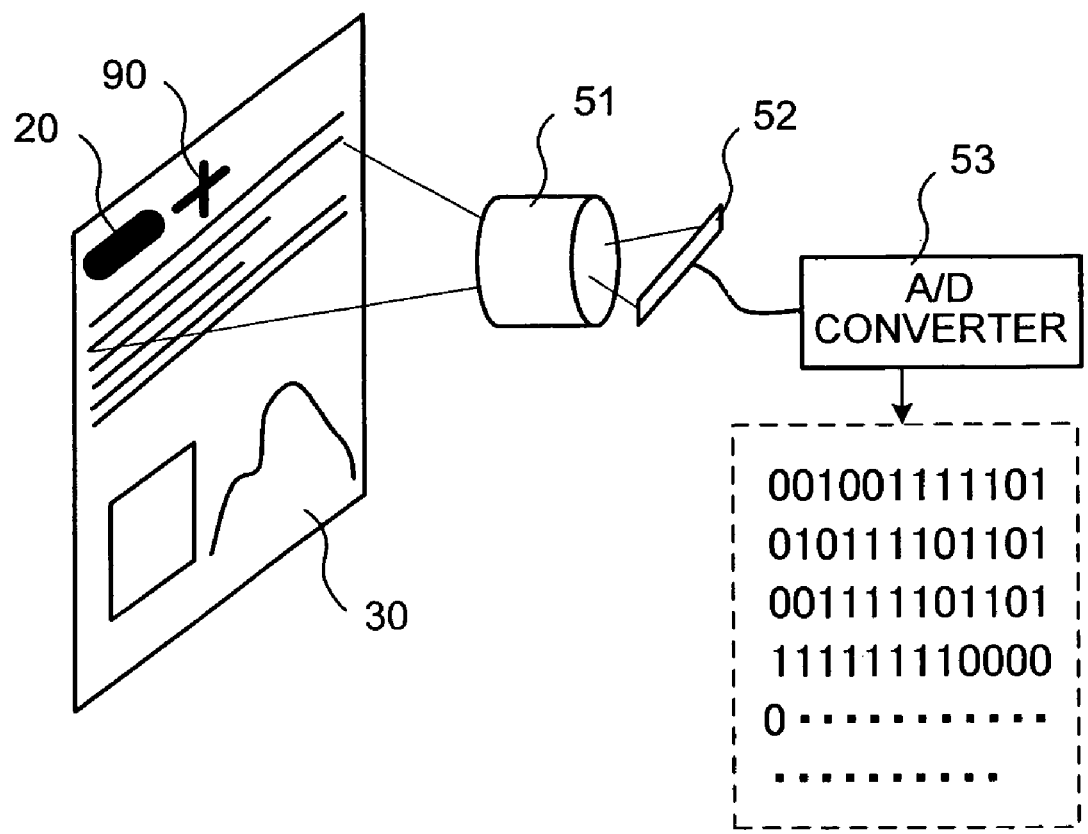
FIG. 14 is a block diagram of an image reader according to the eleventh embodiment.

The image reader 11 reads the image information from the document 30. FIG. 14 is a block diagram of an image reader 11 according to the eleventh embodiment. The image reader 11 has the lens 51, the CCD 52, and the A/D converter 53. The lens 51 optically reads image information of an image recorded on the document 30, and stores the read analog data into the CCD 52. The A/D converter 53 converts the read analog data into digital data. This digital data is transmitted to the image processing unit 13.

The image processing unit 13 converts the image that the receiver 12 obtains from the RFID chip 20 or the image processing unit 13, into image data for output. FIG. 3 is the block diagram of the configuration of the image processing unit 13. The image processing unit 13 inputs data from the input I/F 131, determines and optimizes the data according to a programmed image processing, converts the data into image data for output; and transmits the image data to the image output unit 14.

The image output unit 14 outputs the image based on the image data formed by the image processing unit 13. The image output unit 14 outputs the image based on an electrophotographic system, an inkjet system, or the like. The output medium 40 covers plain paper, coated paper, an OHP sheet or the like.

The communication controller 15 is connected to the Internet 61, and exchanges information with the external server 63 via the LAN 62. The communication controller 15 controls exchanges of information with the large-capacity memory 16. The communication controller 15 receives information from the receiver 12, and obtains information relevant to the information received from the receiver 12, from the Internet 61 or the large-capacity memory 16.

Figure 15:
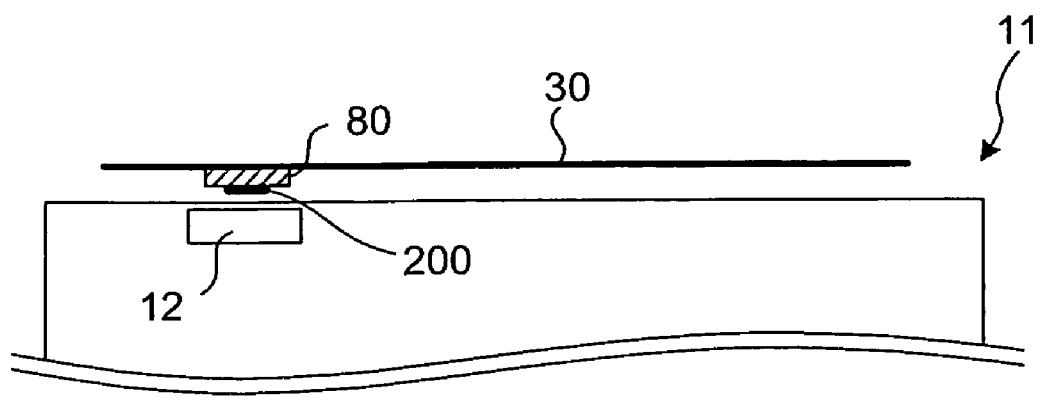
FIG. 15 is a cross section of the image reader according to the eleventh embodiment.

FIG. 15 is a cross section of the image reader 11 according to the eleventh embodiment. In FIG. 15, the document 30 recorded with the image is faced downward, and is disposed at a predetermined reading position of the image reader 11. When the operator sets the document 30 to the predetermined reading position and presses a start button, the receiver 12 transmits a radio wave. The RFID chip 20 set to the document 30 induces a current in the antenna 201 from the radio wave given from the receiver 12, and accumulates a charge into the power source 203. By using power obtained from the charge accumulated in the power source 203, the RFID chip 20 transmits information stored in the memory 208 from the antenna 201 using the radio wave. The receiver 12 receives the information from the RFID chip 20. During the communication, the shielding member 80 interrupts the radio wave transmitted from the RFID chip 20 toward the reverse side of the document 30. Therefore, the information can be prevented from being leaked to the outside.

The image processing unit 13 forms image data of an image to be output according to the information received from the RFID chip 20, by using this information.

For example, when the information received from the RFID chip 20 is electronic information of the image to be output, the receiver 12 transmits the information received from the RFID chip 20, directly to the image processing unit 13. The electronic information of the image to be output includes image data stored in a JPEG file or a BMP file, or electronic information generally used in a PDF file or an HTML file. The image processing unit 13 converts the electronic information of the image received from the receiver 12 into imaged data for output, and transmits the image data to the image output unit 14. When the information received from the RFID chip 20 is the electronic information of the image for output, the image can be directly output from the received electronic information. Therefore, it is possible to prevent quality degradation due to the conversion of the document information into digital information. Accordingly, a high-definition image can be formed on the output medium 40.

When the information received from the RFID chip 20 is location information of the electronic information for output, the receiver 12 transmits the received location information to the communication controller 15. When the electronic information to be output is in the external server 63 on the Internet 61, the communication controller 15 accesses the external server 63 via the LAN 62, and obtains the electronic information to be output. When the electronic information to be output is present in the local large-capacity memory 16, the communication controller 15 obtains the electronic information to be output, from the large-capacity memory 16. The communication controller 15 transmits the received electronic information of the image to the image processing unit 13. The image processing unit 13 receives the electronic information of the image from the receiver 12, converts the electronic information into image data, and transmits the image data to the image output unit 14. When the information received from the RFID chip 20 is location information of the electronic information for output, the electronic information to be output is obtained from the external server 63 or the connected large-capacity memory 16. Therefore, a high-definition image can be formed on the output medium 40. Because only the location information of the output image is recorded in the RFID chip 20, the memory capacity of the RFID chip 20 can be minimized, thereby making the RFID chip 20 compact and lowering its cost.

When the information received from the RFID chip 20 is configuration information of the image described in the document 30, the receiver 12 transmits the received configuration information to both the image reader 11 and the image processing unit 13. The configuration information of the image refers to arrangement of text and images in the document 30, an image processing method such as halftone reproduction and line screens, number of lines, color scheme information of text, tables, and graphs, etc. The image reader 11 reads the image information from the document 30 in an optimum reading condition according to the configuration information of the document 30, and transmits the read image information to the image processing unit 13. The image processing unit 13 processes the image information read by the image reader 11, following the configuration information of the image of the document 30, thereby forming the image data to be output. When the information received from the RFID chip 20 is the configuration information of the image described in the document 30, the configuration of the document 30 to be read can be known in advance. Therefore, the image reader 11 can read the image information in an optimum reading condition following the configuration information of the document 30 to be read. When the document includes complex text and images, types of images are recognized in error, and it is difficult to optimize the image formation at all times. However, the image processing unit 13 can process the image in an optimum condition following the configuration information of the document 30 to be read. Accordingly, the document 30 can be read in the optimum condition, and the image processing unit 13 can process the image in the optimum condition, thereby obtaining proper digital information and obtaining a high-definition copy output.

When the information received from the RFID chip 20 is information of the image corresponding to confidential information contained in the image recorded on the document 30, the image processing unit 13 deletes the confidential information 31 from the image information obtained from the image reader 11 or substitutes the confidential information 31 with other information that is not necessarily confidential, thereby forming the image data to be output, and transmits the image data to the image output unit 14. The information that is not necessarily confidential is the public information 41 that is already made public, for example. When the document 30 contains the confidential information 31 as shown in FIG. 6, the output image that excludes this confidential information 31 or substitutes this confidential information with the public information 41 can be obtained.

When the information received from the RFID chip 20 cannot be inserted into the document 30 at the time of preparing the document, the image processing unit 13 forms the image data added with the information, and transmits the image data to the image output unit 14. The information that cannot be inserted at the time of preparing the document 30 refers to confidential information and latest information such as real time information. For example, as shown in FIG. 7, the latest information 42 that cannot be inserted at the time of preparing the document 30 is obtained in real time and added, and this image is output. This confidential information 43 can be added to the document when necessary, although the document does not contain the confidential information 43.

When the RFID chip 20 is not attached to the document 30, the image reader 11 reads the image information from the document 30, converts the read analog information into digital information, and transmits the digital information to the image processing unit 13. The image processing unit 13 forms the image data to be output from the received digital data, and transmits the digital data to the image output unit 14.

When the RFID chip 21 recorded with information concerning the output medium 40 is attached to the output medium 40, the receiver 121 obtains this information from the RFID chip 21 by radio communication, and transmits the information to the image output unit 14. The information recorded in the RFID chip 21 is a kind and a thickness of the output medium 40, an optimum image processing condition and an optimum output condition for the output medium 40. Particularly when an image forming process is an electrophotographic process, a kind and a thickness of the output medium are important control factors in a fixing process. In order to obtain a proper output, after the image is output, it is necessary to control a nip time and a fixing temperature in the fixing. In an image forming process according to an inkjet system, it is necessary to control a liquid injection volume and an image processing method for coated paper and plain paper, respectively. The output medium 40 includes various kinds of mediums, each having an optimum image processing condition and an image output condition different from each other. The RFID chip 20 stores information related to the output medium 40. By describing information concerning the output medium 40 in the RFID chip 21, and by reading this information, an optimum image processing condition and an image output condition are set to the output medium 40, thereby outputting a high-definition image.

The image output unit 14 sets an output condition following the information concerning the output medium 40 received from the RFID chip 21, and outputs the image data formed by the image processing unit 13 to the output medium 40.

As explained above, according to the eleventh embodiment, of the radio wave transmitted from the RFID chip 20, the radio wave directed to the reverse side of the document 30 is interrupted by the shielding member 80, and this radio wave does not reach the reverse side. Accordingly, the radio wave transmitted from the RFID chip 20 can be prevented from being received at the outside of the apparatus, thereby preventing the leakage of the information to the outside. Further, crosstalk inside the apparatus can be prevented.

According to a twelfth embodiment of the present invention, a communication distance of the RFID chip 20 attached to the document 30 and a communication distance of the RFID chip 21 attached to the output medium 40 are limited, respectively. A configuration of an image output apparatus according to the present embodiment is similar to that of the image output apparatus according to the first embodiment, and therefore, explanation of the configuration is omitted.

When a communication distance of the RFID chip is long, crosstalk occurs between this RFID chip and the RFID chip 21 attached to printed paper in storage or printed paper that is being output. Further, information is leaked to the outside of the image output apparatus. According to the twelfth embodiment, by limiting the communication distance of the RFID chips 20 and 21, respectively, crosstalk or leakage of information to the outside can be prevented. A communication distance is determined based on a frequency of a radio wave, and the communication distance becomes shorter when the frequency is higher. According to the present embodiment, the radio wave has a high frequency, thereby shortening a communication distance, which lowers power consumption. According to the twelfth embodiment, a communication distance of the RFID chips 20 and 21 is preferably 1 millimeter to a few centimeters.

As explained above, according to the twelfth embodiment, by limiting the communication distance of the RFID chip 20 attached to the document 30 and the communication distance of the RFID chip 21 attached to the output medium 40, respectively, reception of a radio wave at the outside of the apparatus can be prevented, and leakage of information to the outside can be prevented. Further, crosstalk within the apparatus can be prevented. Because the RFID chips based on a high-frequency radio wave are used, cost of the RFID chips can be decreased and power consumption can be reduced.

According to a thirteenth embodiment, in order to prevent a radio wave transmitted from the RFID chip 20 attached to the document 30 from being received at the outside of the apparatus, a communication time controller that controls the communication time of the RFID chip 20 is provided in the image output apparatus 10. The communication time controller (not shown) is incorporated inside the receiver 12 of the image output apparatus 10. A configuration of the image output apparatus according to the present embodiment is similar to that of the image output apparatus according to the eleventh embodiment, and therefore, explanation of the configuration is omitted.

The operation of the image output apparatus according to the thirteenth embodiment is explained below. First, an operator sets the document 30 to a predetermined reading position, and presses a start button.

The communication time controller incorporated in the receiver 12 transmits a radio wave to the receiver 12 for only a predetermined time after the start button is pressed. The RFID chip 20 induces a current in the antenna 201 shown in FIG. 4 from the radio wave given from the receiver 12, and accumulates a charge into the power source 203. By using power obtained from the charge accumulated in the power source 203, information stored in the memory 208 is transmitted from the antenna 201 in a radio wave. The receiver 12 receives the radio wave transmitted from the antenna 201, thereby receiving the information recorded in the RFID chip 20.

The image output apparatus 10 outputs a value-added image according to the information received from the RFID chip 20, by using this information.

As explained above, according to the thirteenth embodiment, the communication time controller incorporated in the receiver 12 controls the communication time between the receiver 12 and the RFID chip 20. Therefore, the communication time, during which there is a risk of reception of information at the outside of the apparatus, can be minimized. Accordingly, a risk of leakage of information to the outside can be reduced, and power consumption of the receiver 12 can be reduced.

A fourteenth embodiment of the present invention is a modification of the thirteenth embodiment. A communication time between the RFID chip 20 and the receiver 12 is determined based on read information in the image reader. A configuration of an image output apparatus according to the present embodiment is similar to that of the image output apparatus according to the eleventh embodiment except the image reader 11, and therefore, explanation of the configuration is omitted.

Figure 16:
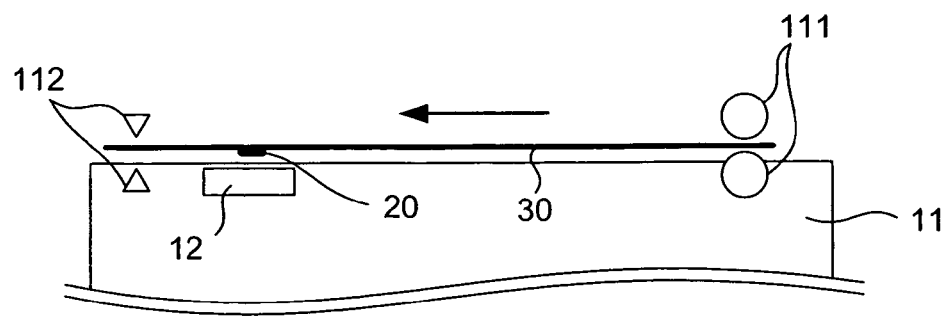
FIG. 16 is a cross section of an image reader according to a fourteenth embodiment of the present invention.

FIG. 16 is a cross section of an image reader 11 according to the fourteenth embodiment. According to the fourteenth embodiment, the image reader 11 has a pair of conveyer rollers 111 that convey the document 30 to a predetermined reading position, and a sensor 112 provided on a conveyer line of the document 30.

When the operator inserts the document into a document inserting part (not shown), the conveyer roller 11 start rotating, and the document 30 is sandwiched between the pair of conveyer roller 111 and is conveyed to a predetermined reading position.

When the sensor 112 incorporated in the image reader 11 confirms the conveyance of the document 30, the communication time controller determines that the receiver 12 is sufficiently close to the RFID chip 20 attached to the document 30. The communication time controller transmits a radio wave to the receiver 12 for only a predetermined time after the sensor 112 confirms the document 30. The RFID chip 20 induces a current in the antenna 201 shown in FIG. 4 from the radio wave given from the receiver 12, and accumulates a charge into the power source 203. By using power obtained from the charge accumulated in the power source 203, information stored in the memory 208 is transmitted from the antenna 201 in a radio wave. The receiver 12 receives the radio wave transmitted from the antenna 201, thereby receiving the information recorded in the RFID chip 20.

According to the fourteenth embodiment, the communication time controller incorporated in the receiver 12 enables the receiver 12 and the RFID chip 20 to communicate each other after the document 30 is conveyed to a predetermined position of the image reader 11. Therefore, the receiver 12 and the RFID chip 20 can communicate each other in a state that they are sufficiently close to each other. At the same time, a time during which there is a risk of reception of information at the outside of the apparatus can be minimized. Accordingly, a risk of leakage of information to the outside can be reduced, and power consumption of the receiver 12 can be reduced.

According to a fifteenth embodiment of the present invention, a shielding member 100 covers the inside of an image output apparatus, thereby limiting the transmission of information to the outside of the apparatus.

Figure 17:
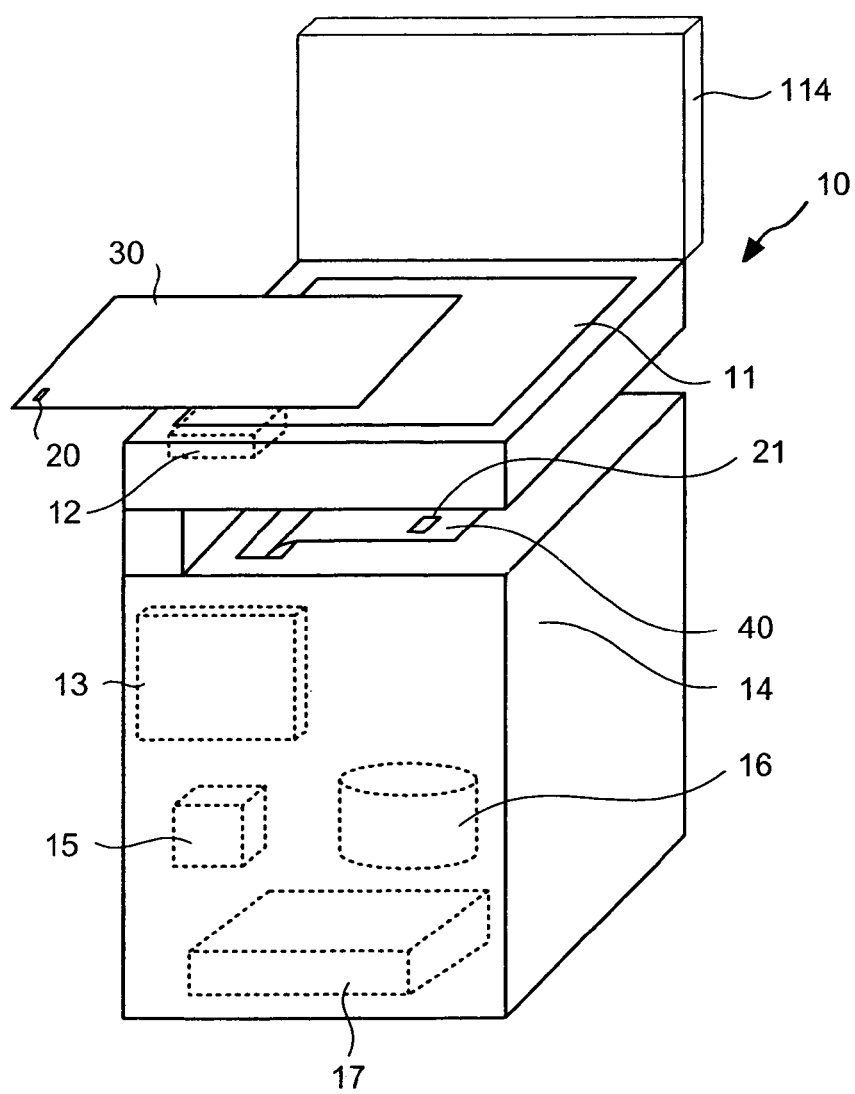
FIG. 17 is a perspective view of an image output apparatus according to a fifteenth embodiment of the present invention.

FIG. 17 is a perspective view of an image output apparatus according to the fifteenth embodiment. Constituent elements having the same configurations as those of the image output apparatus according to the eleventh embodiment are designated with like reference signs, and their explanation is omitted. According to the fifteenth embodiment, an openable and closable platen cover 114 that presses the document 30 is disposed in the image reader 11.

An operator sets the document 30 to a predetermined reading position in a state that the platen cover 114 is open. After the document 30 is set to the predetermined reading position, the operator closes the platen cover 114 to sandwich the document 30 between the image reader 11 and the platen cover 114, and presses the start button.

Figure 18:
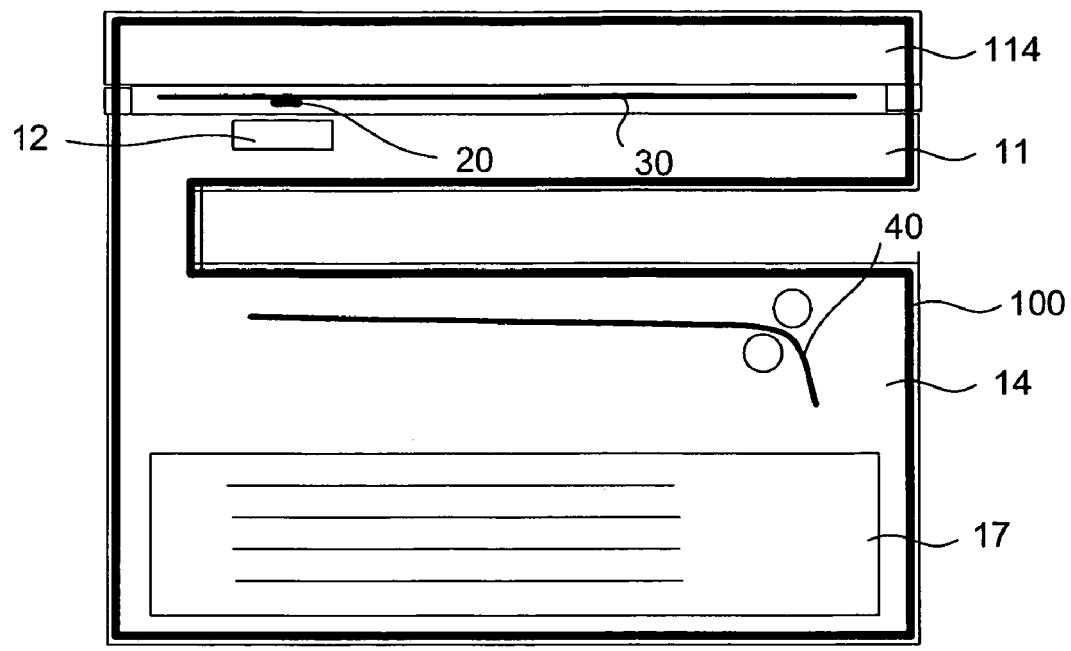
FIG. 18 is a cross section of the image output apparatus according to the fifteenth embodiment.

FIG. 18 is a cross section of the image output apparatus according to the fifteenth embodiment. In FIG. 18, the platen cover 114 in a closed state. When the platen cover 114 is closed, the inside of the image output apparatus is covered by the shielding member 100 that interrupts a radio wave. According to the fifteenth embodiment, the receiver 12 and the RFID chip 20 are shielded from the outside of the apparatus with the shielding member 100. The receiver 12 and the RFID chip 20 communicate with each other within the electrically shielded space.

When the start button is pressed, the receiver 12 receives information from the RFID chip 20 by radio communication. The receiver 12 and the RFID chip 20 communicate to each other in a state that the platen cover 114 is closed. The shielding member 100 shields the radio wave transmitted from the RFID chip 20, so that the radio wave does not reach the outside of the apparatus.

As explained above, according to the fifteenth embodiment, the image output apparatus shields the inside of the apparatus with the shielding member 100. Therefore, even when the RFID chip 20 transmits a radio wave inside the apparatus, reception of the radio wave from the RFID chip 20 at the outside of the apparatus can be prevented, and leakage of information to the outside can be prevented.

According to a sixteenth embodiment of the present invention, in order to prevent occurrence of crosstalk inside the apparatus, the shielding member 100 is provided between the receiver 12 and the RFID chip 20 and the image output unit 14. Constituent elements having the same configurations as those of the image output apparatus according to the fifteenth embodiment are designated with like reference signs, and their explanation is omitted.

Figure 19:
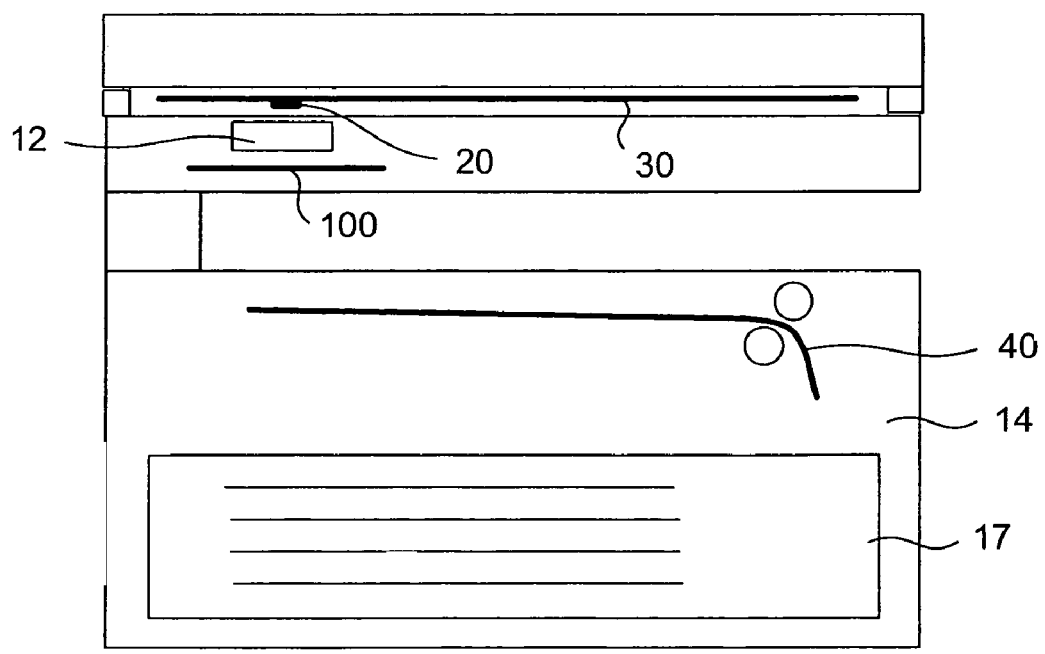
FIG. 19 is a cross section of an image output apparatus according to a sixteenth embodiment of the present invention.

FIG. 19 is a cross section of an image output apparatus according to the sixteenth embodiment. The image output unit 14 accommodates members such as the RFID chip 21 attached to the output medium 40 having a possibility of crosstalk with the receiver 12. According to the sixteenth embodiment, the image output apparatus has the shielding member 100 provided between the receiver 12 and the image output unit 14, in order to prevent a radio wave transmitted from the receiver 12 and a radio wave transmitted from the RFID chip 20 attached to the document 30 from reaching a member having a possibility of crosstalk accommodated in the image output unit 14.

An operator sets the document 30 to a predetermined reading position in a state that the platen cover 114 is open as shown in FIG. 17. After the document 30 is set to the predetermined reading position, the operator closes the platen cover 114 to sandwich the document 30 between the image reader 11 and the platen cover 114, and presses the start button.

When the start button is pressed, the receiver 12 receives information from the RFID chip 20 by radio communication. During communication, the receiver 12 and the RFID chip 20 transmit radio waves. However, the shielding member 100 shields the radio waves transmitted from the receiver 12 and the RFID chip 20. Therefore, it is possible to prevent the radio waves transmitted from the receiver 12 and the RFID chip 20 from reaching the image output unit 14.

As explained above, according to the sixteenth embodiment, the shielding member 100 prevents the radio waves transmitted from the receiver 12 and the RFID chip 20 from reaching the image output unit 14. Therefore, crosstalk inside the apparatus can be prevented.

According to a seventeenth embodiment of the present invention, an image output apparatus outputs data received from an external apparatus, and writes information concerning the output image to the RFID chip 21 attached to the output medium 40. At the time of writing the information to the RFID chip 21, leakage of the information to the outside is prevented. According to the eleventh to the sixteenth embodiments, an image that reflects the electronic information received from the RFID chip 20 attached to the document 30 is output, thereby forming a high-definition image on the output medium 40. According to the seventeenth embodiment, information concerning the output image is written into the RFID chip 21 attached to the output medium 40 so that the obtained output can be similarly used at the next stage.

As shown in FIG. 10, according to the seventeenth embodiment, the image output apparatus 10 includes the image processing unit 13 that receives information from the external apparatus 70 and forms image data for output, the image output unit 14 that outputs an image based on the image data, the writing unit 122 that writes the information received by the image processing unit 13 from the external apparatus 70 into the RFID chip 21, and the medium storage 17 that accommodates the output medium 40. The medium storage 17 accommodates the output medium 40 attached with the RFID chip 21 into which information can be written by radio communication.

According to the seventeenth embodiment, a file prepared by the external apparatus 70 such as a personal computer is output. The image processing unit 13 receives image information of the image output from the external apparatus 70.

The writing unit 122 writes information concerning the output image into the RFID chip 21 attached to the output medium 40. The information concerning the output image can include electronic information of the output image, information indicating location of the electronic information, information concerning an image processing method and colors used for output, and logs concerning the output such as an output time, a place, an operator who outputs the image, and a number of sheets of output paper.

Figure 20:
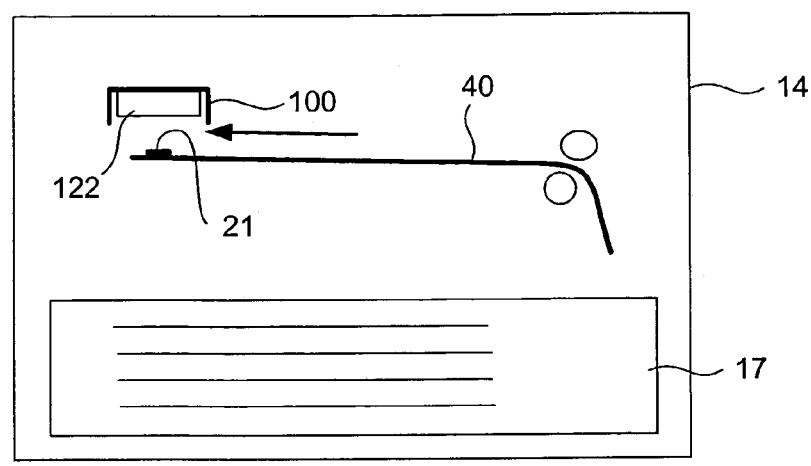
FIG. 20 is a cross section of an image output unit according to a seventeenth embodiment of the present invention.

FIG. 20 is a cross section of an image output unit 14 according to a seventeenth embodiment. In FIG. 20, a state that the output medium 40 is conveyed to below the writing unit 122 after an image is formed on the output medium 40 is shown. The surface of the writing unit 122 other than the surface that faces the output medium 40 is covered with the shielding member 100. By partially covering the writing unit 122 with the shielding member 100, the writing unit 122 is provided with directivity toward the RFID chip 21 attached to the output medium 40.

The operation of the image output apparatus according to the seventeenth embodiment is explained next. As shown in FIG. 10, the image processing unit 13 receives image information from the external apparatus 70 such as a personal computer, and forms image data for output. The image output unit 14 conveys each part of the output medium 40 from the medium storage 17, and outputs the image data received from the image processing unit 13.

The output medium 40 is attached with the readable and writable RFID chip 21 beforehand. The writing unit 122 transmits a radio wave to the output medium 40 to which the image is output, and writes information concerning the output image into the RFID chip 21 attached to the output medium 40. Because the writing unit 122 has directivity toward the RFID chip 21, information transmitted from the writing unit 122 can be written into the RFID chip 21 while preventing leakage of the information to the outside. After the information is written into the RFID chip 21, the output medium 40 is conveyed to the outside of the apparatus.

As described in detail above, according to the seventeenth embodiment, the writing unit 122 is partially covered with the shielding member 100, thereby providing the writing unit 122 with directivity toward the information writing position. Therefore, information transmitted from the writing unit 122 can be written into the RFID chip 21 attached to the output medium 40 while preventing leakage of the information to the outside. When the output image is to be used as a document, a high-definition output can be obtained by reading the information from the RFID chip 21 attached to the output and reflecting the read information to the output image. Accordingly, an added value of the output to be used at the next step can be increased.

An eighteenth embodiment of the present invention is a modification of the seventeenth embodiment. A communication distance of the writing unit 122 is limited to prevent a radio wave transmitted from the writing unit 122 from being received at the outside of the image output apparatus.

According to the eighteenth embodiment, a communication distance of the writing unit 122 is set short. The communication distance of the writing unit 122 is preferably 1 millimeter to a few centimeters.

As explained above, according to the eighteenth embodiment, by limiting the communication distance of the writing unit 122, reception of a radio wave at the outside of the apparatus can be prevented, and leakage of information to the outside can be prevented. Further, power consumption of the writing unit 122 can be reduced.

Figure 21:
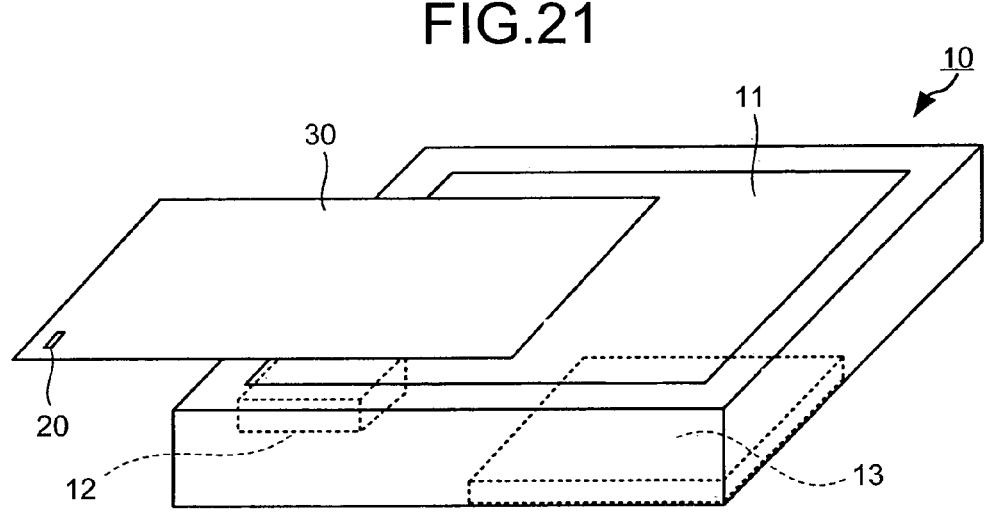
FIG. 21 is a perspective view of an image input apparatus according to a nineteenth embodiment of the present invention.
Figure 22:
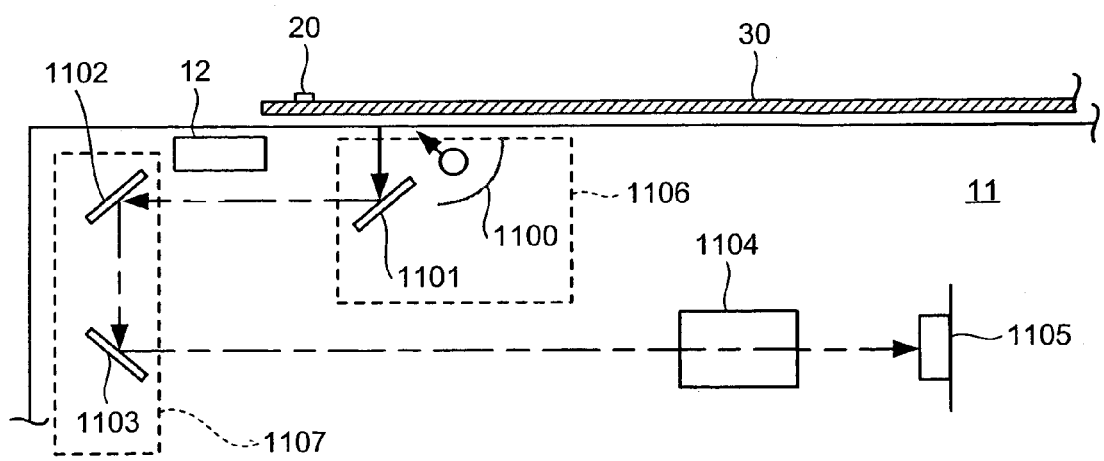
FIG. 22 is a vertical cross section of an image reader in the image input apparatus shown in FIG. 21.

FIG. 21 is a perspective view of an image input apparatus according to a nineteenth embodiment of the present invention; and FIG. 22 is a vertical cross section of an image reader in the image input apparatus shown in FIG. 21. The image input apparatus 10 shown in FIG. 21 includes the image reader 11 that reads image information from the document 30, the receiver 12 (hereinafter, also referred to as "information reading unit 12") that receives necessary information by communicating with the RFID chip 20 attached to the document 30 and reads this information, and the image processing unit 13 that converts the information read by the information reading unit 12 into data as image input information.

As shown in FIG. 22, the image reader 11 shown in FIG. 21 includes an illumination lamp 1100 that illuminates the document 30 mounted on a contact glass, a first mirror 1101 that reflects a document image, a second mirror 1102 that reflects an image reflected from the first mirror 1101, a third mirror 1103 that reflects an image reflected from the second mirror 1102, an imaging lens 1104 that forms the image reflected from the third mirror 1103 onto an imaging surface of an imaging unit, and a CCD 1105 as the imaging unit that converts the image signal on the imaging surface into an electric signal. A first running unit 1106, which is formed by the illumination lamp 1100 and the first mirror 1101, and a second running unit 1107, which is formed by the second mirror 1102 and the third mirror 1103, scan the document 30 while moving together toward a reading direction (a right direction in FIG. 22), thereby reading the whole image from the document.

According to the image input apparatus 10 of the present invention, the information reading unit 12 communicates with the RFID chip 20 attached to the document 30, thereby obtaining necessary information. The RFID chip 20 according to the present embodiment has a radio communication function and a memory that store information. The RFID chip 20 electronically holds information, and non-contact transmits the information according to electromagnetic inductance. The RFID chip 20 is prepared according to a known technique. As shown in FIG. 4, the RFID chip 20 includes the coil 201 as an antenna, a capacitor 202 constituting a line connector (LC) oscillation circuit (or an LC resonant circuit) together with the coil 201, the power source 203, a decoder 204, an encoder 205, a switch 206, a communication controller 207, and the memory 208.

The RFID chip 20 operates as follows. When a radio wave of a constant frequency is given from the outside, a current is induced in the coil 201, and a charge is accumulated into the power source 203. By using power obtained from the charge accumulated in the power source 203, the communication controller 207 reads information stored in the memory 208. The encoder 205 encodes the read information, and transmits a radio wave from the antenna of the coil 201 by turning ON/OFF the switch 206. The memory used in the RFID chip 20 can be any one of a read-only memory and a readable-writable memory. A semiconductor memory is used for the memory 208 in this embodiment.

In general, a communication distance of the RFID chip is determined based on a frequency of a radio wave. A low-frequency radio wave has a long communication distance, and a high-frequency radio wave has a short communication distance. A low-frequency RFID chip has a large occupancy capacity and its cost is high. However, because a maximum communication distance is 10 meters, the low-frequency RFID chip is suitable for remote-controlled communication. On the other hand, a high-frequency RFID chip has a short communication distance of 1 millimeter to a few centimeters. Because a total size of the high-frequency RFID chip can be made small, the chip has a small occupancy capacity and can be processed in a sheet shape, which can lower cost. According to the nineteenth embodiment, the high-frequency type RFID chip 20 having a communication distance of a few millimeters at most is used. This takes into account facts that crosstalk can be prevented, that power consumption is small, and that the RFID chip can be configured very small. Particularly because the RFID chip can be made compact, this is suitable for attachment to a sheet object (such as paper).

Electronic information stored in the RFID chip 20 attached to the document 30 can be read based on the following methods, by bringing the RFID chip close to the information reading unit 12, as shown in FIG. 21 or FIG. 22. A first method is that a position of the information reading unit 12 in the image input apparatus 10 is specified in advance, and the RFID chip 20 is brought closer to this part. A second method is that the information reading unit 12 is provided at a position where the information can be obtained from the RFID chip 20 simultaneously with the reading of the image from the document 30 with the image reader 11. The image processing unit 13 converts the electronic information obtained from the RFID chip 20 into data as image input information.

According to the nineteenth embodiment, the electronic information stored in the RFID chip 20 attached to the document 30 is image data stored in a JPEG file or a BMP file, or electronic information generally used in a PDF file or an HTML file. This RFID chip 20 stores electronic data of document information in the above format, or electronic data of information attached to the document information.

In reading the image from the document 30 with the image reader and converting the image into digital data, as shown in FIG. 2, the CCD 52 first converts the image of the document 30 into analog data via the imaging lens 51 of the image reader. The A/D converter 53 then converts the analog data into digital data. However, because the imaging lens 51 and CCD 52 are used to read the image, the quality of the electronic information obtained after converting with the A/D converter 53 is degraded due to a physical factor of MTF characteristic. According to the nineteenth embodiment, the electronic data of the document information is stored into the RFID chip 20 of the document 30. With this arrangement, the information reading unit 12 can directly obtain the electronic data of the document information. Accordingly, there is no influence of the physical factor of the MTF characteristic. Consequently, degradation in the quality of the electronic information can be prevented.

Further, according to the nineteenth embodiment, when electronic data of information to be added to the document 30 is stored into the RFID chip 20 of the document, the configuration of the document can be known in advance by reading this information with the information reading unit 12. Therefore, the information can be read always in an optimum reading condition.

Figure 23:
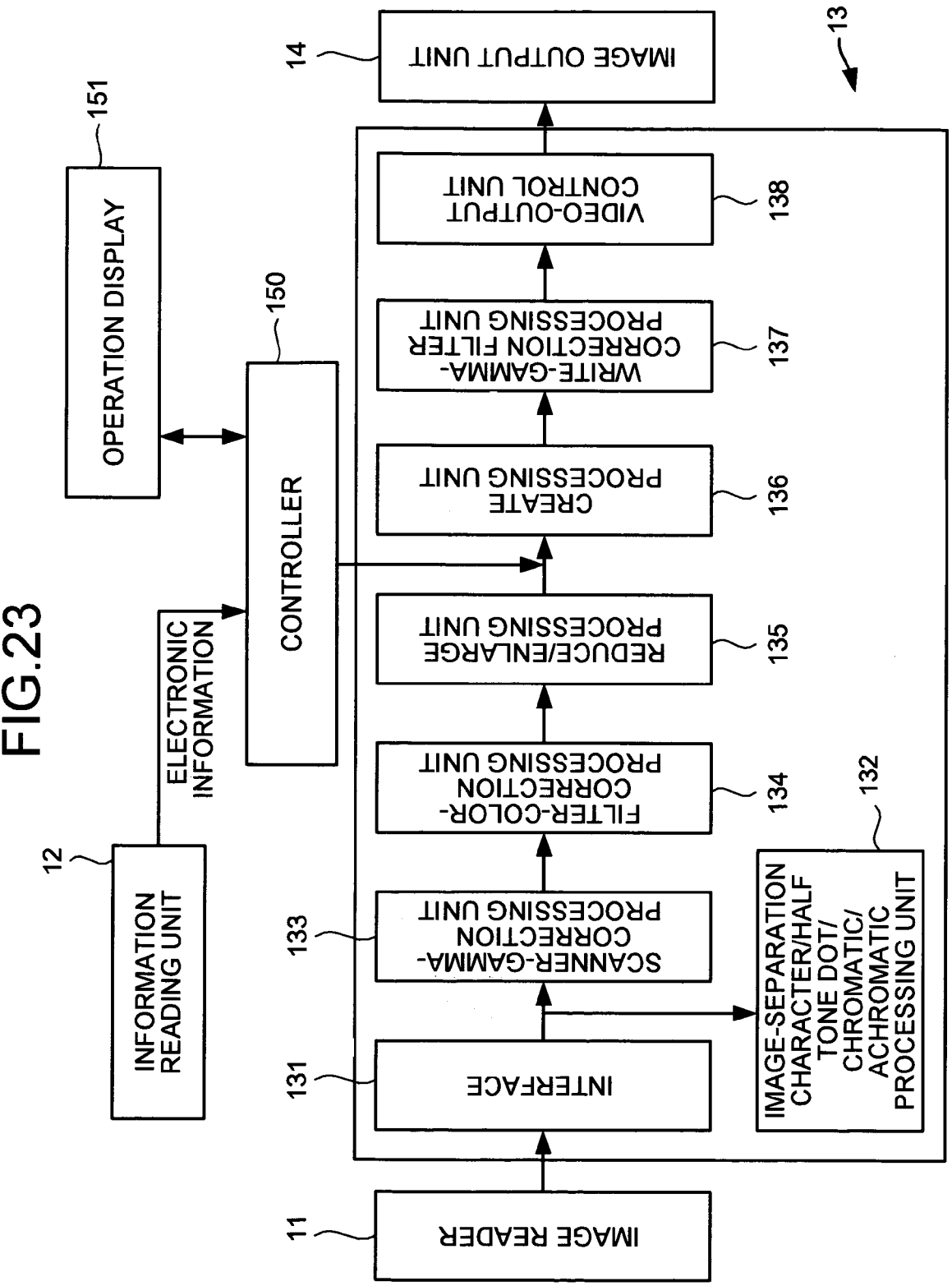
FIG. 23 is a block diagram of an image processing unit when information to be added to document information is already stored in an RFID chip.

FIG. 23 is a block diagram of an image processing unit when information to be added to document information is already stored in an RFID chip. As shown in FIG. 23, the image input apparatus according to the nineteenth embodiment operates as follows. In order for the image processing unit 13 to optimize the image processing of the document information read by the image reader 11, the information reading unit 12 reads the configuration information stored in the RFID chip 20 attached to the document 14, and transmits the read information to the controller 150. The controller 150 provides the image processing unit 13 with the read configuration information based on an instruction from an operation display 151. The image processing unit 13 processes the image based on this configuration information. The image output unit 14 outputs the processed optimized document information.

As shown in FIG. 23, the image processing unit 13 includes the I/F 131, an image separation character/half tone dot/chromatic/achromatic processor 132, a scanner gamma ray correction processor 133, a filter color correction processor 134, a reduce/enlarge processor 135, a create processor 136, a write gamma ray correction filter processor 137, and a video output controller 138.

The I/F 131 supplies the document information read by the pre-stage image reader 11 to both the image separation character/half tone dot/chromatic/achromatic processor 132, and the scanner gamma ray correction processor 133. The image separation character/half tone dot/chromatic/achromatic processor 132 determines about half tone dots of a character or a picture, and determines about chromatic color or achromatic character. The scanner gamma ray correction processor 133 corrects concentration characteristics of a reading system.

The filter color correction processor 134 carries out a filtering to red, green, and blue (RGB) signals input from the scanner gamma ray correction processor 133, and converts the filtered RGB signals into cyan, magenta, and yellow (CMY) signals, thereby correcting colors.

The reduce/enlarge processor 135 reduces/enlarges the image in horizontal and vertical directions, and the create processor 136 carries out a repeat processing in the next image processing.

The write gamma ray correction filter processor 137 converts the gradation of the document information from the create processor 136 using a gradation conversion table, and outputs a converted result to the video output controller 138.

As shown in FIG. 6, when it is necessary to submit a copy of the document 30 to third party in a business meeting, for example, document information is processed by deleting the confidential information 31 contained in the document 30, and output the information on a sheet of paper.

In this case, as shown in FIG. 23, the image reader 11 reads the document 30, and at the same time, the information reading unit 12 obtains the additional information (electronic information) stored in the RFID chip 20 attached to the document 30. This electronic information is used to specify a position of the confidential information 31 described in the document. The image processing unit 13 obtains both the document information from the image reader 11 and the additional information of the document stored in the RFID chip 20 from the information reading unit 12. The image processing unit 13 prepares document information which excludes only the confidential information 31 from the document information based on the position information of the confidential information, and outputs the document information from the image input apparatus. As explained above, the image-processed document information is transmitted to the image output unit 14, and is output from this unit. With this arrangement, the document 40 which excludes the confidential information 31 (deletion area 41) can be output easily.

When the image reader 11 reads the document 30, the information reading unit 12 obtains the electronic information from the RFID chip 20 attached to the document 30, at the same time. This is an instance that the electronic information stored in the RFID chip 20 is the additional electronic information. For example, the image processing unit 13 combines the document information obtained from the image reader 11, with the additional electronic information (the image data, and the electronic data of the document) obtained from the RFID chip 20 by the image reader 12, and the image input apparatus can output the combined information. As examples of the additional data, there is value-added confidential information 31, and image information added with advertisement.

When plural pieces of data are stored in the RFID chip 20 as explained above, it is necessary to select which data is to be used. According to the nineteenth embodiment, the image input apparatus has the controller 150 that selects the electronic data from the RFID chip 20 received by the information reading unit 12, as image input information to the image processing unit 13, as shown in FIG. 23.

The image reader 12 of the image input apparatus reads all information stored in the RFID chip 20, and transmits this information to the controller 150. A user can select data according to needs from the data read from the RFID chip 20 using the operation display 151, and can use the selected data for image input data to the image processing unit 13.

Accordingly, in order to obtain high-definition image input data, only the electronic information of the document stored in the RFID chip 20 is used, or only confidential information or a combination of the confidential information and the electronic information of the document is used. In this way, the user can freely select data from the information stored in the RFID chip 20.

Highly confidential information can use a condition that authentication information input from the outside must coincide with authentication information stored in advance in the RFID chip 20. When the two pieces of authentication information do not coincide with each other, the information cannot be read or information cannot be added. Security can be improved in this way.

Figure 24:
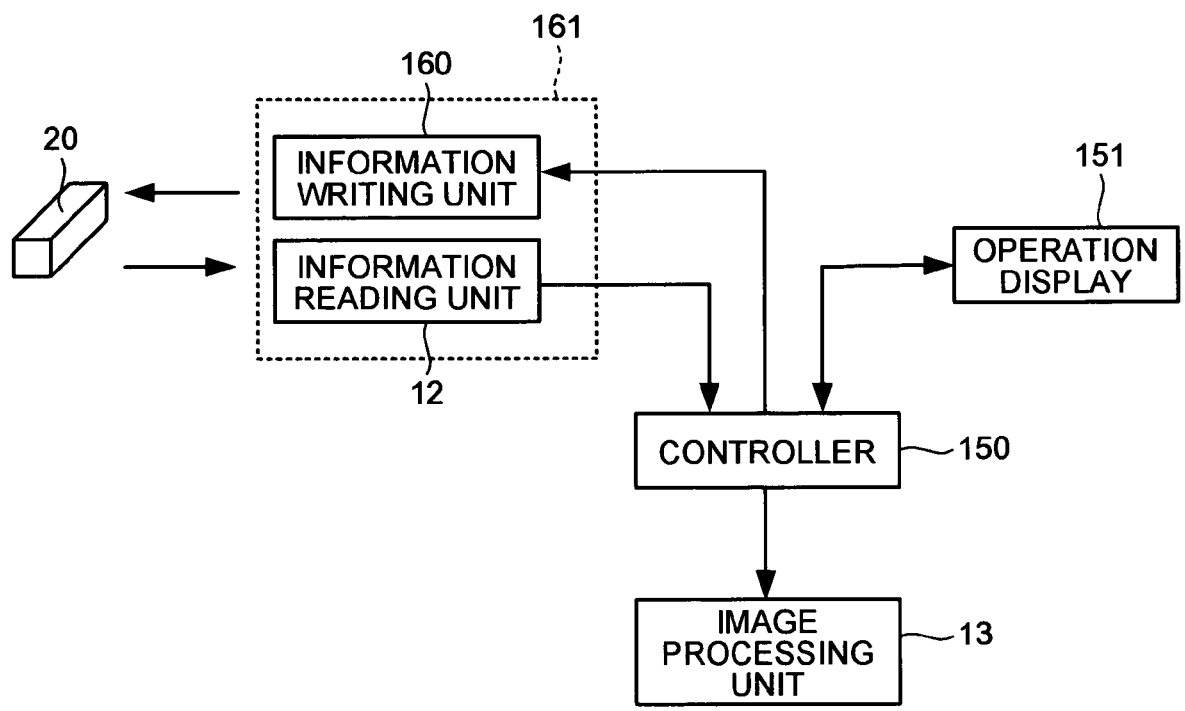
FIG. 24 is a schematic of an image input apparatus according to a twentieth embodiment of the present invention.

FIG. 24 is a schematic of an image input apparatus according to a twentieth embodiment of the present invention. According to the twentieth embodiment, as shown in FIG. 24, the image input apparatus includes an information reading unit/writer 161 having an information writer 160 that can rewrite the information stored in the RFID chip 20 attached to the document 30, in addition to the information reading unit 12 that reads the information stored in the RFID chip 20. Configurations of the image processing unit 13, the controller 150, and the operation display 151 are the same as those according to the above embodiments, and therefore, they are assigned with like reference numerals and their explanation is omitted.

As explained above, according to the twentieth embodiment, because the information writer 160 is provided, the information stored in the RFID chip 20 can be deleted or rewritten. Particularly, highly confidential information can use a condition that authentication information input from the outside must coincide with authentication information stored in advance in the RFID chip 20, like in the nineteenth embodiment. When the two pieces of authentication information do not coincide with each other, the information cannot be read or information cannot be added. Security can be improved in this way.

According to the twentieth embodiment, an RFID chip is attached to literatures in a library, for example. The information reading unit/writer 161, which includes the information reading unit 12 and the information reading unit 160, shown in FIG. 24 is disposed near the contact glass of a copying machine, thereby electronically updating a counter of the RFID chip at the time of copying a literature. By simply reading a count value added to the RFID chip of each literature, frequency of utilizing the copying machine can be checked. When a number of making copies can be added to the counter of the RFID chip, the number of copies can be recorded, although the utilization frequency is "1" when plural copies are made from the same page. When date and time of making a copy, a place, and authentication information of an operator can be added in addition to the number of copies, literatures can be easily managed in detail. For example, unauthorized copying of a confidential literature can be prohibited.

A configuration of an image input apparatus according to a twenty-first embodiment of the present invention is explained with reference to FIG. 5, where the image output apparatus 10 is substituted by the image input apparatus 10. According to the twenty-first embodiment, as shown in FIG. 5, when the capacity that can be stored in the RFID chip 20 is made small, the RFID chip 20 can be made smaller, and cost can be lowered. In order to minimize the memory capacity of the RFID chip, only information that indicates location of electronic information to be stored is recorded in the memory of the RFID chip 20. The image input apparatus 10 also includes the communication controller 15 as a communication controller that is connected to a network to control communication, in order to be able to locate the electronic information in the HDD 16 within the image input apparatus 10 or the computer or the server connected to the network.

According to the twenty-first embodiment, the network has the following configuration. As shown in FIG. 5, the image input apparatus 10 is connected to the LAN 62 via the communication controller 15. The LAN 62 is connected with a personal computer or the other storage 64, and other image input apparatus (not shown). The LAN 62 is connected to the Internet 61, and the external server 63 is connected to the Internet 61.

According to the twenty-first embodiment, the image input apparatus further includes the communication controller 15 and the HDD 166 as shown in FIG. 5. When the location of the electronic information is limited to the HDD 16, the communication controller 15 is not necessary. When the location of the electronic information is limited to the network such as the LAN 62 and the Internet 61, the HDD 16 is not necessary. However, to cope with both situations, the image input apparatus has both the communication controller 15 and the HDD 16.

The operation of the image input apparatus 10 is explained next. As shown in FIG. 5, when the image reader of the image input apparatus 10 reads the image of the document 30, the image reader 12 at the same time communicates with the RFID chip 20 to read the location information of the electronic information stored in the RFID chip 20. When the location information indicates the location in the external server 63 on the Internet 61, the communication controller 15 accesses the external server 63 via the LAN 85 and the Internet 61, and obtains the corresponding electronic information. Based on this, the image processing unit 13 processes the document information, thereby obtaining image input information having an added value.

When the read location information indicates the location in the HDD 16 as a local large-capacity memory, the communication controller 15 accesses the HDD 16, and obtains the electronic information stored in the corresponding address. Based on this, the image processing unit 13 processes the document information, thereby obtaining image input information having an added value.

As explained above, according to the twenty-first embodiment, only the location information is stored into the RFID chip 20. Because the RFID chip has only a small memory capacity, the RFID chip can be made compact and its cost can be lowered. Particularly, because the information volume can be small when only the location information is stored, plural pieces of information can be stored easily in the RFID chip.

Because actual electronic information can be stored in the server or the HDD which the location information in the RFID chip indicates, there is no limit to the information volume.

The location information stored in the RFID chip can indicate locations other than the server and the HDD. For example, the electronic information can be stored and displayed in the personal computer or other storage 64 or other image output apparatus (not shown) connected to the LAN 62, or in a personal computer connected to the Internet 61.

Figure 25:
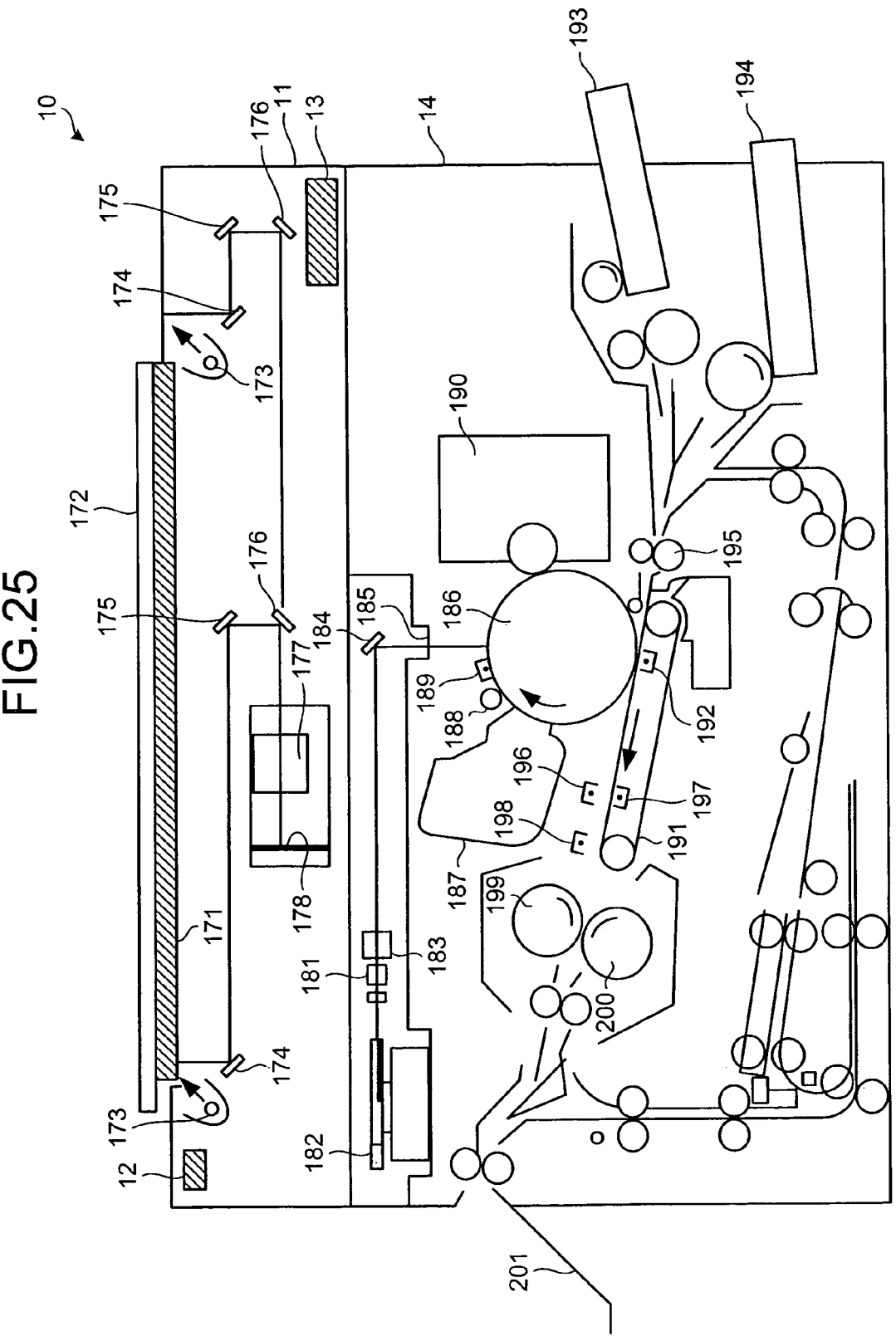
FIG. 25 is a cross section of an image forming apparatus having an image input apparatus according to a twenty-second embodiment of the present invention.

FIG. 25 is a cross section of an image forming apparatus having an image input apparatus according to a twenty-second embodiment of the present invention. As shown in FIG. 25, a copying machine is used for the image forming apparatus. The image scanner 11 is disposed above the copying machine. The printer 14 is disposed below the copying machine. A transparent contact glass 171 that functions as a document table is provided on an image-reading surface of the image scanner 11. An openable and closable platen 172 is disposed above the image-reading surface. The internal surface of the platen 172, or a part facing the reverse side of the document, has white color. An optical scanning system is provided below the contact glass 171.

The optical scanning system includes a first carriage having an exposure lamp 173 and a mirror 174, a second carriage having mirrors 175 and 176, and a light receiving unit having a lens 177 and an image sensor 178. The first carriage and the second carriage are mechanically driven in left and right directions in FIG. 25 to carry out sub-scanning. According to the optical scanning system, light emitted from the exposure lamp 173 is reflected from the document surface or the internal surface of the platen 172. This reflection light is incident to the image sensor 178 via the mirrors 174, 175, 176, and the lens 177.

The image reader 12 shown in FIG. 25 obtains information concerning a document image read from the image scanner 11, from the RFID chip attached to the document. The image processing unit 13 carries out a predetermined image processing, and inputs the image input information data to the printer 14, thereby forming a copy image. In other words, the image input apparatus according to the present invention corresponds to the image scanner 11. An added value can be given to the document information, based on the information from the RFID chip attached to the document.

In the meantime, the image writing unit of the printer 14 includes a laser light source 181, a polygon mirror scanner 182, an fθ lens 183, a mirror 184, and a dustproof glass 185. The laser light source 181 emits a laser beam modulated in a binary signal corresponding to recording/non-recording of each pixel of the image to be recorded. This laser beam is reflected from the polygon mirror scanner 182, passes through the fθ lens 183, the mirror 184, and the dustproof glass 185, and forms an image on the surface of a photosensitive drum 186.

A cleaning belt 187, a charge eliminating lamp 188, a main charger 189, a developing unit 190, a transfer belt 191, and a transfer charger 192 are provided around the photosensitive drum 186. The main charger 189 uniformly charges the surface of the photosensitive drum 186 in a predetermined high potential. When a laser beam corresponding to an image is irradiated onto the surface of the photosensitive drum 186, the surface potential changes, and a potential distribution that is the same as the potential distribution of the image is formed according to on/off of the laser beam. When this potential distribution or an electrostatic latent image passes through the developing unit 190, toners are adhered to the photosensitive drum 186 according to high and low of potentials, thereby forming a visible image.

The transfer charger 192 transfers the visible image (the toner image) formed on the photosensitive drum 186 onto the transfer belt 191. When transfer paper fed from a paper feed cassette 193 or 194 is sent onto the transfer belt 191 via the resist roller 195, the transfer chargers 196 and 197 transfer the toner image from the transfer belt 191 onto the transfer paper. A separation charger 198 separates the transfer paper on which the toner image is transferred, from the transfer belt 191, and passes the paper to between fixing rollers 199 and 200, thereby fixing the toner image on the transfer paper. The transfer paper passes a paper discharge route, and is discharged to a paper discharge tray 201.

As explained above, according to the twenty-second embodiment, the copying machine is used to configure the image forming apparatus having the image input apparatus according to the present invention. Therefore, in copying the document attached with the RFID chip, image processing can be carried out based on the information stored in the RFID chip, unlike conventional copy images prepared by reading the document image as usual. Accordingly, degradation of image quality due to physical factors such as the MTF characteristic or image compression can be prevented. Furthermore, the image information can be more processed easily by using the electronic information obtained from the RFID chip. Making an unauthorized copy of confidential information can be prevented, by suspending the image reading operation unless two pieces of authentication information coincide with each other.

According to the present embodiment, the document information read by the image reader is processed, using the electronic information read from the RFID chip. The present invention is not limited to the method. Alternatively, the document can be read in an optimum condition, using the information read from the RFID chip before reading the document image.

Figure 26:
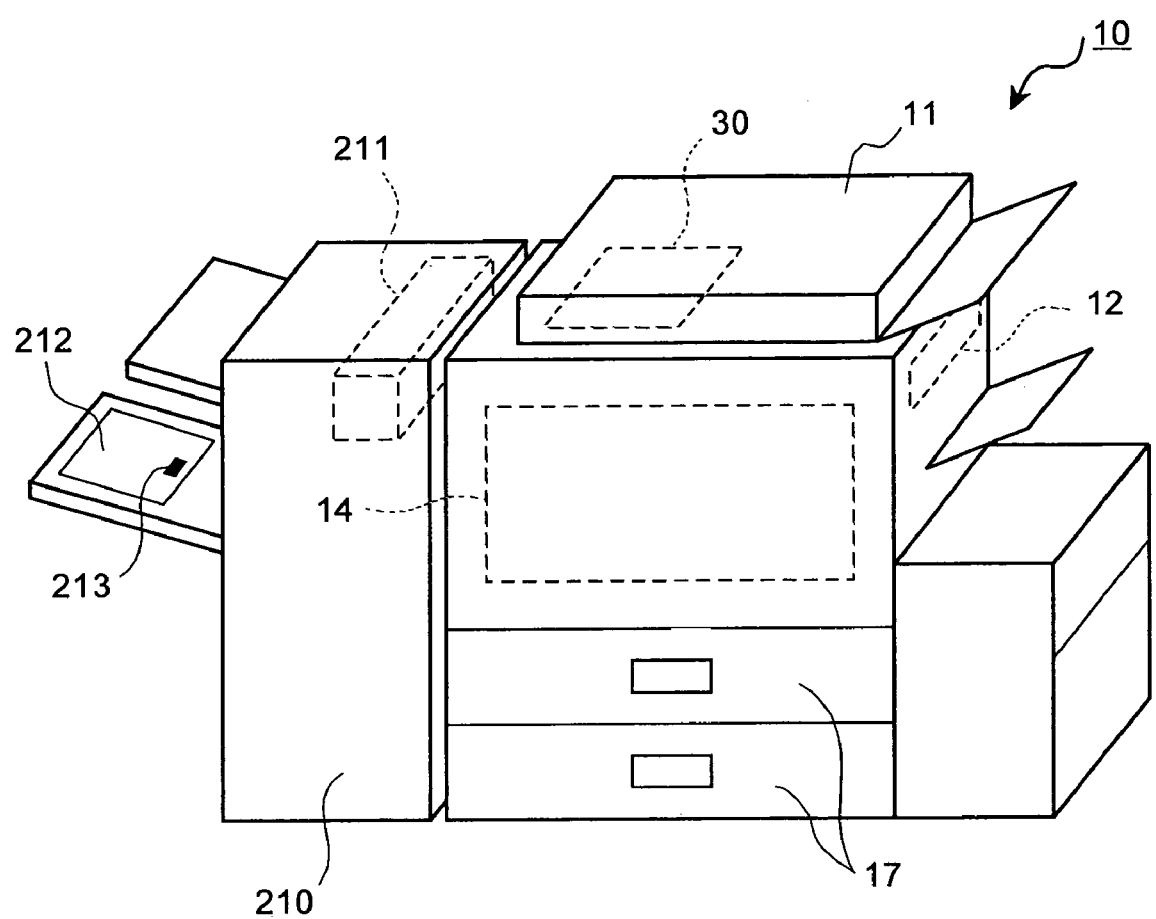
FIG. 26 is a perspective view of the image output apparatus according to a twenty-third embodiment of the present invention.
Figure 27:
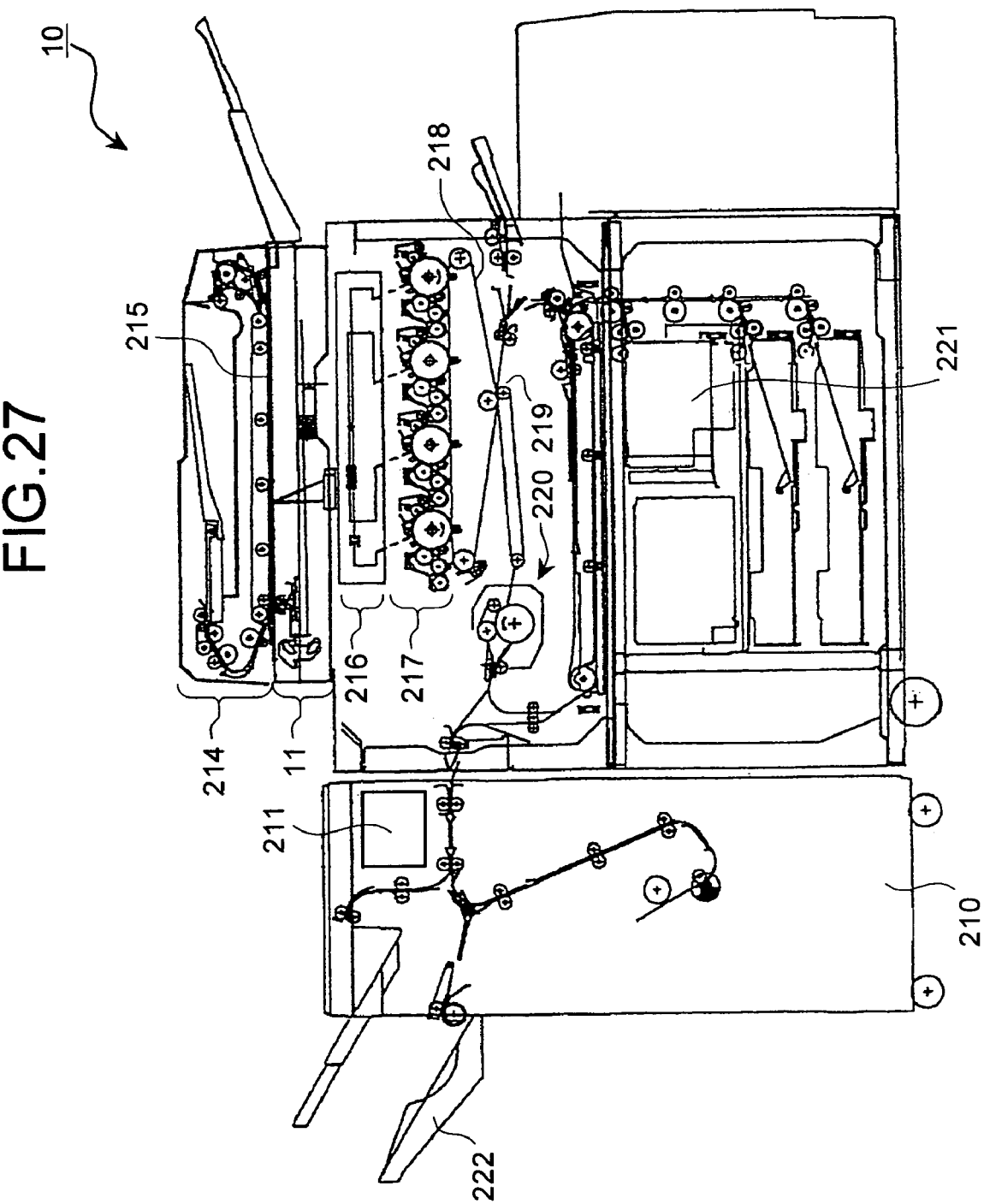
FIG. 27 is a vertical cross section of an overall configuration of an internal mechanism of the output image apparatus shown in FIG. 26.

FIG. 26 is a perspective view of the image output apparatus according to a twenty-third embodiment of the present invention; and FIG. 27 is a vertical cross section of an overall configuration of an internal mechanism of the output image apparatus shown in FIG. 26. As shown in FIG. 26, the image output apparatus 10 includes the image reader 11 that reads an image from the document 30, the image processing unit 12 that converts the image into data to form the image based on the read image signal, a paper tray 17 in which sheets of paper 212, as an output image recording medium, are stacked so that the sheets of paper are ready to be supplied, an image forming unit 14 to form the image information onto the paper, a finisher 210 that carries out a post-processing to the paper on which the image is formed, and an RFID chip adding unit 211 that adds an RFID chip 213 to the paper 212 in the finisher 210. In this case, an electro-photographic color laser printer that is generally used in offices is taken up as an example of the image output apparatus 10. However, a monochromatic laser printer or a printer based on a process other than the electro-photographic system can be also used. A copying machine having a document reading unit can be used for the image output format. Either a digital or analog document reading system can be used.

As shown in FIG. 27, the image output apparatus 10 includes a document conveyer 214 that automatically and sequentially conveys the document onto the contact glass 215, the image reader 11 that optically reads the document while scanning the document, the image writer 216 that processes the image signal read by the image reader 11 and writes the image for each color, an image preparing unit 217 that develops for each color the image written by the image writer 216, an intermediate transfer belt 218 that superimposes developed toner images together, a transfer unit 219 that transfers the image formed on the intermediate transfer belt 218 onto paper, a fixing unit 220 that fixes the toner image transferred to the paper, a paper feeder 221 that feeds paper to the transfer unit 219, the RFID chip adding unit 211 that adds the RFID chip to the paper immediately after the finisher 210 forms the image, and a paper discharge tray 222 that discharges the paper onto which a target image is formed and to which the RFID chip is given.

The RFID chip 213 given to the paper 212 has a radio communication function and a memory that stores information, like the RFID chip 20 shown in FIG. 4. The RFID chip 213 electronically holds information, and non-contact transmits the information according to electromagnetic inductance. The RFID chip 20 shown in FIG. 4 is prepared using a known technique. The RFID chip 20 includes the coil 201 as an antenna, the capacitor 202 constituting an LC oscillation circuit (or an LC resonant circuit) together with the coil 201, the power source 203, the decoder 204, the encoder 205, the switch 206, the communication controller 207, and the memory 208.

The RFID chip 20 operates as follows. When a radio wave of a constant frequency is given from the outside, a current is induced in the coil 201, and a charge is accumulated into the power source 203. By using power obtained from the charge accumulated in the power source 203, the communication controller 207 reads information stored in the memory 208. The encoder 205 encodes the read information, and transmits a radio wave from the antenna of the coil 201 by turning ON/OFF the switch 206. The memory used in the RFID chip 20 can be any one of a read-only memory and a readable-writable memory. A semiconductor memory is used in this case.

In general, a communication distance of the RFID chip is determined based on a frequency of a radio wave. A low-frequency radio wave has a long communication distance, and a high-frequency radio wave has a short communication distance. A low-frequency RFID chip has a large occupancy capacity and its cost is high. However, because its maximum communication distance is 10 meters, the low-frequency RFID chip is suitable for remote-controlled communication. On the other hand, a high-frequency RFID chip has a short communication distance of 1 millimeter to a few centimeters. Because a total size of the high-frequency RFID chip can be made small, the chip has a small occupancy capacity and can be processed in a sheet shape, which can lower cost. According to the twenty-third embodiment, the high-frequency type RFID chip 20 having a communication distance of a few millimeters at most is used. This takes into account facts that crosstalk can be prevented, that power consumption is small, and that the RFID chip can be configured very small. Particularly because the RFID chip can be made compact, this is suitable for attachment to a sheet object (such as paper).

The operation of forming the image onto the paper is explained with reference to FIGS. 26 and 27. The image processing unit 12 processes the image based on the image signal of the document read by the image reader 11, thereby converting the signal into color signals of black (BL), yellow (Y), magenta (M), and cyan (C) that are used to form the image. The color signals are transmitted to the image writer 216.

The image writer 216 includes a laser beam source, a polarizer such as a rotary polyhedral mirror, a laser scanning optical system having a scanning imaging optical system and mirrors, a light emitting diode (LED array having many LEDs arrayed in one dimension or two dimensions, and an LED writing system having an imaging optical system. Images are written onto photosensitive drums of BL, Y, M, and C colors provided in the image preparing unit 217, corresponding to the respective color signals that are sent from four writing optical paths.

The image preparing unit 217 has the photosensitive drums BL, Y, M, and C, corresponding to each color of black, yellow, magenta, and cyan. Usually, an organic photoconductor (OPC) photosensitive unit is used for each color. A charging unit, an exposing unit of a laser beam from the writing unit, a developing unit of a corresponding one of black, yellow, magenta, and cyan, a primary transfer unit, a cleaning unit, and an ionizer are disposed around each photosensitive drum, which are not described in detail. In this case, a two-component magnetic brush developing system is used for the developing unit.

Before writing an image, the charging unit provided at the upstream of the image writing unit 216 of the photosensitive unit charges the surface of the photosensitive unit at about minus 700 volts. When the image writing unit optically writes the image onto the photosensitive unit, the potential of the optical written part disappears, and an electrostatic latent image is formed on the photosensitive unit. Then, the electrostatic latent image can be developed at the subsequent developing stage.

The intermediate transfer belt 218 is present between each of the photosensitive units BL, Y, M, and C, and the transfer unit 219. Each toner image of each color from each photosensitive unit is sequentially transferred and superimposed, thereby forming a toner manifest image onto the photosensitive unit. As a transfer method, a charge transfer unit that is provided opposite to the photosensitive unit to sandwich the belt generates a transfer electric field, thereby electrostaticaly transferring the image. After the intermediate transfer belt 218 passes a final image forming unit, a color image having the four color toners superimposed together is formed on the intermediate transfer belt 218. Wile the intermediate transfer belt is used in this example, an intermediate transfer drum system can be also employed based on a machine layout, a required precision level, and a size. When a monochromatic copying machine is used instead of a color copying machine, an intermediate transfer unit is not necessary. In this case, a toner image can be directly transferred from the photosensitive unit onto paper.

According to the intermediate transfer belt system according to the present embodiment, the transfer paper is fed from the paper feeder 221, and is guided to the secondary transfer unit via a resist roller. When the intermediate transfer belt 218 is brought into contact with a secondary transfer roller, the image is transferred onto the paper, thereby forming a color image.

After the image transfer, the paper is conveyed to the fixing unit 220. A fixing roller gives heat and pressure to the paper to fix the image, thereby obtaining a final color image. After the toner image is transferred from the intermediate transfer belt, the intermediate transfer belt cleaning unit provided at the downstream of the secondary transfer position removes residual transfer toner from the intermediate transfer belt. The image preparing unit 217 then forms the next image.

When images are to be printed on both sides of the paper, after the paper formed with the image on one side is discharged from the fixing unit, a paper inverting unit inverts the paper. The inverted paper is fed to the transfer unit 219 again, thereby forming an image on the reverse side of the paper. The paper printed on either one side or two sides is conveyed to the finisher 210 to carry out a post processing.

The finisher 210 has a paper folding function, a punching function to punch the paper for filing, a book biding function to combine plural sheets of paper together, and a collating function to collate paper prepared in advance for a front cover. According to the present invention, the finisher 210 has a RFID chip providing function (RFID chip providing unit 211) that gives a communicable RFID chip to the paper immediately after printing.

Each one RFID chip is given to each paper separately. The RFID chips are given to sheets of paper continuously at a predetermined position of each sheet. The user can change this giving position by his/her specification. For example, when the paper is printed in a vertical direction, the RFID chip is given to a left upper position on the short side of the paper, that is, near a print starting position. When the paper is printed in a horizontal direction, the RFID chip can be given to a left upper position of the long side of the paper, that is, near a print starting position.

Figure 28:
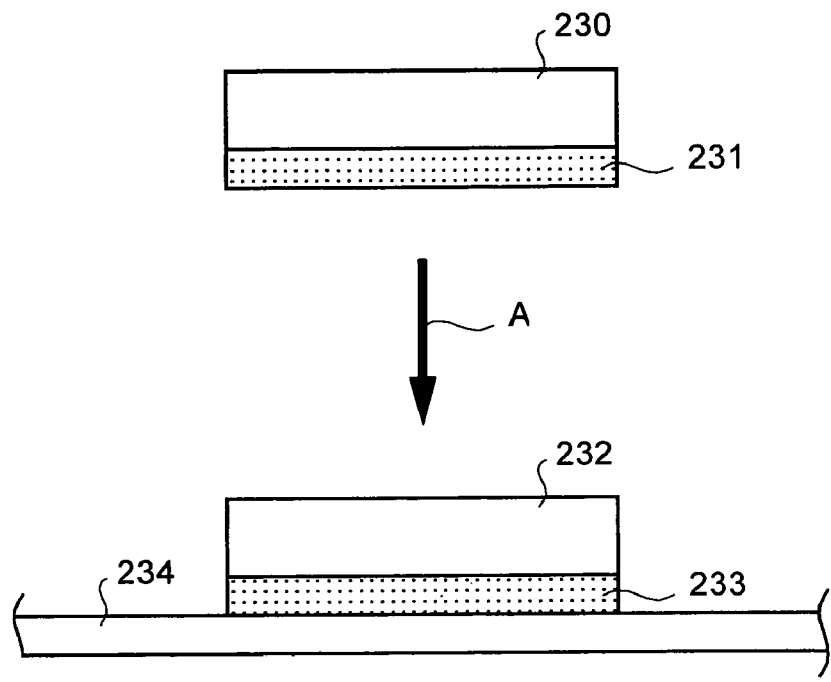
FIG. 28 is a schematic of an RFID chip that is attached on paper according to the twenty-third embodiment.
Figure 29:
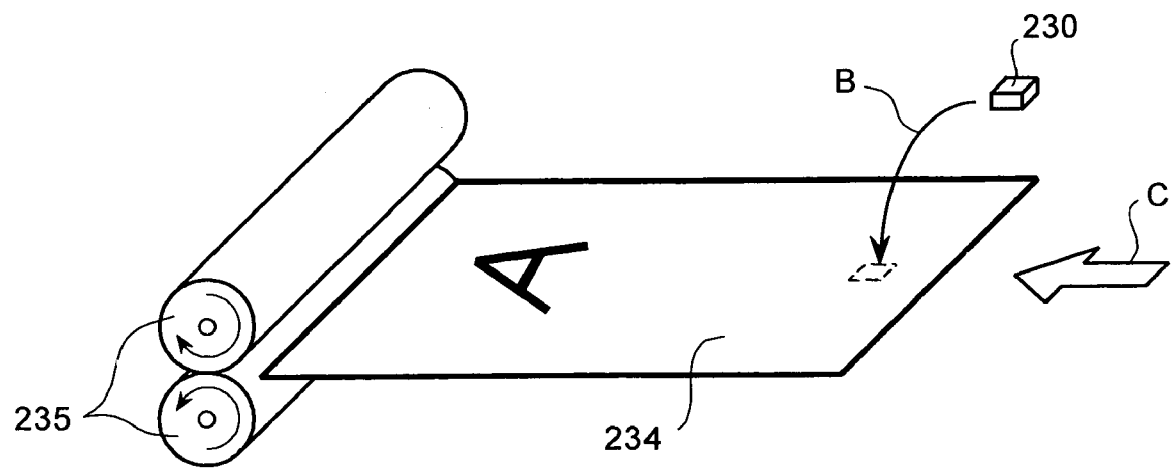
FIG. 29 is a schematic for illustrating an operation procedure for attaching the RFID chip shown in FIG. 28 on paper.

FIG. 28 is a schematic of an RFID chip that is attached on paper according to the twenty-third embodiment; and FIG. 29 is a schematic for illustrating an operation procedure for attaching the RFID chip shown in FIG. 28 on paper. As shown in FIG. 28, an adhesive substance 231 is coated in advance to the surface of the RFID chip 203 that is to be attached to the paper. Therefore, an RFID chip 230 can be easily attached on paper 234 by simply pressing the RFID chip in an arrow direction A. The RFID chip adding unit 211 within the finisher 210 shown in FIG. 27 attaches the RFID chip in the order as shown in FIG. 29. When the paper 234 immediately after being formed with an image is sent to the RFID chip adding unit 211 (shown by an outlined arrow C), the RFID chip 230 coated with the adhesive in advance 233 is given to a designate position on the paper 234 (shown by an arrow B). As the paper passes through between pressing rollers 235, the RFID chip 230 can be securely fixed to the paper 234.

The adhesive substance 233 of the RFID chip 230 shown in FIG. 28 is not limited to that having adhesiveness at a normal temperature, and can be a substance that exhibits adhesiveness in a certain condition. For example, a resin substance can be used that is solved to exhibit adhesiveness when heated to a certain temperature but becomes solid and is fixed on paper when cooled. In this case, the pressing rollers 235 (shown in FIG. 29) provided in the RFID chip adding unit 211 needs to have a heater inside to carry out heating and pressing at the same time, like the fixing rollers.

The image output apparatus employing a dry electro-photographic system usually has the fixer 220 that heats and solves a toner as manifest image particles and fixes the image on the paper. Therefore, after transferring the toner image onto the paper, the RFID chip 230 coated with a substance that exhibits adhesiveness by heating is given to a designated position. The RFID chip can be fixed simultaneously with the fixing of the toner image. In this case, it is not necessary to separately form the RFID chip adding unit 211 within the finisher 210. Accordingly, cost can be reduced correspondingly.

A substance exhibiting adhesiveness due to a physical stimulus from the outside such as a light irradiation can be used for the substance exhibiting adhesiveness in a certain condition. In this case, the RFID chip adding unit 211 needs to have a mechanism that generates a physical stimulus corresponding to a substance coated on the RFID chip 230.

As explained above, according to the twenty-third embodiment, the RFID chip coated with an adhesive substance and capable of carrying out close-range radio contact is given to a recording medium (such as paper) immediately after being formed with an image. Therefore, the information stored in the RFID chip can be related to the image formed on the recording medium. Accordingly, the image output apparatus can be prepared in a simple configuration at low cost, without substantially changing the existing image output apparatus. Particularly, according to the twenty-third embodiment, the RFID chip is given to the paper immediately after being formed with an image. An image forming process of a dry electro-photographic system having a possibility of breaking the RFID chip due to static electricity is not used. Therefore, reliable distribution and management of printed matters can be achieved easily and securely, using the RFID chip attached to the printed matter.

According to a twenty-fourth embodiment of the present invention, an RFID chip is sandwiched between an adhesive sheet member and paper to cover and fix the RFID chip itself with the sheet member, without giving an adhesive substance to the RFID chip like in the twenty-third embodiment.

Figure 30:
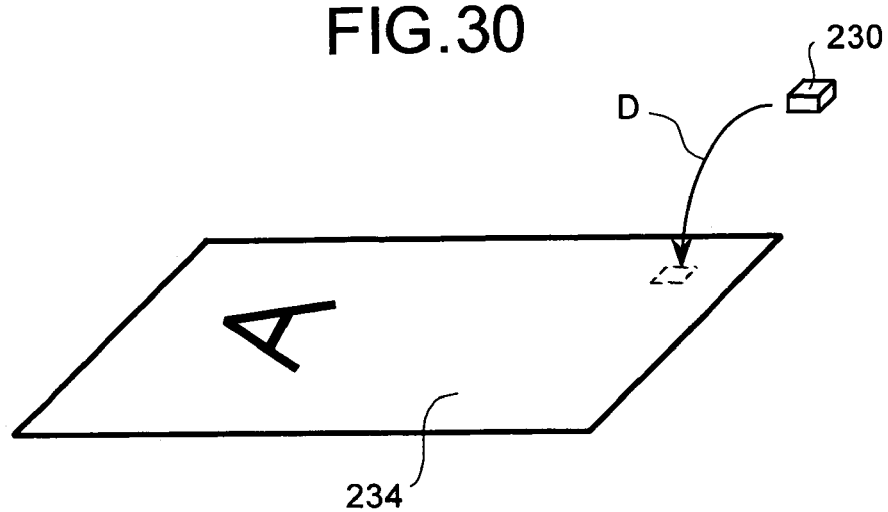
FIG. 30 is a schematic for illustrating an operation procedure for attaching the RFID chip on paper using a sheet member.
Figure 31:
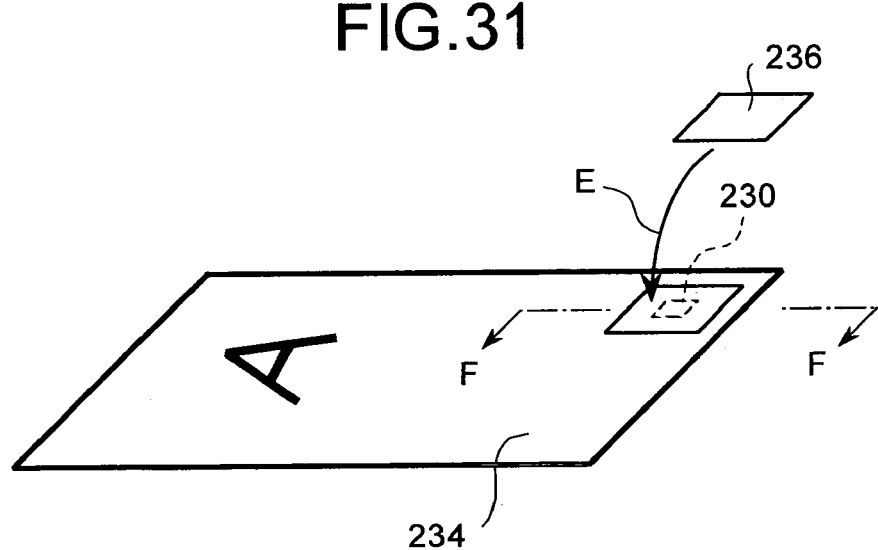
FIG. 31 is a schematic for illustrating another operation procedure for attaching the RFID chip on paper using the sheet member.
Figure 32:
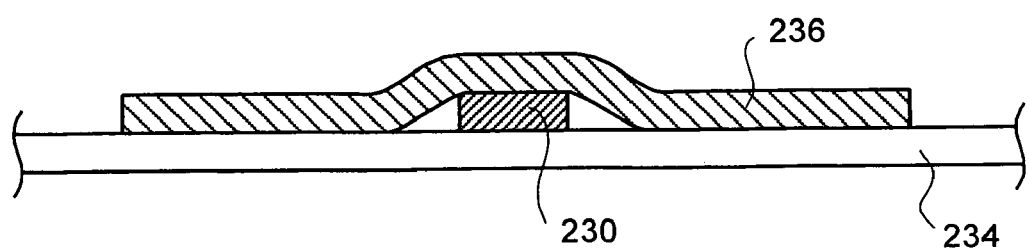
FIG. 32 is a vertical cross section cut along a line F-F in FIG. 31 for illustrating a state that the RFID chip is fixed on paper using the sheet member.
Figure 33:
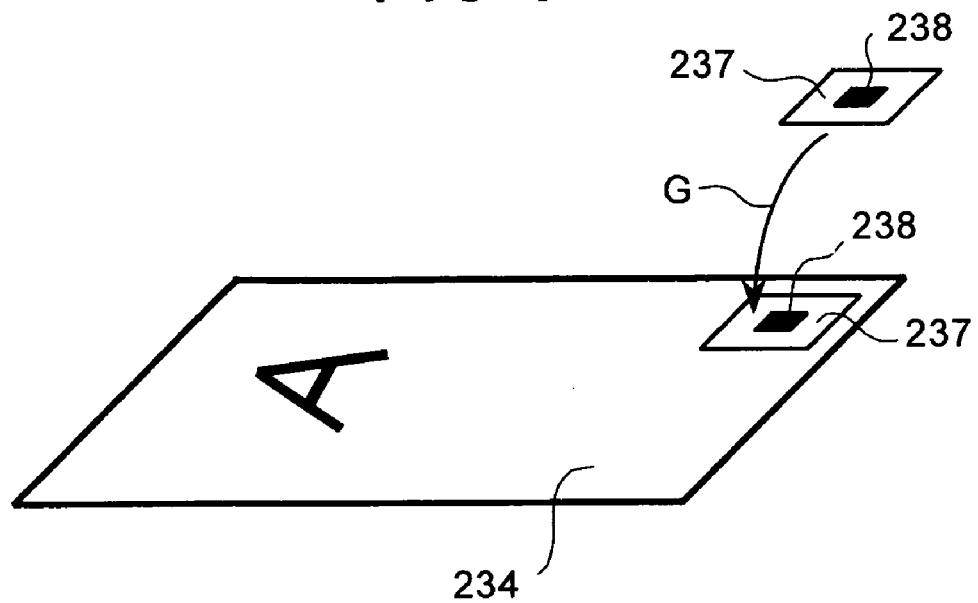
FIG. 33 is a schematic for illustrating an operation procedure for fixing the RFID chip on paper using a sheet member having a display of an RFID chip fixing position.
Figure 34:
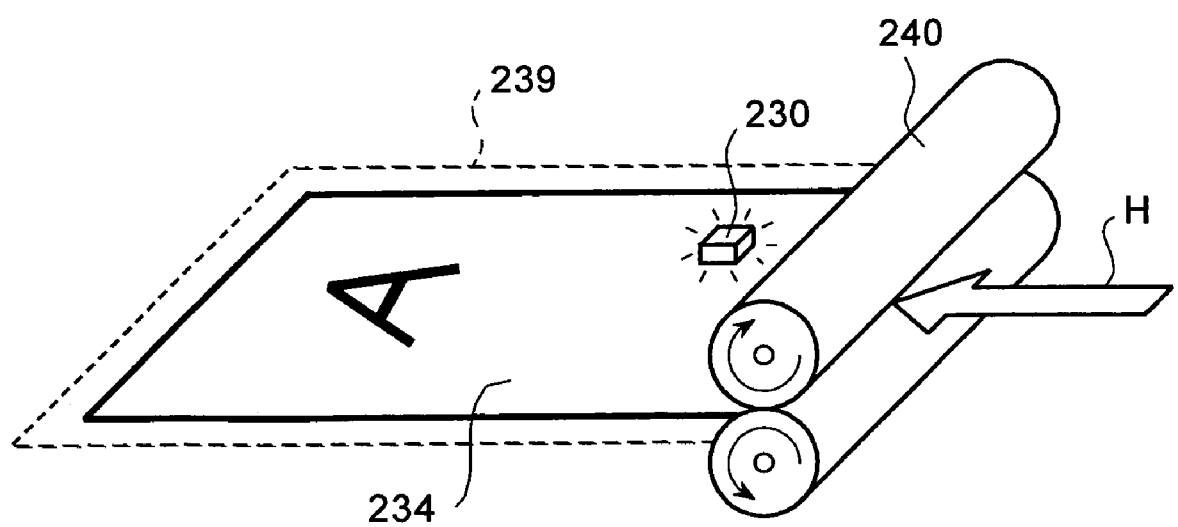
FIG. 34 is a schematic for illustrating an operation procedure for fixing the RFID chip on paper using a transparent or semi-transparent film for a sheet member.

FIGS. 30 and 31 are schematics for illustrating an operation procedure for attaching the RFID chip on paper using a sheet member. FIG. 32 is a vertical cross section cut along a line F-F in FIG. 31 for illustrating a state that the RFID chip is fixed on paper using the sheet member. FIG. 33 is a schematic for illustrating an operation procedure for fixing the RFID chip on paper using a sheet member having a display of an RFID chip fixing position. FIG. 34 is a schematic for illustrating an operation procedure for fixing the RFID chip on paper using a transparent or semi-transparent film for a sheet member.

In fixing the RFID chip 230 to the paper 234 immediately after being formed with an image by using a sheet member 236, the RFID chip 230 is given to a designated position (indicated by an arrow D), as shown in FIG. 30. The sheet member 236 having adhesiveness is covered on the RFID chip 230 as shown in FIG. 31 to sandwich the RFID chip 230 between the sheet member 236 and the paper 234, thereby securely fixing the RFID chip 230 (see FIG. 32).

When a semi-transparent sheet member is used to cover and fix the RFID chip as shown in FIGS. 30 to 32, the user may not recognize a position of the RFID chip when the sheet is large. Particularly, when an RFID chip of a small size is used, it is necessary to indicate the position of the chip to carry out a close reading, because a communicable range of the RFID chip is limited to a narrow range. According to the twenty-fourth embodiment, as shown in FIG. 33, a mark 238 indicating a position of fixing the RFID chip is drawn on the surface of the sheet member 237. The sheet member 237 is covered on the RFID chip at the position of this mark 238, thereby fixing the RFID chip. With this arrangement, the user can always recognize the position of the RFID chip using the mark 238. Accordingly, a close reading of the RFID chip can be ensured.

Because the sheet member to fix the RFID chip covers at least a part of the surface of the image-formed paper, a part of a limited paper surface is hidden depending on a position of pasting the sheet member. Accordingly, image information written under the sheet cannot be read. If the printed area is reduced to be limited by the pasting of the sheet member, there is no point in doing so. According to the twenty-fourth embodiment, as shown in FIG. 34, after the RFID chip 230 is pasted to a designated position of the paper 234 immediately after being formed with an image, the paper 234 is passed through between laminated film sheets 240 in a direction of an outline arrow H, thereby covering the whole paper 234. Therefore, a fixing position of the RFID chip 230 can be identified, and the image contents formed on the paper 234 can be read via the translucent sheet. While a transparent laminated film is used for a sheet member 239, the sheet member is not limited to this. A translucent sheet can be also used so long as the image contents written on the image surface beneath the sheet can be read. While the transparent sheet member 239 covers the whole surface of the paper 234 in FIG. 34, a part of the paper may also be covered with the transparent sheet as shown in FIGS. 33 to 34.

According to the twenty-fourth embodiment, coating of an adhesive substance onto the RFID chip like in the twenty-third embodiment or use of the pressing roller 235 (see FIG. 29) to press the paper is not necessary. As shown in FIGS. 30 and 31, a simple configuration that the sheet member 236 is covered on the RFID chip 230 is sufficient. Therefore, the RFID chip adding unit 211 can be configured at low cost.

According to the twenty-fourth embodiment, the fixing position of the RFID chip is displayed as the mark 238 on the surface of the sheet member 237. Therefore, when the user only recognizes the position of the mark 238, close reading of the RFID chip can be securely achieved.

According to the twenty-fourth embodiment, a transparent or translucent sheet, which makes it possible to read the image contents beneath the sheet, is employed for the sheet member to fix the RFID chip. Therefore, this prevents inability of reading the image beneath the sheet or limiting of the printed area.

The image output apparatus according to the present invention communicates with the RFID chip given to the paper immediately after being formed with an image, and stores and writes information. Therefore, an antenna is necessary to communicate with the outside in addition to the integrated circuit. When the antenna has a larger area, communication is more stabilized. Therefore, the antenna is prepared separately from the integrated circuit, and is connected to the integrated circuit, in many cases. According to a twenty-fifth embodiment of the present invention, a sheet member that fixes the RFID chip also has an antenna function.

When an antenna is formed on a sheet member that fixes the RFID chip onto paper, the RFID chip and the antenna can be connected together within the image output apparatus. This lowers cost, and minimizes storage space.

Figure 35:
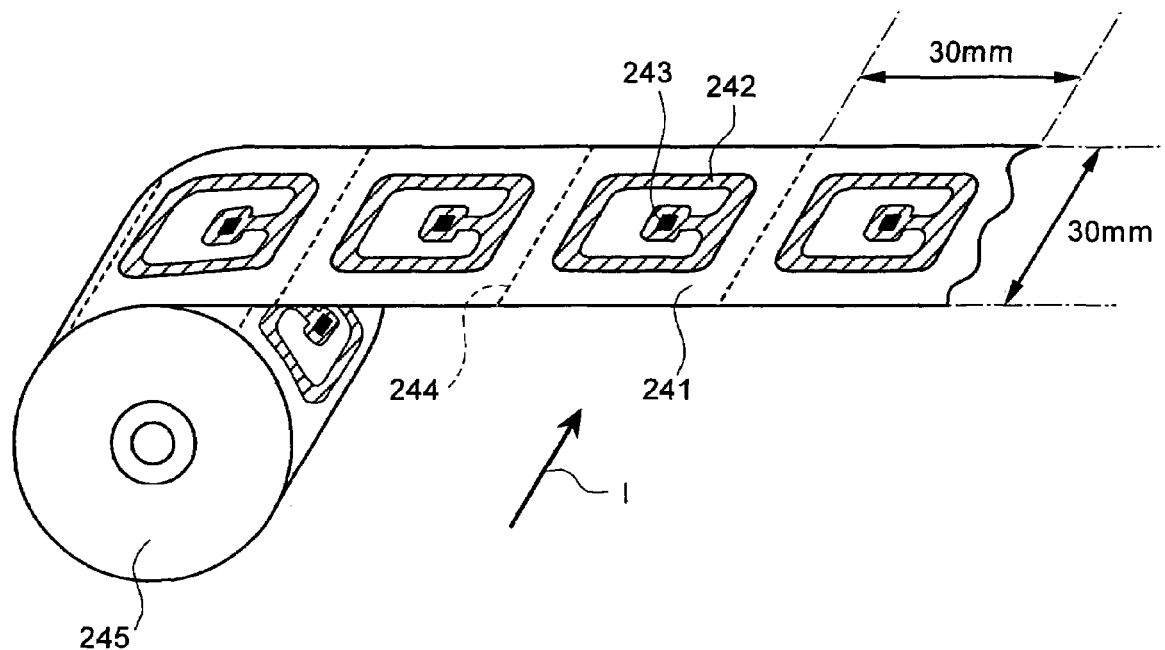
FIG. 35 is a schematic of a film sheet having an antenna and a sheet member combined together, with the antenna formed on the sheet member for fixing the RFID chip on paper.
Figure 36:
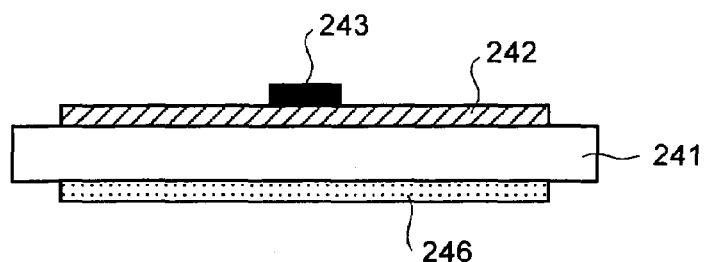
FIG. 36 is a side view of the film sheet shown in FIG. 35 viewed from an arrow direction I.

FIG. 35 is a schematic of a film sheet having an antenna and a sheet member combined together, with the antenna formed on the sheet member for fixing the RFID chip on paper. FIG. 36 is a side view of the film sheet shown in FIG. 35 viewed from an arrow direction I. As shown in FIG. 35, a sheet 242 that holds RFID chips 243 uses a resin sheet made of PET (polyethylene telephthalate) or polyester as a base. A thin-film conductive layer is formed as an antenna 242 on the surface of the resin sheet. The antenna 242 and the RFID chip 243 are combined together using a conductive adhesive. The conductive layer used for the antenna can be formed on the resin film sheet 241 by printing a conductive paste using a conductive ink, or by metal depositing or sputtering.

As shown in FIG. 36, an adhesive substance 246 is coated on the surface which is to be pasted on paper. As shown in FIG. 35, a film sheet wound up in a roll 245 is cutoff along cut lines 244 to obtain individual RFID chips. Each RFID chip is given to a designated position of paper immediately after being formed with an image. A transparent PET film sheet 241 has a width of 30 millimeters and a thickness of 50 micrometers. A conductive resin layer that becomes the antenna 242 is formed on this film sheet in advance according to an inkjet method or an offset printing method. Each one RFID chip 243 is electrically connected to a part of the antenna 242. An adhesive layer 246 is coated on the reverse side of the film. The cutoff lines 244 are formed at an interval of about 30 millimeters to facilitate separation of each RFID chip. The roll of film sheet 245 is formed in such a way that the adhesive layer 246 faces upward, and is supplied to the image output apparatus in this state (see FIG. 37).

The RFID chip is given to paper immediately after being formed with an image, using the sheet member that is formed with the antennas. The RFID chip can be given according to any one of the following methods. (1) After the RFID chip is given onto paper, the RFID chip is covered with a sheet member to fix the chip. (2) At a stage of supplying the RFID chip within the image output apparatus, the sheet and the RFID chip are integrated together in advance. The RFID chip is given, together with the sheet, onto paper immediately formation of an image. (3) A sheet and the RFID chip are supplied separately to the image output apparatus. The sheet and the RFID chip are integrated together within the apparatus in advance before giving on paper, and are then attached to the paper. The method (2) is most simple, and is used in the twenty-fifth embodiment.

As explained above, according to the twenty-fifth embodiment, the antenna which is necessary for the RFID chip to communicate is not formed separately. Instead, the antenna is provided on the sheet member that fixes the RFID chip, and both are electrically connected together. Because the antenna is formed at the same time when the RFID chip is fixed, the RFID chip can be provided at low cost. As communication sensitivity improves, and the antenna storage position can be small, the RFID chip can be handled easily.

According to a twenty-sixth embodiment of the present invention, a radio communication unit is provided that can carry out close-range radio contact with at least one of an RFID chip before given onto paper and an RFID chip after given to the paper. Information stored in the RFID chip can be read out, or image information obtained from an image output apparatus can be recorded into the RFID chip according to needs.

Figure 37:
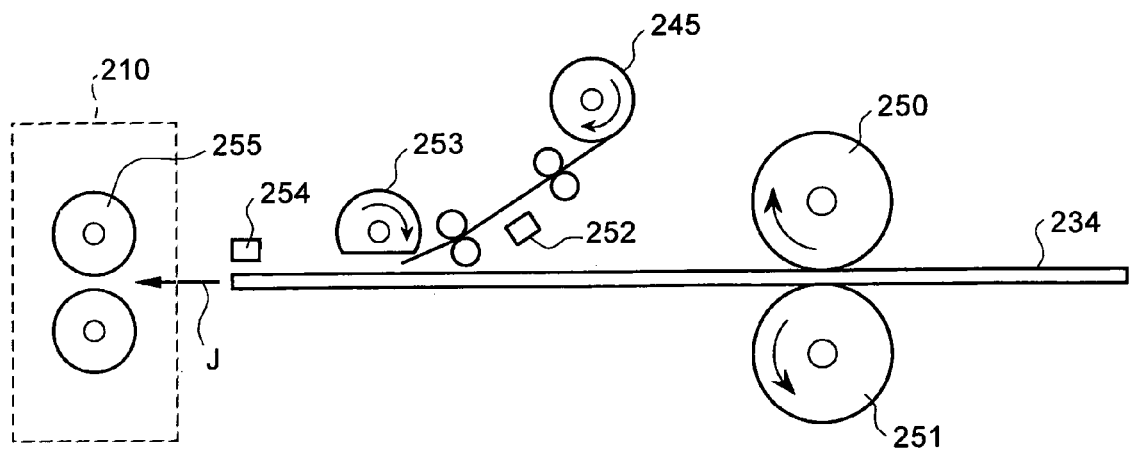
FIG. 37 is a schematic for illustrating a mechanism of giving each RFID chip on paper after forming an image and a finisher used afterward.
Figure 38:
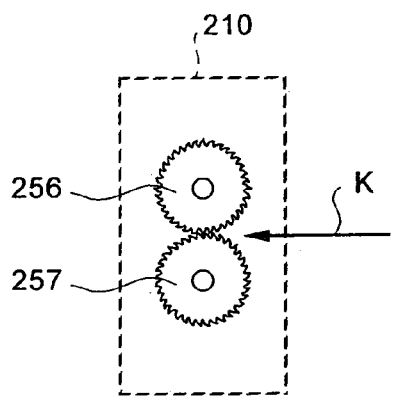
FIG. 38 is a schematic for illustrating another configuration of the finisher shown in FIG. 37.

FIG. 37 is a schematic for illustrating a mechanism of giving each RFID chip on paper after forming an image and a finisher used afterward; and FIG. 38 is a schematic for illustrating another configuration of the finisher shown in FIG. 37. As shown in FIG. 37, this mechanism includes conveyer rollers 250 and 251 that convey the image-formed paper 234 to a left direction in the diagram, the film sheet 245 (see FIG. 35) wound up in a roll having plural RFID chips to be given on paper, a radio communication unit 252 that carries out close-range radio contact with the RFID chip before being given on paper, a pasting roller 253 that separates the film sheet 245 into pieces and pastes each piece of the film sheet to the paper 234, a radio communication unit 254 as an addition confirming unit that carries out close-range radio contact with the RFID chip after being pasted to the paper 234, and a mark stamp 255 provided within the finisher 210 that stamps "invalid document" to the paper when the radio communication unit 254 confirms that the RFID chip given to the paper does not operate normally.

The finisher 210 shown in FIG. 38 can also have shredders 256 and 257 having two blades that cut and abandon the document when the radio communicating unit 254 confirms that the RFID chip given to the paper does not operate normally.

The operation of the mechanism is explained with reference to FIGS. 37 and 38. As shown in FIG. 37, when the conveyer rollers 250 and 251 convey the image-formed paper 234, the semicircle pasting roller 253 makes one rotation in an arrow direction to press and paste the film sheet 245 to the paper 234 and separates the sheet along a cutoff line. According to the twenty-sixth embodiment, the radio communication 252 is provided to carry out close-range radio contact with the RFID chip,(not shown) formed on the film sheet 245 before being pasted. This radio communication unit 252 can confirm which RFID chip is to be given before the film sheet 245 is pasted to the paper 234. For example, each RFID chip is provided with a unique identification. The radio communication unit 252 reads this identification code. In order to determine print data based on this content, information to be printed on the paper is enciphered, and the identification of the RFID chip is used for a code of this encipher. With this arrangement, each sheet of printed paper has own code. Decoding is carried out based on information obtained by radio communication with the RFID chip. Therefore, confidentiality improves substantially. When the radio communication unit 252 that can carry out close-range radio contact with the RFID chip before being given to printed paper is used to determine the printed contents, the RFID chip given to the paper 234 can have close relation with the printed contents.

The radio communication unit 254 carries out close-range radio contact with the RFID chip given to the paper 234 by the pasting roller 253. The radio communication unit 254 has a function of confirming whether the RFID chip is given correctly to the paper 234. When the paper 234 is output in a state that the RFID chip does not operate correctly, RFID chips that operate properly and the one that do not operate correctly are mixed together during management and distribution of the document, which makes it impossible to properly manage the document. In order to prevent this problem, the radio communication unit 254 communicates only once with the paper 234 after being attached with the RFID chip, thereby confirming that there is no problem. This confirmation can be carried out by not only reading the information from the RFID chip but also by writing print information into the RFID chip when necessary. When it is confirmed at this stage that the RFID chip does not operate correctly, the document (the paper 234) needs to be treated as invalid document. According to the twenty-sixth embodiment, as shown in FIG. 37, the mark stamp 255 is provided that stamps "invalid document" to the paper 234 that is conveyed from a direction of an arrow J to the finisher 210 of the image output apparatus. Therefore, the "invalid document" can be stamped on the paper attached with the RFID chip that does not operate correctly. With this arrangement, it is possible to clearly distinguish between correct documents and invalid documents, thereby preventing mixture of two types of documents.

According to the twenty-sixth embodiment, as shown in FIG. 38, the shredders 256 and 257 are provided that cut the document 234 together with the RFID chip conveyed from a direction of an arrow k to the finisher 210 of the image output apparatus. Paper attached with an RFID chip that does not operate correctly is abandoned. Therefore, only correct documents can be output. After the document is abandoned with the shredders 256 and 257, the same document needs to be issued again to avoid omission of the document.

According to the twenty-sixth embodiment, any one of the radio communication units 252 and 254 shown in FIG. 37 is used to write the information printed on the paper or the information to be printed, into the RFID chip. For example, when the memory 208 (see FIG. 4) as the information storage area within the RFID chip has spare in its capacity, a part or whole of the printed information can be stored in this memory 208. More specifically, texts of the printed contents, abstract of the printed contents, and keywords are stored into the memory within the RFID chip. Based on this, after documents are filed, the filing position of a target document can be specified.

The memory within the RFID chip can store a classification index, digest of contents, amount of printed information, a decoding key of enciphered printed contents, printed color information, an author of a printed matter, and user permission information. With this arrangement, later, information concerning printed document can be obtained easily, without optically reading the document, imaging the document, and converting the information into digital data.

At the printing time, the following secondary information, other than print information, can be stored into the memory within the RFID chip by radio communication. The memory can store, information about printed paper, a printer, a communication unit, a print location, print time, image-processed contents, printed positions of a printed matter, complementary information of information that is intentionally dropped from the printed information, and a method of enciphering the printed matter. These pieces of stored information can be used to manage documents.

As explained above, according to the twenty-sixth embodiment, the attachment of the RFID chip to the image-formed paper has various advantages. Based on the provision of the radio communication unit that can communicate with the RFID chips that are before and after being attached to the paper, respectively, the print contents can be related to the RFID chips, and correct RFID chips or invalid RFID chips can be checked in advance. Therefore, the image-formed documents can be managed easily and securely. Particularly, in outputting the image-formed paper, the RFID chip is given automatically, and in parallel, necessary information can be read or written by radio communication with the RFID chip. Therefore, documents can be managed more easily, which reduces the load of the user. In offices or the like, RFID chips corresponding to printed contents can be attached to all documents properly while users do not notice this.

While the RFID chip is given to each sheet of image-formed paper according to the twenty-sixth embodiment, it is not always necessary to give RFID chip to each sheet of paper. For example, usually a document includes plural sheets of paper, and are distributed and managed in a bound-up book shape. Therefore, these documents should be managed as a book, in stead of each sheet.

According to a twenty-seventh embodiment of the present invention, one RFID chip is not given to each of plural sheets of image-formed paper that are bound up in a book. One RFID chip is automatically given to one book. Particularly, according to conventional copying machines generally used in offices, a finisher has a function of binding up plural sheets of printed paper in a book. A user can freely give an RFID chip to a book using this function, by using the existing apparatus. Therefore, this has an advantage of minimizing cost.

According to the twenty-seventh embodiment, the finisher 210 explained in the twenty-third embodiment having a book binding function also has the RFID chip giving function in addition to the paper binding function. Detailed examples are explained with reference to FIGS. 39 to 53.

Figure 39:
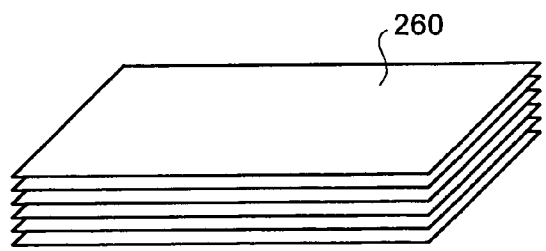
FIG. 39 is a perspective view for illustrating a state that plural sheets of printing paper are superimposed.
Figure 40:
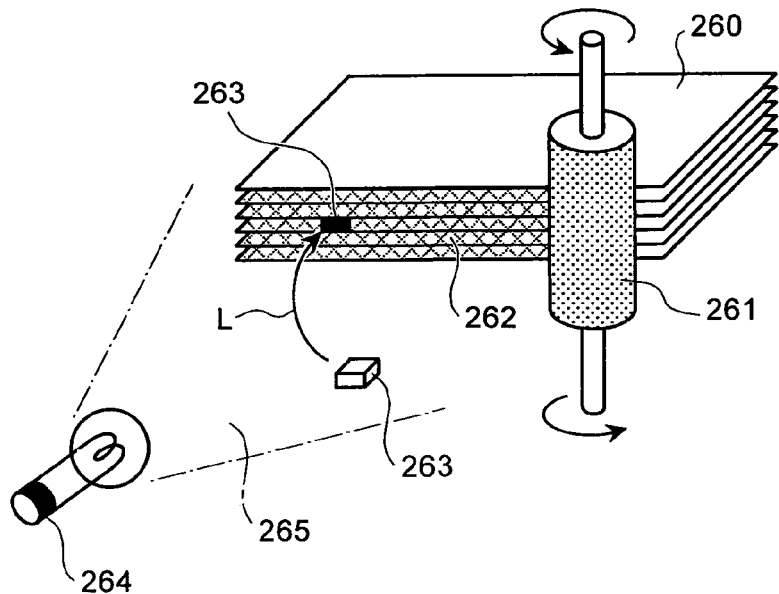
FIG. 40 is a perspective view for illustrating a state that the RFID chip is given to stacked sheets of paper by coating a photo-curing adhesive substance to the paper.
Figure 41:
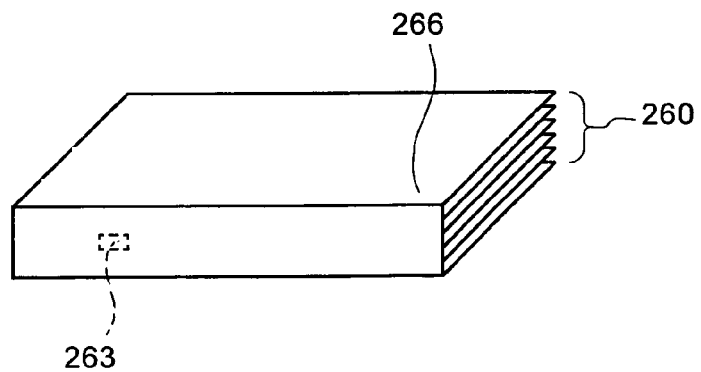
FIG. 41 is a perspective view for illustrating a state that the sheets of printed paper shown in FIG. 40 are bound up in a book.

FIG. 39 is a perspective view for illustrating a state that plural sheets of printing paper are superimposed; FIG. 40 is a perspective view for illustrating a state that the RFID chip is given to stacked sheets of paper by coating a photo-curing adhesive substance to the paper; and FIG. 41 is a perspective view for illustrating a state that the sheets of printed paper shown in FIG. 40 are bound up in a book. Plural sheets of superimposed printed paper 260 as shown in FIG. 39 are bound up and fixed by coating an adhesive agent to the end of the sheets of printed paper 260, as shown in FIG. 40. This book binding method is widely used at present. An ultraviolet curing adhesive agent (UV curing adhesive agent) 262 having fast curing speed is coated with a coating roller 261. An RFID chip 263 is embedded into the coated UV curing adhesive agent 262. An ultraviolet ray lamp 264 is used to irradiate ultraviolet rays 265 to the adhesive to cure the adhesive. The RFID chip is integrated with the bound-up sheets of paper. As shown in FIG. 41, a cover 266 is attached to the paper to form a book. One RFID chip 263 can be given to one book in this way.

Figure 42:
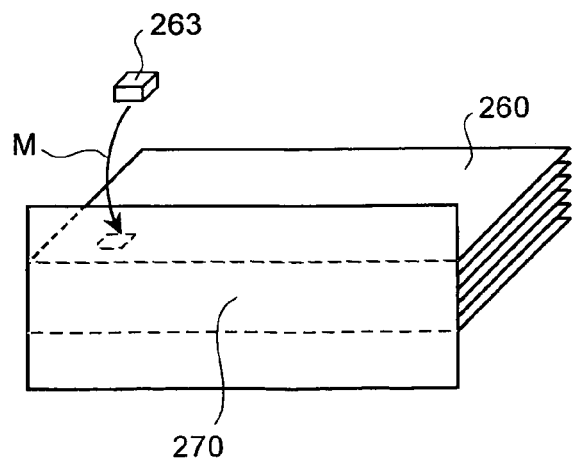
FIG. 42 is a perspective view for illustrating a state that the RFID chip is sandwiched between the adhesive sheet and the sheets of printed paper and they are bound up.
Figure 43:
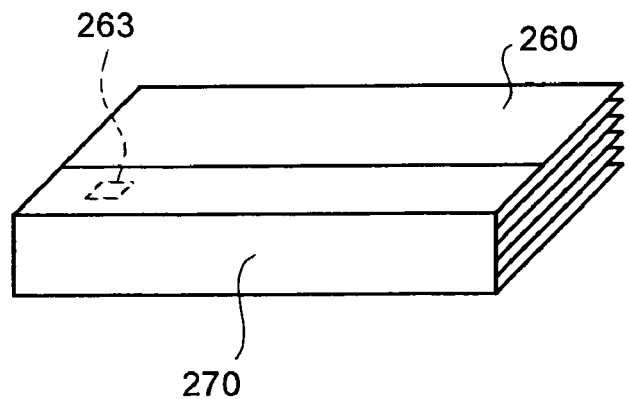
FIG. 43 is a perspective view for illustrating a state that the sheets of printed paper shown in FIG. 42 are bound up in a book.

FIG. 42 is a perspective view, for illustrating a state that the RFID chip is sandwiched between the adhesive sheet and the sheets of printed paper and they are bound up; and FIG. 43 is a perspective view for illustrating a state that the sheets of printed paper shown in FIG. 42 are bound up in a book. As shown in FIG. 42, in binding up the sheets of paper 260 using an adhesive sheet 270, the adhesive sheets 270 coated with an adhesive substance and an RFID chip 263 are prepared in advance. The adhesive sheet 270 covers the end of the printed sheets of paper 260, thereby binding up the sheets of paper using adhesiveness of the sheet. The RFID chip 263 can be given and fixed between the adhesive sheet 270 and the paper 260 (shown by an arrow M), at the book binding time. Alternatively, the RFID chip 263 and the adhesive sheet 270 are integrated together within the finisher 210, immediately before giving the RFID chip, and the adhesive sheet can cover the end of the sheets of printed paper 260. With this arrangement, one RFID chip 263 can be given to one book as shown in FIG. 43.

Figure 44:
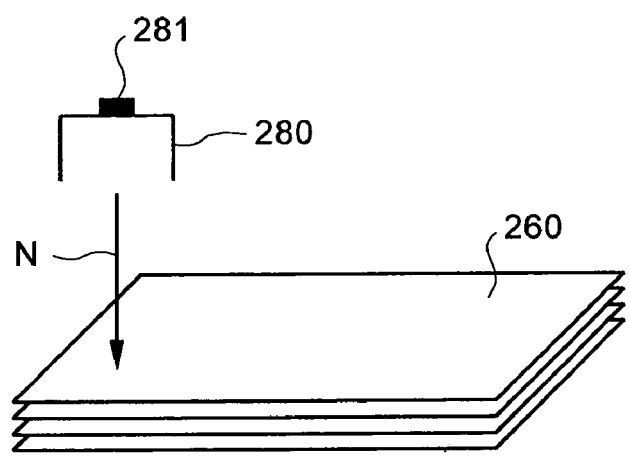
FIG. 44 is a perspective view for illustrating a state before a stapler having the RFID chip is pierced into stacked plural sheets of printed paper.
Figure 45:
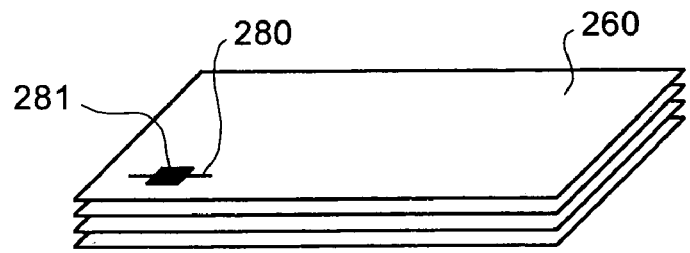
FIG. 45 is a perspective view for illustrating a state that the stapler having the RFID chip is knocked into the sheets of printed paper and the sheets are bound up.
Figure 46:
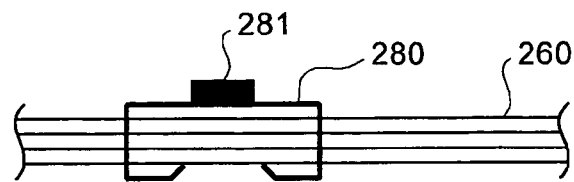
FIG. 46 is a cross section for illustrating a state that the stapler having the RFID chip is knocked into the sheets of printed paper and the sheets are bound up.

FIG. 44 is a perspective view for illustrating a state before a stapler having the RFID chip is pierced into stacked plural sheets of printed paper; FIG. 45 is a perspective view for illustrating a state that the stapler having the RFID chip is knocked into the sheets of printed paper and the sheets are bound up; and FIG. 46 is a cross section for illustrating a state that the stapler having the RFID chip is knocked into the sheets of printed paper and the sheets are bound up. As shown in FIG. 44, a stapler 280 is pierced through the sheets of printed paper 260 in a direction of an arrow N, thereby forming a book. An RFID chip 281 is fixed to the stapler 280 and integrated together in advance. As shown in FIG. 45, the stapler 280 pierces through the sheets of printed paper 260 to bind up the paper, and the RFID chip 281 integrated with the head of the stapler 280 is also integrated with the book at the same time. FIG. 46 is a cross section of a state that the stapler having the RFID chip is knocked into the sheets of printed paper and the sheets are bound up. While one stapler 280 is used for the binding in FIG. 45, plural staplers 280 are used to form a book. In this case, other staplers 280 do not have the RFID chip 281, because one RFID chip 281 is sufficient for one book.

Figure 47:
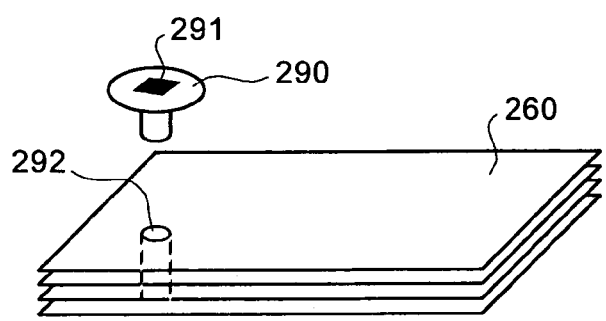
FIG. 47 is a perspective view for illustrating a state before a grommet having the RFID chip is pierced into stacked plural sheets of printed paper.
Figure 48:
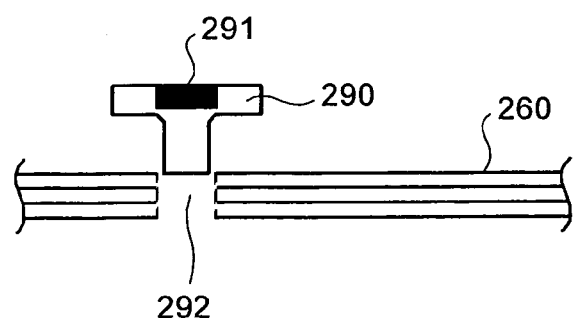
FIG. 48 is a cross section of a grommet shown in FIG. 47.
Figure 49:
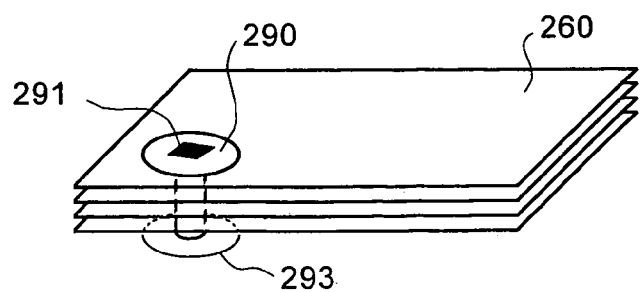
FIG. 49 is a cross section for illustrating a state that the grommet having the RFID chip is knocked into the sheets of printed paper and the sheets are bound up.
Figure 50:
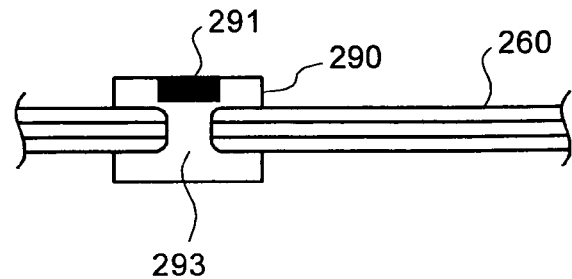
FIG. 50 is a cross section of a grommet shown in FIG. 49.

FIG. 47 is a perspective view for illustrating a state before a grommet having the RFID chip is pierced into stacked plural sheets of printed paper; FIG. 48 is a cross section of a grommet shown in FIG. 47; FIG. 49 is a cross section for illustrating a state that the grommet having the RFID chip is knocked into the sheets of printed paper and the sheets are bound up; and FIG. 50 is a cross section of a grommet shown in FIG. 49. Instead of the stapler, a grommet can be used to pierce through plural sheets of paper. A grommet 290 integrated with an RFID chip 291 is used in the example shown in FIGS. 47 to 50. A rivet-shaped grommet can be also used. As shown in FIGS. 47 and 48, a through-hole 292 is formed in the sheets of paper 260 to pierce the grommet 290 through this hole. The grommet 290 is knocked into this hole. As shown in FIGS. 49 and 50, a front end 293 of the grommet 290 after piercing through the sheets of printed paper 260 is deformed, thereby binding up the paper 260.

Figure 51:
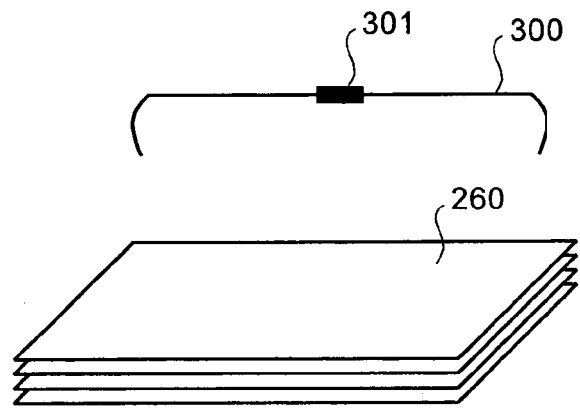
FIG. 51 is a perspective view for illustrating a state before stacked plural sheets of printed paper are bound with a wire having the RFID chip.
Figure 52:
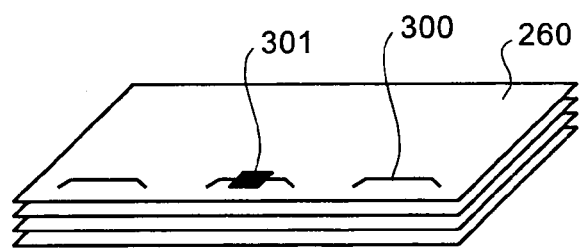
FIG. 52 is a perspective view for illustrating a state that the sheets of printed paper are bound together with the wire having the RFID chip.
Figure 53:
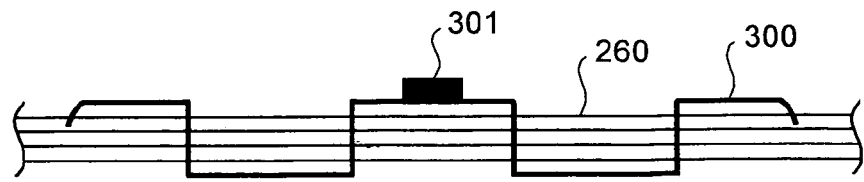
FIG. 53 is a cross section for illustrating a state that the sheets of printed paper are bound together with the wire having the RFID chip.

FIG. 51 is a perspective view for illustrating a state before stacked plural sheets of printed paper are bound with a wire having the RFID chip; FIG. 52 is a perspective view for illustrating a state that the sheets of printed paper are bound together with the wire having the RFID chip; and FIG. 53 is a cross section for illustrating a state that the sheets of printed paper are bound together with the wire having the RFID chip. In order to pierce through plural sheets of printed paper, a resin or fiber rope, or a metal wire can be also used. In the example shown in FIGS. 51 to 53, a wire 300 integrated with an RFID chip 301 is used. As shown in FIG. 51, the wire 300 integrated with the RFID chip 301 is prepared for the sheets of paper 260. As shown in FIG. 52, the wire 300 is stitched alternately into the sheets of printed paper 260. As shown in FIG. 53, the wire 300 is stitched alternately into the sheets of printed paper 260. At the same time, the wire 300 integrated with the RFID chip 301 is given. The sheets need to have ascertain level of cross-section and length at the binding portion to mechanically bind the paper. The antenna is separately necessary for the RFID chip 301. When the antenna has a large area, sensitivity of radio communication is improved. Because the metal wire 300 is used, this can also function as the antenna when combined with the RFID chip 301.

As explained above, according to the twenty-seventh embodiment, an adhesive substance, an adhesive tape, or a piercing member is used to bind up sheets of printed paper. One RFID chip is automatically given to the bound-up paper, in the unit of each book, and the post-processing finisher of the conventional image output apparatus like a copying machine can be used to achieve this function at low cost.

Further effects and modifications can be easily occurred those skilled in the art. Embodiments of the present invention are not limited to those described above, and therefore, various modifications can be achieved without departing from the scope of the appended claims and the gist of the present invention.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image output apparatus comprising:
   a receiving unit that receives first information from a first radio contact element that performs a close-range radio contact, wherein the first radio contact element is attached to a document on which an image is recorded;
   an image processing unit that forms image data of an image to be output from the first information; and
   an image output unit that outputs the image to an output medium from the image data.

2. The image output apparatus according to claim 1, wherein the first information is either of compressed image data and a portable document format file.

3. The image output apparatus according to claim 1, further comprising a communication control unit that transmits and receives information via a network, wherein the communication control unit receives contents corresponding to the first information via the network, and the image processing unit forms the image data from the contents.

4. The image output apparatus according to claim 3, wherein the first information is Internet address information, the communication control unit receives a Hyper Text Markup Language file corresponding to the Internet address information via the network, and the image processing unit forms the image data from the Hyper Text Markup Language file.

5. The image output apparatus according to claim 1, further comprising a large-capacity storage medium that stores information, wherein the image processing unit detects second information corresponding to the first information from the large-capacity storage medium, and forms the image data from the second information.

6. The image output apparatus according to claim 1, further comprising an image reading unit that reads third information of the image from the document, wherein the image processing unit forms the image data from the first information and the third information.

7. The image output apparatus according to claim 6, wherein the first information is image information of the image recorded on the document, and the image processing unit compares the first information with the third information, and when the first information coincides with the third information, forms the image data from the first information.

8. The image output apparatus according to claim 6, wherein the first information is configuration information of the image recorded on the document on which the first radio contact element is attached, the image reading unit reads the third information from the document based on the configuration information, and the image processing unit forms the image data by performing an image process on the third information based on the configuration information.

9. The image output apparatus according to claim 6, wherein the first information is information concerning an image corresponding to confidential information in the image recorded on the document on which the first radio contact element is attached, and the image processing unit forms the image data after deleting a part of or a whole image corresponding to the confidential information from the image recorded on the document.

10. The image output apparatus according to claim 6, wherein the first information is information concerning an image corresponding to confidential information in the image recorded on the document on which the first radio contact element is attached, and the image processing unit forms the image data after changing a part of or a whole image corresponding to the confidential information into unclassified information.

11. An image output apparatus comprising:
a receiving unit that receives first information from a first radio contact element that performs a close-range radio contact, wherein the first radio contact element is attached to a document containing an image and wherein the first information is information that is not recorded on the document;
an image processing unit that forms image data from the first information, wherein the image processing unit forms the image data including the information that is not recorded on the document; and
an image output unit that outputs an output image to an output medium, the output image including the image from the document and the image data based on the first information.

12. The image output apparatus according to claim 1, further comprising a writing unit that writes information to a second radio contact element that performs the close-range radio contact, wherein the writing unit writes information concerning the image output to the output medium into the second radio contact element.

13. An image output apparatus comprising:
a receiving unit that receives first information from a first radio contact element performs a close-range radio contact; and
an image output unit that outputs an image to an output medium, wherein the first information is information concerning the output medium, and the image output unit determines an image output condition based on the information concerning the output medium and outputs the image according to the output condition.

14. The image output apparatus according to claim 13, wherein the first radio contact element is attached on a packaging material that packs the output medium.

15. The image output apparatus according to claim 13, wherein the first radio contact element is attached on the output medium.

16. The image output apparatus according to claim 13, further comprising an image processing unit that forms image data of the image to be output, wherein the image processing unit forms image data from the information concerning the output medium with performing an image processing for making the image optimum, and the image output unit outputs the image based the image data.

17. The image output apparatus according to claim 13, further comprising a writing unit that writes information to a second radio contact element that performs the close-range radio contact, wherein the writing unit writes information concerning the image output to the output medium into the second radio contact element.

18. The image output apparatus of claim 11, wherein the first information comprises at least one of: electronic information of an image to be added to the document, information concerning a position to which the electronic information is to be added, and information indicating the location of the electronic information to be added.

19. The image output apparatus of claim 11, wherein the first information contains confidential information.

20. The image output apparatus of claim 11, further comprising an image reader that reads the image from the document.

* * * * *